(12) United States Patent
Hancock et al.

(10) Patent No.: US 8,112,419 B2
(45) Date of Patent: Feb. 7, 2012

(54) UNIFIED GEOGRAPHIC DATABASE AND METHOD OF CREATING, MAINTAINING AND USING THE SAME

(75) Inventors: S. Lee Hancock, Newport Beach, CA (US); Jordan Hastings, Santa Barbara, CA (US); Scott D. Morrision, Mission Viejo, CA (US)

(73) Assignee: WGRS Licensing Company, LLC, Irvine, CA (US)

( * ) Notice: Subject to any disclaimer, the term of this patent is extended or adjusted under 35 U.S.C. 154(b) by 512 days.

(21) Appl. No.: 12/192,012

(22) Filed: Aug. 14, 2008
(Under 37 CFR 1.47)

(65) Prior Publication Data

US 2009/0077100 A1 Mar. 19, 2009

Related U.S. Application Data

(63) Continuation of application No. 11/156,875, filed on Jun. 17, 2005.

(51) Int. Cl.
*G06F 17/00* (2006.01)

(52) U.S. Cl. ........ 707/736; 707/741; 707/756; 707/828; 707/795

(58) Field of Classification Search .................. 707/736, 707/741, 756, 795, 828
See application file for complete search history.

(56) References Cited

U.S. PATENT DOCUMENTS

| | | | |
|---|---|---|---|
| 4,383,257 A | 5/1983 | Giallanza et al. | |
| 4,757,267 A | 7/1988 | Riskin | |
| 4,992,940 A | 2/1991 | Dworkin | |
| 5,155,689 A | 10/1992 | Wortham | |
| 5,206,949 A | 4/1993 | Cochran et al. | |
| 5,229,947 A | 7/1993 | Ross et al. | |
| 5,289,572 A | 2/1994 | Yano et al. | |
| 5,424,951 A | 6/1995 | Nobe et al. | |
| 5,440,479 A | 8/1995 | Hutton et al. | |
| 5,448,696 A | 9/1995 | Shimada et al. | |
| 5,506,897 A | 4/1996 | Moore et al. | |
| 5,519,618 A | 5/1996 | Kastner et al. | |
| 5,519,760 A | 5/1996 | Borkowski et al. | |
| 5,533,107 A | 7/1996 | Irwin et al. | |
| 5,543,789 A | 8/1996 | Behr et al. | |
| 5,588,048 A | 12/1996 | Neville | |

(Continued)

FOREIGN PATENT DOCUMENTS

CA 2213199 2/1998

(Continued)

*Primary Examiner* — Sana Al Hashemi
(74) *Attorney, Agent, or Firm* — William A. English; Vista IP Law Group LLP

(57) ABSTRACT

A Universal Geographic Database ("UGD") is provided that includes a real-time, automated registry/clearinghouse for the publication and retrieval of real-world locations and location-related information for businesses and other entities. By this registry, entities may publish their location and location-related information in a single place, and information services and their users can refer to this single place, via telecommunications devices, to obtain static, real-time location and location-based information about the registered locations. Each UGD record is keyed by a proprietary location address (PLA) based on the World Geographic Referencing System (WGRS). PLAs may be used as key reference and addressing terms, e.g., imbedded in digital documents, websites, GPS devices, or other information services to provide links to maps, directions, and information in the registry related to such locations. PLAs may also provide a concise, user-friendly notation for location naming and designating real-world locations and on all types of location-sensitive electronic devices.

27 Claims, 33 Drawing Sheets

U.S. PATENT DOCUMENTS

| | | |
|---|---|---|
| 5,648,768 A | 7/1997 | Bouve |
| 5,682,525 A | 10/1997 | Bouve et al. |
| 5,689,809 A | 11/1997 | Grube et al. |
| 5,732,074 A | 3/1998 | Spaur et al. |
| 5,787,429 A | 7/1998 | Nikolin, Jr. |
| 5,796,634 A | 8/1998 | Craport et al. |
| 5,802,492 A | 9/1998 | DeLorme et al. |
| 5,808,566 A | 9/1998 | Behr et al. |
| 5,832,182 A | 11/1998 | Zhang et al. |
| 5,839,088 A | 11/1998 | Hancock et al. |
| 5,848,131 A | 12/1998 | Shaffer et al. |
| 5,862,323 A | 1/1999 | Blakley, III et al. |
| 5,878,126 A | 3/1999 | Velamuri et al. |
| 5,892,482 A | 4/1999 | Coleman, Jr. et al. |
| 5,893,113 A | 4/1999 | McGrath et al. |
| 5,908,465 A | 6/1999 | Ito et al. |
| 5,926,401 A | 7/1999 | Montag et al. |
| 5,930,474 A | 7/1999 | Dunworth et al. |
| 5,938,721 A | 8/1999 | Dussell et al. |
| 5,944,769 A | 8/1999 | Musk et al. |
| 5,945,985 A | 8/1999 | Babin et al. |
| 5,948,040 A * | 9/1999 | DeLorme et al. ............ 701/201 |
| 5,951,620 A | 9/1999 | Ahrens et al. |
| 5,953,722 A | 9/1999 | Lampert et al. |
| 5,961,569 A | 10/1999 | Craport et al. |
| 5,968,109 A | 10/1999 | Israni et al. |
| 5,974,419 A | 10/1999 | Ashby |
| 5,991,739 A | 11/1999 | Cupps et al. |
| 5,999,878 A | 12/1999 | Hanson et al. |
| 6,009,363 A | 12/1999 | Beckert et al. |
| 6,018,695 A | 1/2000 | Ahrens et al. |
| 6,021,406 A | 2/2000 | Kuznetsov |
| 6,029,173 A | 2/2000 | Meek et al. |
| 6,038,559 A | 3/2000 | Ashby et al. |
| 6,038,568 A | 3/2000 | McGrath et al. |
| 6,041,281 A | 3/2000 | Nimura et al. |
| 6,047,234 A | 4/2000 | Cherveny et al. |
| 6,047,236 A | 4/2000 | Hancock et al. |
| 6,047,280 A | 4/2000 | Ashby et al. |
| 6,112,085 A | 8/2000 | Garner et al. |

FOREIGN PATENT DOCUMENTS

| | | |
|---|---|---|
| JP | 09166450 | 6/1997 |
| WO | 9600373 | 1/1996 |
| WO | 9707467 | 2/1997 |
| WO | 9859506 | 12/1998 |

* cited by examiner

```
AK,ANC,ANCHORAGE,149W54,61N13
AK,FBK,FAIRBANKS,147W43,64N51
AK,JUN,JUNEAU,134W24,58N18
AL,ANN,ANNISTON,085W50,33N39
AL,BES,BESSEMER,086W58,33N24
AL,BIR,BIRMINGHAM,086W48,33N31
AL,DEC,DECATUR,086W59,34N36
AL,DOT,DOTHAN,085W24,31N13
AL,FLO,FLORENCE,087W41,34N48
AL,GAD,GADSDEN,086W01,34N01
AL,HUN,HUNTSVILLE,086W35,34N44
AL,MOB,MOBILE,088W03,30N41
AL,MON,MONTGOMERY,086W19,32N23
AL,PHE,PHENIX CITY,085W00,32N28
AL,PRI,PRICHARD,088W05,30N44
AL,SEL,SELMA,087W01,32N25
AL,TUS,TUSCALOOSA,087W34,33N12
AR,EDO,EL DORADO,092W40,33N12
AR,FAY,FAYETTEVILLE,096W10,36N04
AR,FTS,FORT SMITH,094W25,35N23
AR,HOS,HOT SPRINGS NAT PA,093W03,34N31
AR,JON,JONESBORO,090W42,35N50
AR,LRK,LITTLE ROCK,092W17,34N45
AR,NLR,NORTH LITTLE ROCK,092W16,34N46
AR,PIB,PINE BLUFF,092W01,34N13
AR,WME,WEST MEMPHIS,090W11,35N09
AZ,FLA,FLAGSTAFF,111W39,35N12
AZ,GCN,GRAND CANYON,112W8,36N59
AZ,GLD,GLENDALE,112W11,33N32
AZ,MES,MESA,111W50,33N25
AZ,PHO,PHOENIX,112W04,33N27
AZ,SCO,SCOTTSDALE,111W56,33N29
AZ,TEM,TEMPE,111W56,33N25
AZ,TUC,TUCSON,110W58,32N13
AZ,YMA,YUMA,114W37,32N43
CA,ALA,ALAMEDA,122W15,37N46
CA,ALH,ALHAMBRA,118W06,34N06
CA,ALT,ALTADENA,118W08,34N11
CA,ANA,ANAHEIM,117W55,33N50
CA,ANT,ANTIOCH,121W48,38N01
CA,ARA,ACADIA,118W12,34N08
CA,ARD,ARDEN,121W23,38N36
CA,ARE,ARCADE,118W01,34N08
CA,AZU,AZUSA,117W52,34N08
CA,BAK,BAKERSFIELD,119W01,35N23
CA,BAP,BALDWIN PARK,117W58,34N04
CA,BBK,BURBANK,118W19,34N11
CA,BEF,BELLFLOWER,118W09,33N53
CA,BEG,BELL GARDENS,118W10,33N58
CA,BEL,BELL,118W11,33N59
CA,BEV,BEVERLY HILLS,118W25,34N04
```

*Fig. 8A*

```
CA,BMT,BELMONT,122W16,37N31
CA,BRK,BERKELEY,122W16,37N52
CA,BUP,BUENA PARK,117W60,32N52
CA,BUR,BURLINGAME,112W21,37N35
CA,CAM,CAMPBELL,121W57,37N17
CA,CAR,CARMICHAEL,121W19,38N38
CA,CAR,CARSON,118W17,33N48
CA,CAV,CASTRO VALLEY,122W04,37N42
CA,CHI,CHINO,117W41,34N01
CA,CHV,CHULA VISTA,117W05,32N39
CA,CIH,CITRUS HEIGHTS,121W17,38N42
CA,CLA,CLAREMONT,117W43,34N06
CA,COL,COLTON,117W19,34N04
CA,CMP,COMPTON,118W13,33N54
CA,COM,COSTA MESA,117W55,33N38
CA,CON,CONCORD,122W02,37N59
CA,COV,COVINA,117W52,34N05
CA,CRN,CORONA,117W34,33N53
CA,CRO,CORONADO,117W10,32N41
CA,CUC,CULVER CITY,118W25,34N01
CA,CYP,CYPRESS,118W02,33N50
CA,DAC,DALY CITY,122W28,37N42
CA,DAV,DAVIS,121W44,38N32
CA,DOW,DOWNEY,118W08,33N56
CA,ECA,EL CAJON,116W58,32N48
CA,ECE,EL CERRITO,122W19,37N55
CA,ELA,EAST LOS ANGELES,118W09,34N01
CA,EMT,EL MONTE,122W00,37N59
CA,ESC,ESCONDIDO,117W05,33N07
CA,EUR,EUREKA,124W09,40N47
CA,FAI,FAIRFIELD,122W03,38N15
CA,FLO,FLORENCE,118W15,33N58
CA,FON,FONTANA,117W26,34N06
CA,FOV,FOUNTAIN VALLEY,117W58,33N42
CA,FRE,FREMONT,121W57,37N32
CA,FRS,FRESNO,119W47,36N44
CA,FUL,FULLERTON,117W56,33N53
CA,GAG,GARDEN GROVE,117W56,33N47
CA,GAR,GARDENA,118W1818,33N53
CA,GLD,GLENDALE,118W15,34N09
CA,GLE,GLENDORA,117W52,34N08
CA,HAH,HACIENDA HEIGHTS,117W58,33N58
CA,HAW,HAWTHORNE,118W21,33N55
CA,HAY,HAYWARD,122W05,37N40
CA,HIC,HILLCREST CENTER,118W57,35N23
CA,HOL,HOLLYWOOD,118W21,34N06
CA,HUB,HUNTINGTON BEACH,118W05,33N40
CA,HUP,HUNTINGTON PARK,118W14,33N59
CA,IMB,IMPERIAL BEACH,117W08,32N35
CA,ING,INGLEWOOD,118W21,33N58
CA,LA_,LOS ANGELES,118W15,34N04
```

*Fig. 8B*

AK,ALASKA
AL,ALABAMA
AR,ARKANSAS
AZ,ARIZONA
CA,CALIFORNIA
CO,COLORADO
CT,CONNECTICUT
DC,DISTRICT OF COLUMBIA
DE,DELAWARE
FL,FLORIDA
GA,GEORGIA
HI,HAWAII
IA,IOWA
ID,IDAHO
IL,ILLINOIS
IN,INDIANA
KS,KANSAS
KY,KENTUCKY
LA,LOUISIANA
MA,MASSACHUSETTS
MD,MARYLAND
ME,MAINE
MI,MICHIGAN
MN,MINNESOTA
MO,MISSOURI
MS,MISSISSIPPI
MT,MONTANA
NC,NORTH CAROLINA
ND,NORTH DAKOTA
NE,NEBRASKA
NH,NEW HAMPSHIRE
NJ,NEW JERSEY
NM,NEW MEXICO
NV,NEVADA
NY,NEW YORK
OH,OHIO
OK,OKLAHOMA
OR,OREGON
PA,PENNSYLVANIA
RI,RHODE ISLAND
SC,SOUTH CAROLINA
SD,SOUTH DAKOTA
TN,TENNESSEE
TX,TEXAS
UT,UTAH
VA,VIRGINIA
VT,VERMONT
WA,WASHINGTON
WI,WISCONSIN
WV,WEST VIRGINIA
WY,WYOMING

*Fig. 9*

US.CA.NWB.MAC2,117W52.360,33N39.549,MCDONALDS #2
US.CA.NWB.BK2,117W52.425,33N39.647,BURGER KING #2
US.CA.NWB.ARCO,117W52.459,33N39.681,ARCO
US.CA.NWB.DLTC2,117W52.513,33N39.679,DEL TACO #2
US.CA.NWB.CHVRN,117W52.557,33N39.701,CHEVRON
US.CA.NWB.JACK1,117W54.800,33N37.895,JACK-IN-THE-BOX #1
US.CA.NWB.MAC1,117W54.837,33N36.987,MCDONALDS #1
US.CA.NWB.TACO,117W55.280,33N38.278,TACO BELL
US.CA.NWB.DLTC1,117W55.354,33N38.204,DEL TACO #1
US.CA.NWB.MAC3,117W52.360,33N39.549,MCDONALDS #3
US.CA.NWB.BK1,117W52.425,33N39.647,BURGER KING #1
US.CA.NWB.ARCO,117W52.459,33N39.681,ARCO #1
US.CA.NWB.DLTC3,117W52.513,33N39.679,DEL TACO #3
US.CA.NWB.CHVRN1,117W52.557,33N39.701,CHEVRON #2
US.CA.NWB.JACK2,117W54.800,33N37.895,JACK-IN-THE-BOX #2
US.CA.NWB.MAC4,117W54.837,33N36.987,MCDONALDS #4
US.CA.NWB.TACO1,117W55.280,33N38.278,TACO BELL #1
US.CA.NWB.DLTC4,117W55.354,33N38.204,DEL TACO #4
US.CA.NWB.MAC5,117W52.360,33N39.549,MCDONALDS #5
US.CA.NWB.BK3,117W52.425,33N39.647,BURGER KING #3
US.CA.NWB.ARCO2,117W53.129,33N40.871,ARCO #2
US.CA.NWB.DLTC5,117W52.625,33N39.811,DEL TACO #5
US.CA.NWB.CHVRN3,117W52.247,33N39.642,CHEVRON #3
US.CA.NWB.JACK3,117W53.74,33N38.25,JACK-IN-THE-BOX #3
US.CA.NWB.MAC6,17W53.157,33N37.1,MCDONALDS #6
US.CA.NWB.TACO2,117W54.872,33N38.657,TACO BELL #2
US.CA.NWB.DLTC6,117W55.144,33N39.975,DEL TACO #6
US.CA.NWB.MAC7,117W52.360,33N39.549,MCDONALDS #7
US.CA.NWB.BK4,117W52.425,33N39.647,BURGER KING #4
US.CA.NWB.ARCO3,117W51.824,33N39.47,ARCO #3
US.CA.NWB.DLTC7,117W52.851,33N39.487,DEL TACO #7
US.CA.NWB.CHVRN4,117W52.557,33N39.701,CHEVRON #4
US.CA.NWB.JACK4,117W54.800,33N37.895,JACK-IN-THE-BOX #4
US.CA.NWB.MAC8,117W54.837,33N36.987,MCDONALDS #8
US.CA.NWB.TACO3,117W55.28,33N38.278,TACO BELL #3
US.CA.NWB.DLTC8,117W55.354,33N38.204,DEL TACO #8

US.CA.NWB.TEXCO,117W52.360,33N39.549,TEXACO
US.CA.NWB.GULF,117W52.425,33N39.647,GULF OIL
US.CA.NWB.ARBY,117W52.459,33N39.681,ARBY'S
US.CA.NWB.DENNY,117W52.513,33N39.679,DENNY'S
US.CA.NWB.PZHUT,117W52.557,33N39.701,PIZZA HUT
US.CA.NWB.PZINN,117W54.800,33N37.895,PIZZA INN
US.CA.NWB.PENNY,117W54.837,33N36.987,J.C. PENNY'S
US.CA.NWB.KFC1,117W55.280,33N38.278,KENTUCKY FRIED CHICKEN
US.CA.NWB.PZAPZA,117W55.354,33N38.204,LIL' CAESAERS
US.CA.NWB.SUB,117W52.360,33N39.549,SUBWAY
US.CA.NWB.WNDY,117W52.425,33N39.647,WENDY'S
US.CA.NWB.WELLS,117W52.459,33N39.681,WELL'S FARGO

*Fig. 10A*

```
US.CA.NWB.STAR,117W52.513,33N39.679,DEL STAR ATM
US.CA.NWB.MAIL,117W52.557,33N39.701,MAILBOX
US.CA.NWB.GMC,117W54.800,33N37.895,GENERAL MOTORS DEALER
US.CA.NWB.FORD,117W52.837,33N36.987,FORD DEALER
US.CA.NWB.MBZ,117W55.280,33N38.278,MERCEDES BENZ DEALER
US.CA.NWB.LEXUS,117W55.354,33N38.204,LEXUS DEALER
US.CA.NWB.S711,117W52.360,33N39.549,7-11
US.CA.NWB.CIRK,117W52.425,33N39.647,CIRCLE K STORE
US.CA.NWB.BOFA,117W52.459,33N39.681,BANK OF AMERICA
US.CA.NWB.ANW,117W52.513,33N39.679,A AND W RESTAURANT

US.CA.SAN.MAC2,117W52.360,33N49.549,MCDONALDS #2
US.CA.SAN.BK2,117W52.425,33N49.647,BURGER KING #2
US.CA.SAN.ARCO,117W52.459,33N49.681,ARCO
US.CA.SAN.DLTC2,117W52.513,33N49.679,DEL TACO #2
US.CA.SAN.CHVRN,117W52.557,33N49.701,CHEVRON
US.CA.SAN.JACK1,117W54.800,33N47.895,JACK-IN-THE-BOX #1
US.CA.SAN.MAC1,117W54.837,33N46.987,MCDONALDS #1
US.CA.SAN.TACO,117W55.280,33N48.278,TACO BELL
US.CA.SAN.DLTC1,117W55.280,33N48.204,DEL TACO #1
US.CA.SAN.MAC3,117W52.360,33N49.549,MCDONALDS #3
US.CA.SAN.BK1,117W52.425,33N49.647,BURGER KING #1
US.CA.SAN.ARCO1,117W52.459,33N49.681,ARCO #1
US.CA.SAN.DLTC3,117W52.513,33N49.679,DEL TACO #3
US.CA.SAN.CHVRN1,117W52.557,33N49.701,CHEVRON #2
US.CA.SAN.JACK2,117W54.800,33N47.895,JACK-IN-THE-BOX #2
US.CA.SAN.MAC4,117W54.837,33N46.987,MCDONALDS #4
US.CA.SAN.TACO1,117W55.280,33N48.278,TACO BELL #1
US.CA.SAN.DLTC4,117W55.354,33N48.204,DEL TACO #4
US.CA.SAN.MAC5,117W52.360,33N49.549,MCDONALDS #5
US.CA.SAN.BK3,117W52.425,33N49.647,BURGER KING #3
US.CA.SAN.ARCO2,117W52.459,33N49.681,ARCO #2
US.CA.SAN.DLTC5,117W52.513,33N49.679,DEL TACO #5
US.CA.SAN.CHVRN3,117W52.557,33N49.701,CHEVRON #3
US.CA.SAN.JACK3,117W54.800,33N47.895,JACK-IN-THE-BOX #3
US.CA.SAN.MAC6,117W54.837,33N46.987,MCDONALDS #6
US.CA.SAN.TACO2,117W55.280,33N48.278,TACO BELL #2
US.CA.SAN.DLTC6,117W55.354,33N48.204,DEL TACO #6
US.CA.SAN.MAC7,117W52.360,33N49.549,MCDONALDS #7
US.CA.SAN.BK4,117W52.425,33N49.647,BURGER KING #4
US.CA.SAN.ARCO3,117W52.459,33N49.681,ARCO #3
US.CA.SAN.DLTC7,117W52.513,33N49.647,DEL TACO #7
US.CA.SAN.CHVRN4,117W52.557,33N49.701,CHEVRON #4
US.CA.SAN.JACK4,117W54.800,33N47.895,JACK-IN-THE-BOX #4
US.CA.SAN.MAC8,117W54.837,33N46.987,MCDONALDS #8
US.CA.SAN.TACO3,117W55.280,33N48.278,TACO BELL #3
US.CA.SAN.DLTC8,117W55.354,33N48.204,DEL TACO #8

US.CA.YSM.WWNA,119W39.23,37N32.20,WAWONA LODGE
US.CA.YSM.TLME,119W21.54,37N52.32,TUOLUMNE MEADOWS
```

*Fig. 10B*

```
US.CA.YSM.HFDM,119W31.56,37N44.84,HALF DOME
US.CA.YSM.HCHY,119W47.37,37N56.78,HETCH HETCY RESERVOIR
US.CA.YSM.BDGP,119W39.72,37N40.25,BADGER PASS
US.CA.YSM.MRPG,119W36.13,37N30.77,MARIPOSA GROVE
US.CA.YSM.SENT,119W37.96,37N30.12,SOUTH ENTRANCE
US.CA.YSM.NENT,119W52.54,37N48.69,NORTH ENTRANCE
US.CA.YSM.WENT,119W46.21,37N40.64,WEST ENTRANCE
US.CA.YSM.EENT,119W15.57,37N54.38,EAST ENTRANCE
US.CA.YSM.WWLF,119W38.73,37N52.35,WHITE WOLF
US.CA.YSM.GCRP,119W34.30,37N43.67,GLACIER POINT
US.CA.YSM.YSMF,119W37.12,37N45.34,YOSEMITE FALLS

US.CA.YSM.GGG1,119W39.23,37N32.20,WAWONA LODGE
US.CA.YSM.GGG2,119W21.54,37N52.32,TUOLUMNE MEADOWS
US.CA.YSM.GGG3,119W31.56,37N44.84,HALF DOME
US.CA.YSM.GGG4,119W47.37,37N56.78,HETCH HETCHY RESERVOIR
US.CA.YSM.GGG5,119W39.72,37N40.25,BADGER PASS
US.CA.YSM.GGG6,119W36.13,37N30.77,MARIPOSA GROVE
US.CA.YSM.GGG7,119W37.96,37N30.12,SOUTH ENTRANCE
US.CA.YSM.GGG8,119W52.54,37N48.69,NORTH ENTRANCE
US.CA.YSM.GGG9,119W46.21,37N40.64,WEST ENTRANCE
US.CA.YSM.GGG10,119W15.57,37N54.38,EAST ENTRANCE
US.CA.YSM.GGG11,119W38.73,37N52.35,WHITE WOLF
US.CA.YSM.GGG12,119W34.30,37N43.67,GLACIER POINT
US.CA.YSM.GGG13,119W37.12,37N45.34,YOSEMITE FALLS

US.CA.YSM.G1,119W39.23,37N32.20,WAWONA LODGE
US.CA.YSM.G2,119W21.54,37N52.32,TUOLUMNE MEADOWS
US.CA.YSM.G3,119W31.56,37N44.84,HALF DOME
US.CA.YSM.G4,119W47.37,37N56.78,HETCH HETCHY RESERVOIR
US.CA.YSM.G5,119W39.72,37N40.25,BADGER PASS
US.CA.YSM.G6,119W36.13,37N30.77,MARIPOSA GROVE
US.CA.YSM.G7,119W37.96,37N30.12,SOUTH ENTRANCE
US.CA.YSM.G8,119W52.54,37N48.69,NORTH ENTRANCE
US.CA.YSM.G9,119W46.21,37N40.64,WEST ENTRANCE
US.CA.YSM.G10,119W15.57,37N54.38,EAST ENTRANCE
US.CA.YSM.G11,119W38.73,37N52.35,WHITE WOLF
US.CA.YSM.G12,119W34.30,37N43.67,GLACIER POINT
US.CA.YSM.G13,119W37.12,37N45.34,YOSEMITE FALLS

US.CA.YSB.HFDM,119W31.56,37N44.84,HALF DOME
US.CA.YSB.YSMF,119W37.12,37N45.34,YOSEMITE FALLS
US.CA.YSB.GGG1,119W34.23,37N44.73,AHWAHNEE HOTEL
US.CA.YSB.GCRP,119W34.30,37N43.67,GLACIER POINT
```

Fig. 10C

```
AD,ANDORRA
AE,UNITED ARAB EMIRATES
AF,AFGHANISTAN
AG,ANTIGUA AND BARBUDA
AI,ANGUILLA
AL,ALBANIA
AM,ARMENIA
AN,NETHERLANDS ANTILLES
AO,ANGOLA
AQ,ANTARCTICA
AR,ARGENTINA
AS,AMERICAN SAMOA
AT,AUSTRIA
AU,AUSTRALIA
AW,ARUBA
AZ,AZERBAIJAN
BA,BOSNIA AND HERZEGOVINA
BB,BARBADOS
BD,BANGLADESH
BE,BELGIUM
BF,BURKINA FASO
BG,BULGARIA
BH,BAHRAIN
BI,BURUNDI
BJ,BENIN
BM,BERMUDA
BN,BRUNEI DARUSSALAM
BO,BOLIVIA
BR,BRAZIL
BS,BAHAMAS
BT,BHUTAN
BV,BOUVET ISLAND
BW,BOTSWANA
BY,BELARUS
BZ,BELIZE
CA,CANADA
CC,COCOS (KEELING) ISLANDS
CF,CENTRAL AFRICAN REPUBLIC
CG,CONGO
CH,SWITZERLAND
CI,COTE D'IVOIRE (IVORY COAST)
CK,COOK ISLANDS
CL,CHILE
CM,CAMEROON
CN,CHINA
CO,COLOMBIA
CR,COSTA RICA
CS,CZECHOSLOVAKIA (FORMER)
CU,CUBA
CV,CAPE VERDE
CX,CHRISTMAS ISLAND
```

*Fig. 11*

UNIFIED GEOGRAPHIC DATABASE AND METHOD OF CREATING, MAINTAINING AND USING THE SAME

RELATED APPLICATIONS

This application is a continuation of application Ser. No. 11/156,875, filed Jun. 17, 2005, which is a continuation of application Ser. No. 10/701,961, filed Nov. 5, 2003, now abandoned, which is a continuation of application Ser. No. 09/707,213, filed Nov. 3, 2000, now abandoned, which is a continuation-in-part of application Ser. No. 09/257,462, filed Feb. 25, 1999, now U.S. Pat. No. 6,202,023, which is a continuation-in-part of application Ser. No. 09/188,153, filed Nov. 4, 1998, now U.S. Pat. No. 6,047,236, which is a continuation of application Ser. No. 08/701,586, filed Aug. 22, 1996, now U.S. Pat. No. 5,839,088. The above referenced patents and patent applications are incorporated herein by reference as if set forth in full.

FIELD OF THE INVENTION

The present invention relates to a Unified Geographic Database ("UGD"), and methods of creating, acquiring, managing, maintaining, using and distributing location-based information through both centralized and distributed databases referred to as a Location Name Servers. The Location Name Servers are accessible through a variety of devices and computer systems, including the Internet, communications networks and gateways and other telecommunications channels.

BACKGROUND

Countless sources of information exist to assist people who need information concerning the location and practices of real-world businesses and other private and public entities. This information is very actively used by people engaged in the business process: finding locations, obtaining maps and directions, hours of operation, inventory, prices, etc., generally to assist in shopping and purchasing decisions. Notwithstanding the power of the Internet as a means of gathering and disseminating information, there is currently no universal "clearinghouse" method or system of acquiring and distributing location-based basic, enhanced and/or real-time information about the millions of real-world businesses and other addresses in the world. Rather, the location-related information is currently stored in literally millions of databases throughout the world, including personal and corporate rolodexes, accounting master files, and especially telephone-directory databases. These disparate sources are continually in flux, but on different schedules, and often materially inaccurate in one way or another. No single source exists to provide or link to correct, up-to-date information regarding all businesses and other entities. Further, it is impossible currently to synthesize the many sources of information on a timely basis, and also to distribute it to the myriad systems where it is needed and used.

The largest single source of location-based information regarding businesses is that of Yellow Page publishers. Still, Yellow Pages publishers, whether via physical books or the Internet, do not possess listings of all locations, e.g. city parks. In practice, the majority of location-based information on business and individual address information is derived from the local telephone exchange carrier ("LEC"). Historically there has only been one LEC for any given region or area. Nevertheless, it is clearly not the LEC's primary business to create and distribute address and location information. In addition, many businesses now use competitive local exchange carriers (a "CLEC"), so there is not one clear source for local business telephone listings. Some individuals, and a few businesses, are foregoing wireline telephone service entirely, which means that the addresses may never be captured in the LEC or CLEC system. Furthermore, LECs and CLECs typically only obtain basic information such as name, street address and telephone number. These street addresses may or may not be geocoded (through various geocoding engines, with uneven results), so that their actual position in space, and on maps is unreliable. Enhanced information is typically obtained by Yellow Page providers, but this information rarely makes it into any type of universal, location-based database designed to provide immediate access to all users of Internet-enabled devices and services. Finally, the LEC and CLEC information is not updated quickly or, with changes in carriers, even regularly: Yellow-Page books are typically printed annually, and, thus, provide an incredibly inefficient method of address and location handling that ultimately takes little advantage of the power of the Internet.

Accordingly, large amounts of resources, including time, personnel and money, are currently being wasted on (1) multiple solicitations of the same information from the same businesses and (2) storage and distribution of that information. Users, too, waste time conducting multiple searches for the same information, seeking confirmation of information from more than one source as an estimate of its accuracy, i.e., to avoid driving some distance to a store which no longer exists or which no longer carries a desired product.

SUMMARY OF THE INVENTION

Accordingly, an aspect of the invention involves a Unified Geographic Database ("UGD"). The UGD is a database registry for the locations and location-related information of real-world businesses and other entities, analogous to the registry of domain names for Internet and web sites. Via this registry, businesses and other entities can immediately post their location-related information to make it available to potential users; and users can simultaneously query this registry to obtain accurate, complete and timely location-based information about these businesses and other entities, via Internet-connected electronic devices or services. Each record of the UGD includes a unique, user-friendly, domain-name like hierarchical geographical referencing address (based on the World Geographic Referencing System (WGRS)) that can serve as a discrete identifier, the business or other entity name, its street address, and basic contact information (e.g., telephone number, facsimile number, e-mail address, internet website address, wireless website address). Other, more detailed but fairly static yet customized information (e.g., store hours, credit cards accepted, major brands carried, hours of operation, specific parking alternatives, etc.) may also be available in the record. Ultimately, extremely customized, real-time information (e.g., inventory availability in particular models, sizes or colors; the availability of unique, short-term geographically restricted specials, discounts, coupons and other promotions, etc.) can be linked to the discrete identifier and distributed directly to end-users or through third-parties seeking to distribute such location-based information. The unique, user-friendly geographical referencing address is as important to real-world businesses as their domain name because this unique address drives real-world commerce at the business location instead of e-commerce at a website. Not only does this unique address provide the discrete identifier for the UGD record, it is designed to provide a user-friendly naming convention and interface for all types of electronic devices—from web phones to car navigation systems.

An additional aspect of the invention involves a method of creating a UGD by registering a proprietary name for a geographical location of an entity. The method includes receiving geographical location information for an entity, receiving a proprietary name for the entity, geocoding the geographical location information into a hierarchical address, and storing the proprietary name, hierarchical address, and geographical location information as a record in the UGD.

Another aspect of the invention involves a method of creating a UGD by registering a proprietary name for a geographical location of an entity. The method includes receiving geographical location information for an entity, receiving a proprietary name for the entity, and storing the proprietary name and geographical location information for the entity as a record in the UGD.

A further aspect of the invention involves a method of creating a UGD by registering a universal location address (ULA) for a geographical location of an entity. The method includes receiving geographical location information for an entity, geocoding the geographical location information into a ULA based on the WGRS, and storing the ULA and geographical location information as a record in the UGD.

An additional aspect of the invention involves a method of using a UGD containing records for multiple entities referenced by a WGRS address and returning location-related information for the entities. The method includes receiving a WGRS address, accessing one or more entity UGD records based on the WGRS address, and providing location-related information from the one or more entity UGD records accessed.

Another aspect of the invention involves a UGD comprising records for multiple entities, each entity record including a WGRS domain-name, like hierarchical address associated with location-related information for an entity.

A further aspect of the invention involves a Location Name Server (LNS) to facilitate convenient and ubiquitous access to the UGD. Via one or more LNSs, users of connected devices can query the UGD for detailed location-based information according to both spatial and aspatial attributes which they may (partially) know, e.g. business name, street address, registered brands, etc. Particularly useful types of spatial attributes also supported in LNS queries are Universal Location Addresses (ULAs) and Proprietary Location Addresses (PLAs), described below, which provide a user-friendly geo-referencing notation for real-world locations based on the WGRS specification.

A still further aspect of the invention involves a Location Name Server for use with a UGD having records for multiple entities, each entity record including a WGRS domain-name, like hierarchical address associated with location-related information for an entity. The Location Name Server includes a geocoding conversion engine for converting a street address or latitude/longitude coordinates to a WGRS address for accessing an entity UGD record based on the WGRS address, and converting a WGRS address to a street address or latitude/longitude coordinates.

Further features and advantages of the invention, as well as the structure and operation of various embodiments of the invention, are described in detail below with reference to the accompanying drawings.

BRIEF DESCRIPTIONS OF THE DRAWINGS

The drawings illustrate the design and utility of preferred embodiments of the present invention, in which:

FIGS. 8a-8b, 9, 10a-10c, 11 are examples of specific files used in one implementation of the subject invention.

DETAILED DESCRIPTION OF THE PREFERRED EMBODIMENTS

The present invention involves a Unified Geographic Database ("UGD") and method of creating, maintaining, and using the same through one or more Location Name Service. In a preferred embodiment of the UGD, each record of the UGD includes a unique, domain-name like hierarchical geographical referencing address that represents a real-world location for a business or other entity, serves as a discrete identifier for a database record in the UGD for accessing the record, and provides a user-friendly naming convention and interface for all types of electronic devices. In order to understand the importance of this domain-name like hierarchical geographical referencing address in the UGD, it is helpful to understand the basis for the hierarchical geographical referencing address, the World Geographic Referencing System ("WGRS") developed by Go2 Systems, Inc. ("Go2") of Irvine, Calif. A discussion of the WGRS is in U.S. Pat. No. 5,839,088, U.S. Pat. No. 6,047,236, and U.S. patent application Ser. No. 09/257,462, all assigned to Go2, and is generally set forth below in sections I-VI below. Section I describes an exemplary process for creating the WGRS. Section II describes the WGRS in use. Section III describes details and examples of WGRS Implementation. Section IV describes several exemplary applications of the WGRS. Section V describes some examples of software implementation related to the WGRS. Section VI describes an internet-based automatic location referencing system using the WGRS. The final section, Section VII, describes the UGD and exemplary methods for creating, maintaining, and using the same through the LNS.

I. World Geographic Referencing System

An embodiment of the WGRS or geographical referencing system will now be discussed. The WGRS allows a point of interest ("POI") within an arbitrary geographic area to be uniquely identified with a unique, domain-name like hierarchical geographical referencing address or locational address, and the locational address to be related to other known global referencing systems.

A. Creation of the World Geographic Referencing System

Figure 1:
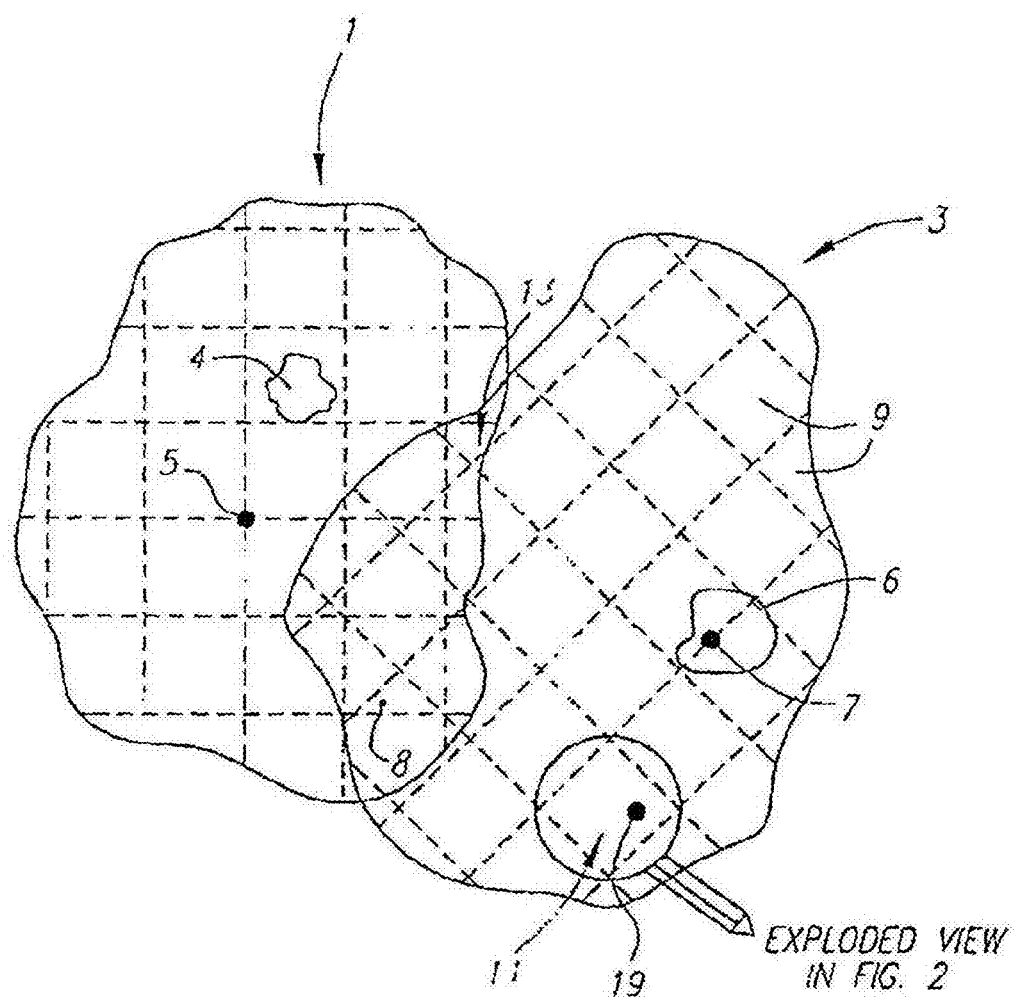
FIG. 1 shows two overlapping districts, each with a reference point and a grid system.

The WGRS is created by dividing a geographic area into several districts. The districts may be of the same or differing size and shape, and may contain a particular identifying feature. For example, the geographic area of the United States may be subdivided into numerous districts, which may be strategically located, sized, and named with reference to cities or other geographic or political features in order to associate the districts with such features. Advantageously, such districts are chosen relative to cities and other well-known landmarks and it is therefore convenient to name each district according to the city or landmark about which the district is located. In fact, each city may have a reference point, allowing local locations to be addressed relative to the local city. Preferably, the districts are square and all of the same size, e.g., 100 km.times.100 km, with overlapping portions of districts nested with each other. However, in alternative embodiments, sparsely populated areas may have larger districts, and densely populated areas may have smaller districts. The districts may also be quasi-rectangular, following latitude and longitude lines. In more densely populated areas, it is possible that a particular location will be within the boundaries of two or more districts. In addition, user-defined districts, reference points, and grid sizes are possible. For example, a search and rescue operation may establish a reference point and grid size convenient for a particular search area, or a group of hikers may choose a reference point and grid size appropriate for a particular outing. After the districts have been selected and named, a reference point is chosen for each district, and a grid system placed relative to the reference point. Advantageously, the grid system is referenced north. Referring to FIG. 1, a first district 1 and a second district 3 are defined relative to major cities 4 and 6 respectively. In this example, major city 4 in the first district 1 will be named CITYONE and the major city 6 in the second district 3 will be named CITYTWO. One or both of these cities 4, 6 could be local cities. For convenience, the first district 1 will be named CTY1, referring to the major city within that district's borders, and the second district will be named CTY2, referring to the major city within that district's borders. Reference point 5 is selected as the reference point for CTY1, and reference point 7 is selected as the reference point for CTY2. The reference point will not necessarily be located proximate to the feature used as the name for the district. Each reference point 5 and 7 has a known address within a global referencing system such as World Geodetic Systems (WGS). Association with a global system offers at least three important functions: first, local addresses may be easily converted to global addresses and vice-versa; second, inter-district relationships are established; and third, easy integration with known navigational systems is provided. Thus, an easy to use district-level addressing system retains the advantages of a global system without attaching complexity.

As can be seen in FIG. 1, the grid system about each reference point 5 and 7 creates cells 9 in each district. Each of these cells 9 is identified with a cell code, which advantageously is a two character number. The grid system is better understood when discussed in conjunction with an exemplary target POI location such as POI location 19 within the grid system. For example, the target POI location 19, which is in cell 11, can now be identified by a domain-name like hierarchical geographical referencing address or universal locational address ("ULA") referring to its district and cell code, e.g., CTY2-11. For example, if CTY2 is Los Angeles, the hierarchical address for the POI location 19 may read US.CA.LA.11, where "US" indicates that POI location 19 is in the United States, "CA" further indicates the POI location 19 is in California, "LA" further indicates the POI location 19 is in the Los Angeles grid, and "11" further indicates that the POI location is in cell code 11 of the Los Angeles grid. Of course, portions of the address such as "US.CA" may be removed from the address if this is self-evident or always understood so that the POI location 19 may be understood by the address LA.11. Although the address CTY2-11 or LA.11 lacks the resolution to identify a particular feature, such as a house, the address may be enough resolution to locate a lake or park. As will be discussed in more detail below, the POI location 19 can be addressed by further hierarchical sub-cell or sub-grid addressing to identify a particular feature, e.g., the POI location may be a house that may be specifically identified by the hierarchical address U.S.CA.LA.11.17.18.12. Thus, the hierarchical nature of the WGRS and the domain-name like addressing system based on the same allows multi-precision searches to be performed. The issue of increased resolution is discussed below.

Also, it is likely that there will be an overlap area 13 that is formed at the intersection of districts. Within this overlap area 13, any POI can be identified by reference to any district within which it is located. Thus, a target location 8 in the overlap area 13 can be identified by either association with the CTY1 or CTY2 districts, or any other district within which it is located. In the preferred embodiment, a locational system can provide a locational address relative to any reference point or district by simply toggling between reference points.

Although the grids 1, 3 are shown at an angle relative to one another, the grids 1,3 are preferably aligned with each other and overlapping cells 9 of relative grids such as those shown in overlap area 13 are nested so that they directly overlap or coincide with each other.

Figure 2:
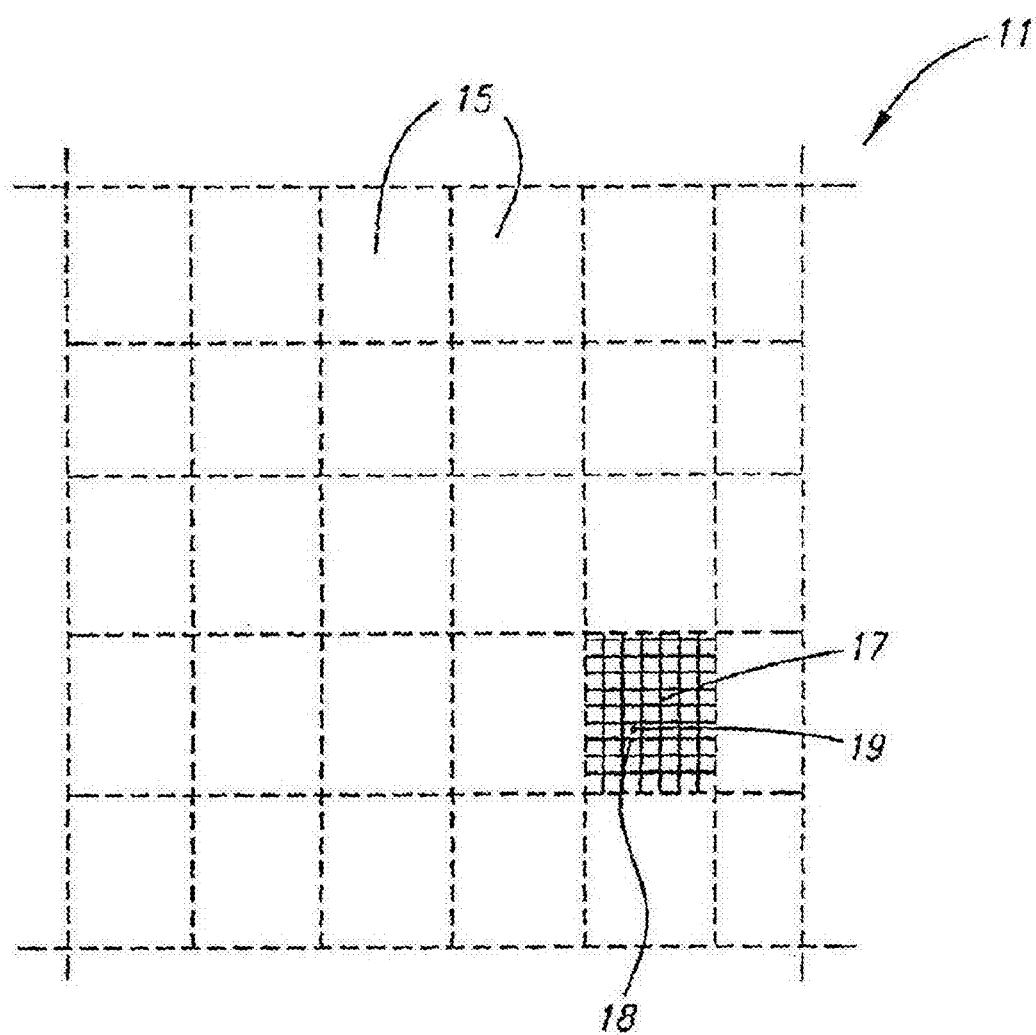
FIG. 2 shows a single cell of FIG. 1 with hierarchical gridding to increase the addressing resolution.

As discussed above, a district name and cell code may not give sufficient resolution to locate specific locations such as a house or business. To increase resolution, a hierarchical grid is applied to each cell 9 of FIG. 1. For example, cell 11 is shown in FIG. 2 with a sub-grid applied, producing sub-cells 15. Each of these sub-cells can be identified with a sub-grid code. Moreover, the sub-cells can be further subdivided to increase resolution. Here, sub-cell 17 is further subdivided. As can be seen in the figure, the target location 19 is within the sub-sub cell 18. Thus, to more definitively identify the target location 19, an ULA is formed from the highest resolution sub-cell defined and each of its parent cells. The locational address is formed by appending to the district name each sub-cell code in hierarchical progression, moving from lower resolution to more resolution. In the Los Angeles example here, the target location 19 would have a locational address of CTY2-11-17-18 or LA.11.17.18. Based on the size of the district, if this does not give the necessary resolution to properly locate the target location 19, then additional levels of gridding hierarchy can be added. Although, in this example, each cell was randomly named with a unique numerical code, it should be appreciated that a consistent Cartesian coordinate system can also be used, with each cell defined by an (X, Y) coordinate pair. Preferably, each cell is identified by an easting cell designator or X axis coordinate, paired with a northing cell designator or Y axis coordinate, with the easting cell designator as first number or letter in the pair and the northing cell designator as the second number or letter in the pair. Those skilled in the art will recognize several other alternative ways to define a grid system, some of which are described further below.

Advantageously, a city or landmark area will be named with a specific abbreviated name for purposes of navigating to and around that city or landmark area. That abbreviated name may also serve as the name of the defined district located about that city. Preferably, the grid established for each city or landmark area is preferably a constant 10×10 grid, 100×100 km, or 10,000 sq. km. and overlapping cells from overlapping city or landmark areas are nested so that cells directly overlap or coincide with each other. In an alternative embodiment, depending on the size of the city and various geographic, political, and other features relating to the city or region, the district for that particular city may be pre-defined with a particular grid size, although the system may allow altering the grid size for particular purposes. If, in the preceding example, the defined grid size for CTY2 is approximately 30 by 30 nautical miles, identifying two hierarchical grids produces a resolution of about 500 meters, which is sufficient for locating structures in open areas or large targets such as lakes or parks. By adding a third and fourth hierarchical grid, a resolution of about 5 meters is achieved, and by adding a fifth hierarchical grid, a resolution of about 0.5 meters is achieved. By adjusting the number of grids, then, the resolution of the resulting locational address is changed to meet the requirements of the particular area or user. Advantageously, similar to a domain name for a web address, each level of the hierarchical address is separated by a decimal point. Thus, an address may appear as "DISTRICT.12.34.56.78." Those skilled in the art will recognize several alternatives to this approach.

B. Alpha Codes

In a preferred embodiment, the above coding technique is extended to include standard alpha codes representing objects such as suites, floors, rows, columns, altitude, etc. These alpha codes are advantageously appended to the above code as they logically represent the highest resolution component. Thus, for example, suppose the above locational address of CTY2-11-17-18 represents an office building, then the address of CTY2-11-17-18-S101 represents suite 101 in the office building. Likewise, the address CTY2-11-17-18-F2 represents the second floor of the office building. In another example, the address CTY-11-17-18-R11-RW12-C22 represents row 12 column 22 in room 101 of the office building. This can represent an exact location within a particular rack in a warehouse, for example. In another example, the address CTY2-11-17-18-HS2200 represents a height of 2200 feet above sea level.

As can be appreciated by those skilled in the relevant art(s), this technique can be extended as much as required. Typically, a standard set of codes is defined for each specific implementation of the present invention. An example of such a set of codes that can be used in an embodiment of the present invention is shown below in Table 1.

TABLE 1

Example set of alpha codes and their definitions.

| Alpha Code | Definition |
|---|---|
| AL | AISLE |
| A | APARTMENT |
| AD | ADDRESS |
| BX | BOX |
| B | BIN |
| BY | BAY |
| C | COLUMN |
| CS | CASE |
| D | DOOR |
| DP | DEPTH |
| DY | DAY |
| EL | ELEVATOR |
| EN | ENTRY |
| E | ELEVATION |
| ES | ESCALATOR |
| F | FLOOR |
| FD | FIELD |
| GR | GARAGE |
| G | GATE |
| H | HEIGHT |
| HE | HEIGHT ABOVE ELLIPSOID |
| HG | HEIGHT ABOVE GEOID |
| HO | HEIGHT ORTHOMETRIC |
| HS | HEIGHT ABOVE SEA LEVEL |
| HT | HEIGHT ABOVE TOPOGRAPHICAL SURFACE |
| HU | HOUSE |
| LK | LOCKER |
| L | LEVEL |
| NO | NUMBER |
| PO | P.O. BOX |
| PH | PHONE |
| PN, PIN | PIN # |
| R | ROOM |
| RW | ROW |
| RD | ROAD |
| ST | STREET |
| S | SUITE |
| SC | SECURITY CODE |
| SN | SECTION |
| SE | SEAT |
| T | TIME |
| TR | TRAM |
| TN | TRAIN |
| TK | TRACK |
| U | UNIT |
| X | INTERSECTION |
| Z | ZIP CODE |

C. Proprietary Location Address

Figure 4:
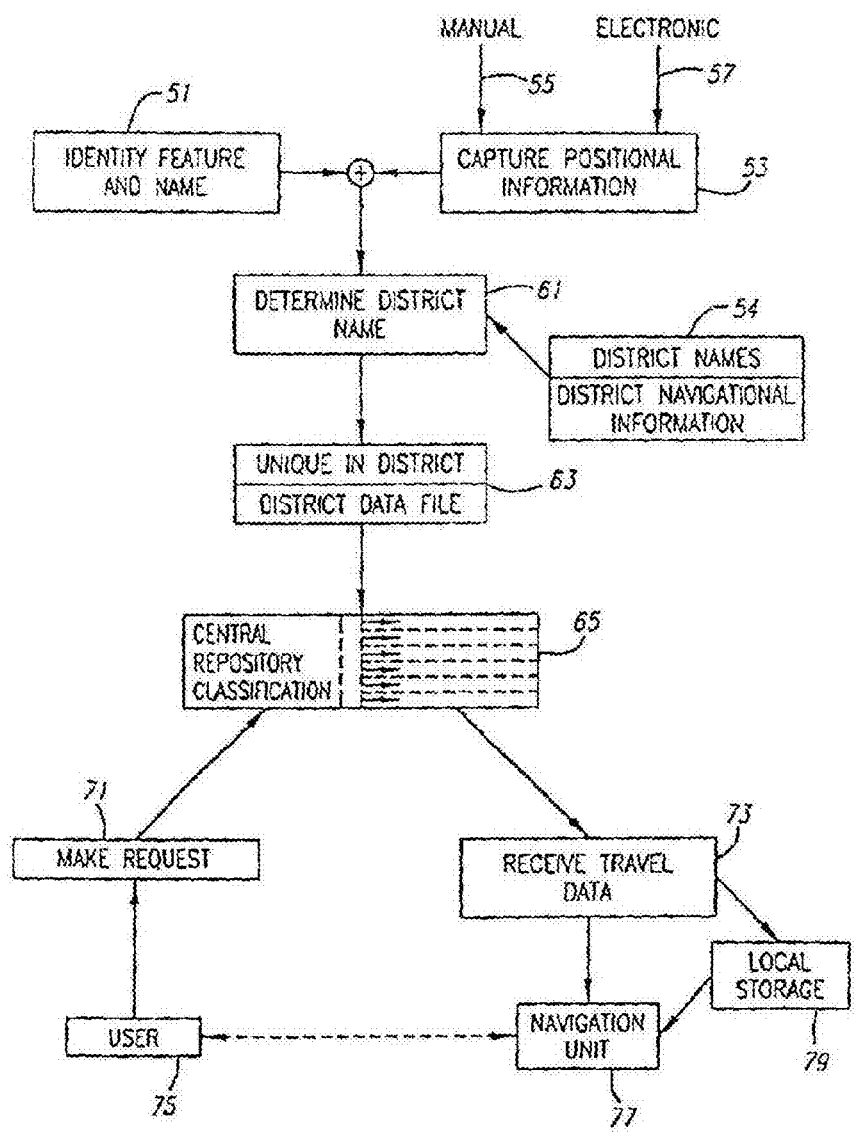
FIG. 4 shows how proprietary locational names are compiled and distributed.

The second way a point of interest may be designated in the subject invention, in addition to its ULA, is with a proprietary locational address ("PLA"). Referring to FIG. 4, the first step in using a PLA is to identify the feature and select a name 51. A PLA is a name chosen to identify a physical structure or location. The name can be chosen by the operator of a locational service, as in the case of naming national monuments, or the name can be chosen by individual or corporate users of the locational service. Individuals may even want to identify their homes using their own names. Thus, a Ms. Mary Smith may name her house MARY.SMITH.HOUSE, for example. Thus, when Ms. Smith wants to direct someone using a locational service to her house, she identifies her location using MARY.SMITH.HOUSE, rather than a street address or other locational referencing system. A corporation, too, may desire to allow customers to locate it using a common name rather than a less personal addressing system. For example, a nation-wide enterprise such as McDonald's® with many locations may choose a PLA that is associated with its trade name or product or otherwise allows users to easily remember and associate the establishments PLA. Abbreviations are useful as it keeps user input to a minimum, increasing safety, reliability, and convenience. Since the nation-wide enterprise may have many locations in a single metropolitan area, each may be identified by appending to the enterprise's PLA a unique identifier to identify specific branch offices or affiliates. Wildcard searching is also provided, allowing several locations of the known nation-wide enterprise to be found for a particular geographic area.

The capture of positional information for a certain name will now be described. Referring to FIG. 4, as indicated by identifying numeral 55, positional information could be entered manually, by, for example, inputting the ULA or coordinates of the location from a known mapping system. Alternatively, as indicated by identifying numeral 57, the positional information may be read electronically using a system such as the GPS. Referring again to FIG. 4, the name 51 and positional information 53 are associated. The district in which the location is identified is determined by comparing the positional information 53 to stored district locational information 54. Once the district is identified, the name is checked against other reserved names in the district to assure the selected name is unique. If the name is unique, it is placed in a district data file 63. As can be seen from the discussion above, uniqueness of the name need only be checked at the district level. Consequently, the same name can be present in different districts. The name must be unique at the district level as the district name usually becomes part of the PLA. For example, the nation-wide enterprise location in district CTY1 could have a full PLA of CTY1-TRADE NAME. If the owner of a name desires to more widely reserve a name, each district will be checked individually.

Once a PLA is approved for an individual, corporation, or other entity, the PLA may be placed in promotional material such as advertisements, coupons, billboards, or other means of communication. By providing a PLA that describes a feature, a particular location may be quickly identified and readily found.

Once cleared for conflicts, the name, positional information, and any other useful information are stored in a central repository location. This storage may be sortable and selectively downloadable by users of locational systems. For example, the central repository may be accessible via the Internet. In such a case, a user 75 would make a request for information 71 concerning future travel, such as the ULAs or PLAs of specific desired waypoints of a trip. The information in the central repository 65 is selected and sorted, and the travel data 73 is received by the user, creating a travel profile. To ease the data selection process, the central repository may store preferences for the user. After receiving the travel profile, the user places the travel data 73 into a navigational unit 77, augmenting information 79 already locally present in the navigational unit 77. The user 75 may then use the travel data 73, including PLAs and ULAs, to assist in navigating.

II. Method of Using World Geographic Referencing System

The WGRS will now be described in use. Initially, the process for determining a WGRS address will be discussed, followed by the process for converting between WGS and WGRS addresses.

A. WGRS Address Determination

Figure 3:
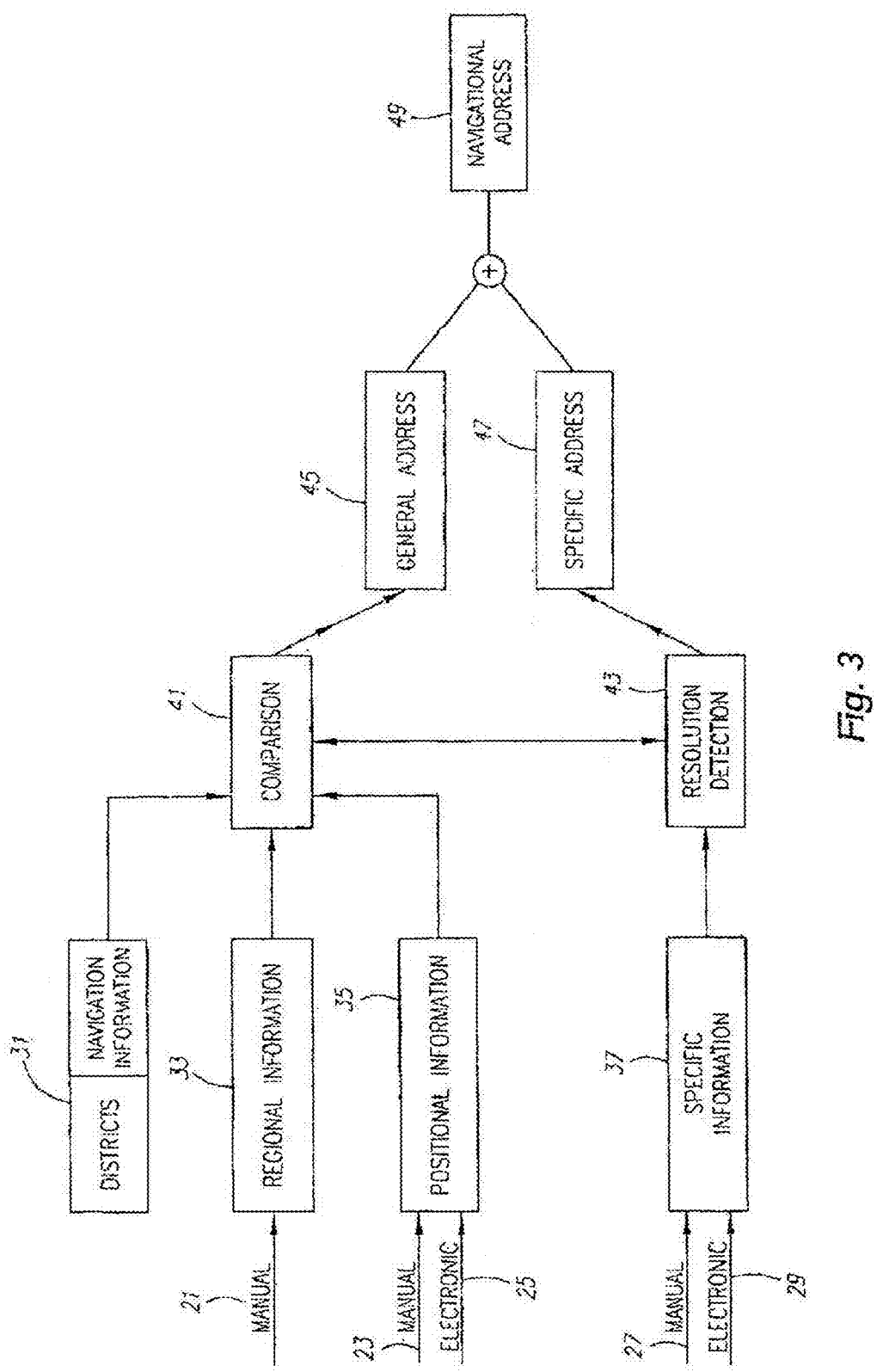
FIG. 3 is a functional diagram of a preferred embodiment of the invention.

Use of an ULA in a navigation system and an exemplary method for WGRS address determination will now be described. Referring to FIG. 3, district file 31 is maintained correlating district names and locational information relating to those districts. Regional information 33, that may be manually entered (as indicated by reference numeral 21) by a user, may also be maintained. This regional information 33 is used by the system to reduce the amount of information a user must enter to identify a particular location. The regional information may, for example, be a map code or distinct name identifying the general area covered by the map. Alternatively, it may be the name of a district having a pre-defined grid. After the map code or district name is inputted as regional information, the system now assumes that any future user inputs are within the geographical area defined by the regional information, thus reducing the complexity of inputting future addresses referenced on that map. Also, positional information 35 of a current location may be input manually (reference numeral 23) or electronically (reference numeral 25) for the same purpose. By knowing the present location, the system may assume that any subsequent address input by the user is within the same geographical area as the present location. Again, the purpose and effect is to reduce the complexity of inputting locational addresses.

The user may also electronically (reference numeral 29), or manually (reference numeral 27) input a specific address 37 to the system. By comparing the regional information 33 and positional information 35 of the current location with the stored district information 31, a general address can be formed. This general address will contain the district name plus any cell and sub-cell codes that are more general than the most general code in the specific address. The resolution detector 43 attempts to determine how much resolution is represented by the specific address 37 input by the user, and in conjunction with the comparison 41 function, creates a general address 45 with the correct level of resolution. Again, it is assumed that any subsequent addresses input by the user are within the same geographical area defined by this general address.

Once the resolution of the specific information 37 is determined, the specific information 37 is passed on to become a specific address 47. This specific address 47 is appended to the general address 45 formed above to form the final locational address 49. The locational address 49 is then used by the navigational system to assist in navigation. Additionally, an emergency mode may be provided in which a present location is automatically referenced to any reasonably close PLA or other known location.

B. WGRS Address and WGS Address Conversion

A relationship with World Geodetic System 1984 ("WGS-84"), allowing locational addresses to be converted to other global addressing systems, is also provided. A further description of the district grid is needed to understand this relationship. Each district has a reference point, with the reference point being the approximate center of the city used in naming the district. A grid is placed in relation to the reference point such that the origin of the grid is aligned with the nearest intersection of latitude and longitude lines corresponding to the largest grid resolution in the district. Since the reference point has a known WGS-84 address, by knowing the origin offset, the district rotation, and the district scale, every WGRS ULA can be translated into a WGS-84 address, and from there into nearly all locational reference systems. Conversely, every WGS-84 address may be translated into one or more WGRS ULAs. The translation is simplified in the subject invention as the district grid system is generally aligned with the WGS-84 latitude/longitude grid.

C. Use of the WGRS in a Navigation System

Figure 5:
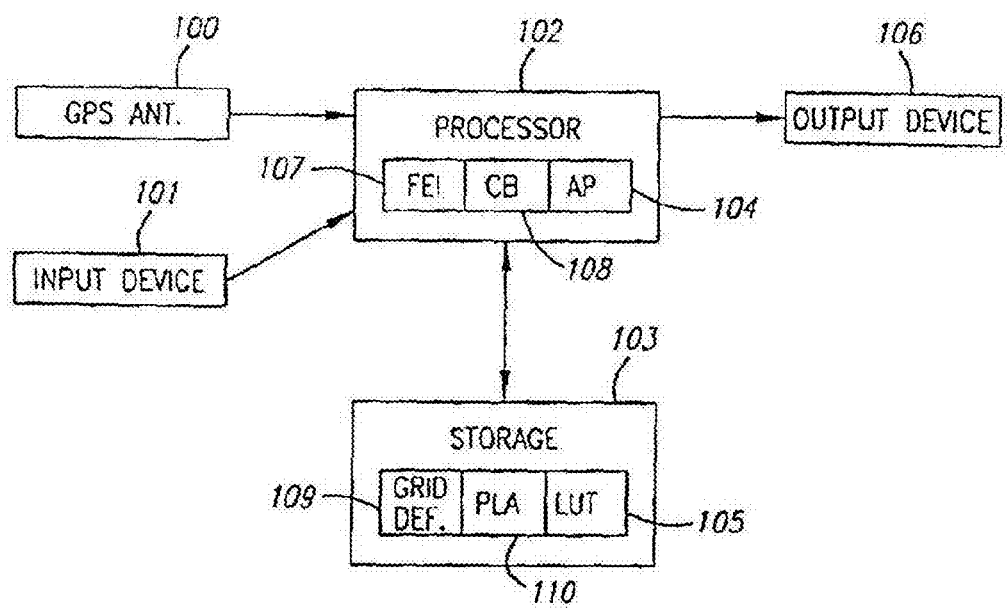
FIG. 5 is a diagram of a navigational system incorporating one or more aspects of the subject invention.

The aspects of the WGRS may be performed locally such as in a mobile navigation system or remotely such as at a remote serve. With reference to FIG. 5, aspects of the WGRS will described in conjunction with a mobile navigation system. An exemplary navigational system comprises a GPS receiver 100, an input device 101 such as a keypad or the like, a processor 102, a storage device 103 such as RAM or ROM, and an output device 106 such as a display. The GPS receiver 100, input device 101, storage device 103, and output device 106 are all coupled to the processor 102 as shown. An application program 104 executes in the processor to perform various tasks. Optionally, a look-up-table (hereinafter "LUT") 105 is provided in the storage device 103.

The application program in a conventional navigational apparatus typically interfaces with and directs the aforementioned elements to perform the following tasks:

1. Displays the latitude and longitude (hereinafter "lat/lon") of the unit—First, the GPS receiver receives signals from the GPS satellite constellation, and calculates the location of the unit (in terms of lat/lon) using these signals. The lat/lon coordinates of the unit are then displayed on the output device 106.

2. Displays velocity and bearing—if the unit is moving, the processor determines the location of this unit at selected time intervals, and based thereon, determines velocity and bearing. Once determined, this information is displayed on the output device 106.

3. Allows for the selection of waypoints—In one approach, a user inputs waypoints through input device 101 in terms of lat/lon coordinates. In another approach, common in the aviation community, a look-up-table or the like, identified with numeral 105 in FIG. 5, is provided, correlating pre-determined waypoints with lat/lon coordinates. A capability for searching through the database and selecting particular waypoints is also provided in this approach.

4. Displays distance and bearing from selected waypoints—once the waypoints have been determined, the distance (assuming straight line) and bearing from these waypoints is determined and displayed.

Additional components of the system which are added by the subject invention include context buffer 108; front-end interface (hereinafter "FEI") 107; PLA database 110; and a database(s) 109 of grid definitions.

A critical function of the front-end-interface is to convert ULAs and PLAs into lat/lon coordinates. Consequently, a user can input waypoints in terms of ULAs or PLAs, and the FEI will convert the same to lat/lon coordinates for use by the unit in determining a directional and/or distance indicator (such as distance and bearing) from the waypoints. Additionally, positional information defined in terms of lat/lon coordinates can be displayed in terms of one or more ULAs of the subject invention. The FEI also includes various searching capabilities to allow a user to search through the PLA database 110 for particular waypoints or waypoints with particular characteristics.

The function of the context buffer 108 is to define the current district and grid in which grid addresses are assumed to be defined.

The grid definition file(s) 109 specifies all the grids which have been defined to date. For each grid, all the parameters necessary to define the gird are stored. Such information includes the lat/lon coordinates of the reference point of the grid, the dimensions of the grid, and the rotation and scaling of the grid cells. Thus, all the information needed to convert between a grid address within the grid and lat/lon coordinates is provided.

The PLA file 110 is a file which for each district correlates each PLA which is unique to and has been reserved for use in the district with its corresponding grid address.

The navigational system described above may be mounted in a vehicle or contained in a portable device, for example. Additionally, the navigational system may stand alone or may be integrated into existing devices, such as portable phones. Further, the subject invention may be incorporated into a general computational device such as a microprocessor. Since the physical manifestation of the navigational system is so flexible, there are numerous foreseeable applications.

III. Details and Examples of WGRS Implementation

The examples set forth below describe various details of various implementations of the WGRS. Examples 1, 1A, 2, and 3 demonstrate specific implementations of one embodiment of the invention: Example 1 demonstrates the use of Hierarchical Identifiers for districts which are correlated with Country, State/Province, and City districts along with PLAs and a purely numeric ULA grid referencing system based upon a district grid size of approximately 100 kilometers from north to south or approximately 100 miles (185 kilometers) north to south. Example 1A demonstrates an alternative means that can be used to implement the city grid based on the Transverse Mercator projection system. Example 2 demonstrates the use of the Hierarchical Identifiers described in Example 1 along with an alternating alpha-numeric ULA grid referencing system. Example 3 demonstrates the use of a smaller City Grid and the resulting higher precision at various grid levels.

A. EXAMPLE 1

Hierarchical Identifiers for Country, State/Province, City

The example assumes the existence of higher levels of hierarchical codes for identifying countries, states/provinces, and cities. The top level codes can be used, implied by context, or specifically ignored by the use of dots (periods) to make it clear how many codes have been omitted. A code of 'US.CA.LA' might be represented as 'LA,' ' . . . LA,' or by 'CA.LA,' depending on the geographic context or the need for clarity.

In all cases, upper level codes are dropped when the geographic context is clear, to prefix with dots (periods) when necessary to insure clarity, and to append lower levels to add precision.

Country Codes

Top level: two alpha character mnemonic (possibly based on Internet domain codes).

Examples:
United States=US
Australia=AU
Canada=CA

State/Province Codes

Second level: two character mnemonics (advantageously based on US postal codes within the US).

Examples:
California=CA
New York=NY

City Codes

Third level: two or three alpha character mnemonics from city name unique within each state.

Examples:
Carbondale=CAR
Hartford=HAR
Los Angeles=LA
New York City=NYC

Proprietary Codes

Fourth level: one or more alpha or numeric characters which are unique within a specific grid or map with a unique map code.

Examples:
MACD, DISNEY, EXXON, etc.

An example of a use of a PLA might be US.GA.ALB.MACD to refer to a MacDonalds in Albany, Ga.; US.GA.ALB.MACD* to refer to the closest(s) one in Albany, Ga.; or MACD* to refer to the closest(s) ones in any city.

The code . . . ALB.MACD* could refer to either the nearest MacDonalds in Albany Ga. or Albany N.Y. and context. . NY.ALB.MACD* would resolve the context.

City Grid

This optional code is at a fourth or fifth level; identified by the first use of a pair of numeric characters in the city grid code. The city grid system requires an approximate city centroid described in a locational reference system such as geodetic latitude and longitude and the meaning of each pair of grid designators. The city grid origin is defined at the southwest coordinate system intersection value corresponding to exact values of the largest grid resolution precision that is defined in the city grid, placing the district centroid within the center grid cell of the system.

In the nominal city grid system, the grid cells are orthogonal to the defining coordinate system; however, rotations and scale parameters can be used to re-define the relationship between the city grid and the reference frame. False easting and false northing offsets (translations) are normally used to avoid negative numbering or to allow convenient ordering of alphanumeric designators.

Conversion from the defining reference frame (e.g., lat/lon) to city grid designators (i.e., ULAs) is accomplished by computing conversion constants based on the initial reference frame and the specific city grid definitions. When geographic context has already been established, grid designators are computed with respect to the currently selected district. When no district has been selected as the preferred one, the nearest district centroid is used as the basis for the grid designators. Conversion from city grid to coordinates in the defining system is accomplished by applying translation (and when applicable rotation and scale) parameters to the succession of grid designators until the precision implied by the number of grid cell designator pairs is reached.

The city grid is nominally based on a locational reference system that can be tied to other reference systems. In the nominal system, the underlying locational reference system datum is the World Geodetic System 1984 (WGS-84). Geodetic coordinates with respect to this datum can be converted to coordinates in a large number of other reference systems, allowing the city grid designators to be used with respect to other systems and other geodetic data allowing conversion to Universal Transverse Mercator (UTM) systems, State Plane Systems, National Grid Systems, other horizontal coordinate system, or map projection.

The city grid origin is defined at the ten minute of latitude and ten minute of longitude intersection nearest the city centroid. This places the origin within five minutes of latitude and longitude of the city centroid. The radial distance of the city grid origin is then always within about 10 km of the nominal city center.

Each grid is then defined based on this origin by placing a grid centered at the origin with a false easting and northing=halfway between minimum and maximum numeric characters. Grid cells are identified by an easting cell designator paired with a northing cell designator with successive pairs of designators defining grid cells of increasing precision.

Highest level; least precision two numeric characteristics, East is always first, North is always second, minimum is always 0 and maximum is always 9.

The false easting puts the division between 4 and 5 at the grid origin north and east. Each highest level grid consists of a ten by ten region (100 grid rectangles).

Next lower level; higher precision, divides each numeric grid into a ten by ten grid (100 grid rectangles) area. East is always first, north is always second. Minimum is always 0 and maximum is always 9.

The false easting again puts the grid rectangle center at the division between 4 and 5.

Next lower levels repeat the numeric code above dividing each higher grid rectangle into a ten by ten rectangle area.

If each city grid origin is at an integer intersection of an even ten minutes of latitude and longitude, the first level numeric grid rectangles each cover an area of approximately 100 square kilometers with grid cells whose north-south extent is about 10 kilometers. Thus the entire set of first level grid cells covers a distance of about 100 kilometers from north to south and a shorter distance from west to east, depending on latitude. Alternatively, if it is preferred to establish the city grid system in miles, the first level numeric grid rectangles each cover an area of approximately 100 square nautical miles, or about 343 square kilometers with grid cells whose north-south extent is about 18.5 kilometers. Thus the entire set of first level grid cells covers a distance of about 185 kilometers from north to south and a shorter distance from west to east, depending on latitude.

Each second level city grid cell is $1/10^{th}$ of the next higher level grid cell, or 1 minute of latitude and longitude, about 1 km north to south, or, in a miles city grid system, 1850 meters north to south.

Each third level city grid cell is then $1/10^{th}$ of the second level grid, or 6 seconds of latitude and longitude, about 100 meters north to south, or, in a miles city grid system, 185 meters north to south.

Each fourth level city grid cell is then $1/10^{th}$ of the third level grid, about 10 meters north to south, or, in a miles city grid system, 18.5 meters north to south, around 340 square meters.

Since this fourth level grid corresponds to a resolution some five times more precise than un-aided GPS accuracy (with Selective Availability), a fifth level grid may not be required. Following the same $\frac{1}{10}^{th}$ rule as the higher level grids, a fifth grid cell would measure 1 meter on a side, or, in a miles city grid system, 1.85 meters on a side, well within the accuracy of differentially-aided GPS.

Cities close to each other can each employ their own city grid even when they overlap. When questions of which city grid occur the city code (or all the higher level codes) can be attached to remove ambiguity.

An example of a use of an ULA might be US.GA.ALB.13 to refer to an area, in a miles city grid system, about 20 kilometers wide southwest of the center of Albany Ga. Then ..ALB.13.78 would refer to an area about 2 kilometers wide near the northeast corner of the previous example. So would .13.78 if the geographic context was established as Albany Ga.

The code .US.GA.ALB.13.78.27.14, in a miles city grid system, would refer to the smallest unit of about 9 meters within an explicitly defined place. ..78.27.14 would refer to the same place in context.

B. EXAMPLE 1A

In addition to the example above which demonstrates one means for implementing the city grid, this example describes an alternative means for implementing the city grid based on the Transverse Mercator projection system.

In a preferred implementation a conventional map projection/coordinate system grid is selected. While Lambert Conformal Conic, Stereographic, or local tangent plane system might well be used, in this example, the Transverse Mercator (TM) projection is selected. The TM projection is preferred over other projections suitable for use in local mapping systems because it is most likely an available projection in many GIS and GPS platforms.

To make city centroid selection less contentious an issue, one preferably uses lists of centroids from the Digital Chart of The World (VMapO) or other sources and moves them to arbitrary points that are defined in controlled lists. In order to remove the slight differences in city centroids from different lists, and to standardize the method of fixing the preferred list, the city grids are centered at the nearest 0.05 degrees of latitude and longitude, assuring that the "centroid" is always within the 55 first level cell, and always within about 5.5 km of the center of the grid. This use of decimal degrees rather than values in minutes makes internal computations easier and less subject to complex issues such as repeating fractional values (i.e. 50 minutes=0.8333333333 . . . degrees).

In this example, the city grids are Transverse Mercator grids with the following characteristics:

Origin latitude and longitude "snapped" to the 0.05 degree increment south-west of the city centroid.

Scale at the origin=1.0

False easting 50,000 meters

False northing 50,000 meters.

Normal TM projection formulas as documented in Snyder (1987) and used in almost everyone's TM routines.

The grid cells for all level grids start at 00 in the south-west corner, increasing to 99 at the north-east corner following this simple pattern:

| 09 | 19 | 29 | 39 | 49 | 59 | 69 | 79 | 89 | 99 |
|----|----|----|----|----|----|----|----|----|----|
| 08 | 18 | 28 | 38 | 48 | 58 | 68 | 78 | 88 | 98 |
| 07 | 17 | 27 | 37 | 47 | 57 | 67 | 77 | 87 | 97 |
| 06 | 16 | 26 | 36 | 46 | 56 | 66 | 76 | 86 | 96 |
| 05 | 15 | 25 | 35 | 45 | 55 | 65 | 75 | 85 | 95 |
| 04 | 14 | 24 | 34 | 44 | 54 | 64 | 74 | 84 | 94 |
| 03 | 13 | 23 | 33 | 43 | 53 | 63 | 73 | 83 | 93 |
| 02 | 12 | 22 | 32 | 42 | 52 | 62 | 72 | 82 | 92 |
| 01 | 11 | 21 | 31 | 41 | 51 | 61 | 71 | 81 | 91 |
| 00 | 10 | 20 | 30 | 40 | 50 | 60 | 70 | 80 | 90 |

Each Level 1 grid cell covers a 10 km by 10 km square region on the ground;

Each Level 2 grid cell covers a 1 km by 1 km square;

Each Level 3 grid cell covers a 100 meter by 100 meter square;

Each Level 4 grid cell covers a 10 meter by 10 meter square;

The grid cells are exactly these distances north-south and east-west of the center of the grid.

The scale factor of 1.0 at the grid origin means that largest distance error is less than 4 meters over the extent of the grid.

As an example using the US.DC.WAS grid, the ellipsoidal distance from southwest corner to northeast corner is 141419.494 meters. Computed using the TM grid as though it was orthogonal one would compute a range using the Pythagorean theorem of 141421.356 meters, a difference of 1.862 meters.

These grids then can be used for very accurate distance estimates as well as making their use with any existing map quite simple. In addition, it should be noted that the grid cell designators can be easily computed from the output of any existing TM routine (such as those found in GPS receivers for user grids) using the TM parameters. For instance the position of the Smithsonian Institution in TM eastings and northings is:

52072.6 East and 48736.0 North.

The grid designators are simply extracted from the powers of ten one digit at a time, east followed by north as:

54.28.07.73 for ten meters, or 54.28.07.73.36 for a one meter level grid.

To put a grid designator value into a TM conversion, one makes easting and northing values from the grid designator in the same way.

For instance a random designator of:

39.12.46.15.53, results in: 31415 meters Easting and 92653 meters Northing or 39.12.46, results in: 31400 meters Easting and 92600 meters Northing.

C. EXAMPLE 2

In addition to the example above which demonstrates the logic and structure of the XYZ.12.34.56.78 format, this example describes the use of a grid format and ULA utilizing the XYZ.12.aa.34.aa format. The Country, State/Province, City and Proprietary Codes remain as described in the previous example, but the optional City Grid is structured differently. The grid code is still initially identified by a pair of numeric characters, and the city grid origin is defined at the ten minute of latitude and ten minute of longitude intersection nearest the city centroid as in the previous example. The definition of each grid and the false easting and northing, as well as the structure of the first grid level, is also as described in the preceding example.

The next lower level of the grid divides each numeric grid into a twenty by twenty grid (400 grid rectangles) area. East is always first, north is always second. The minimum is A from a character set consisting of ABCDEFGHJKLMN-PQRSTUV, and the maximum is V. The false easting puts the grid rectangle center at the division between K and L.

The next lower level repeats the numeric code as described in the preceding example dividing each higher grid rectangle into a ten by ten rectangle area, and the next lower level repeats the alpha code described above in this example dividing each higher grid rectangle into a twenty by twenty rectangle area.

If the city grid is the same size as the preceding example, each second level city grid square (represented by the code XYZ.12.aa) is $1/20^{th}$ of the first numeric grid square, 30 seconds of latitude and longitude, or about 920 meters north to south. The third level city grid square (represented by the code XYZ.12.aa.23) would result in a grid rectangle size of approximately 3 seconds of latitude and longitude, or about 92 meters north to south. The fourth level city grid square (represented by the code XYZ.12.aa.23.aa) would be $1/20^{th}$ of the previous city grid square size, resulting in a grid rectangle size of approximately 0.15 seconds of latitude and longitude, or about 5 meters north to south.

It should be appreciated that it is possible to define embodiments in which these higher level portions are defined in terms of either numeric or alpha characters, or alternatively, in terms of mixed alpha and numeric characters.

D. EXAMPLE 3

This example demonstrates the different precision achievable by varying the size of the city grid of a particular district. This example uses a sample city grid designator "US.TX.AUS.45.45.77.45," with a district centroid of 30 degrees, 17 minutes north latitude and 97 degrees, 45 minutes of west longitude for an Austin, Tex., city grid district with a district designator, "US.TX.AUS." For a city grid easting and northing resolution of 1 minute of latitude and longitude for the largest resolution grid designator pair, the grid origin would be placed at 30 degrees, 17 minutes north latitude and 97 degrees, 45 minutes west longitude.

For numeric city grid designators with no rotation or scale, and with a false easting and northing of five grid cells, the designator "US.TX.AUS.45.45.77.45" would correspond to a geodetic position of 30 degrees, 15 minute, 45.0 seconds north latitude, and 97 degrees, 45 minutes, 15.0 seconds west longitude. The precision of the smallest grid cell would be one thousandth of a minute of latitude and longitude corresponding to approximately 1.6 meters of easting and 1.9 meters of northing. By reducing the number of designator pairs the precision of the implied geodetic position is also reduced. In this example, a designator of ".TX.AUS.45.45" would refer to an area one tenth of one minute of latitude by one minute of longitude in area or approximately 185 meters north to south; ".AUS.45.45.77" would refer to an area one-hundredth of one minute by one-hundredth of one minute, or approximately 18.5 meters north to south.

IV. Exemplary Applications of WGRS

Set forth below are several exemplary applications of the WGRS. Examples 4 through 7 reflect situations in which the invention may be used and provide marked improvements in function and utility over traditional lat/lon based systems. Example 8 demonstrates certain aspects of the invention related to a particular geographic area and two maps of partially overlapping areas.

A. EXAMPLE 4

The subject invention may be used for general vehicular navigation, to drive from Los Angeles to the Visitors Center at the Grand Canyon. The driver must first determine the address for the target location, and then input the address into the navigational system. There are several alternatives for locating the PLA or ULA. For example, the driver may read travel brochures that contain the ULA/PLA addresses; the driver may also review a map which contains ULA/PLA annotations; or the driver could just call the Visitors Center and ask them for their PLA or ULA. Alternatively, the driver, using the input device, could search the PLA database to find if the Grand Canyon Visitors Center has a PLA. Once the address is determined, the driver enters the PLA or ULA address into a navigational system, and the navigational system will direct the driver to the proper destination.

B. EXAMPLE 5

Second, the subject invention may be used to direct local traffic to a particular point of interest. For example, if the driver above is traveling along a highway and becomes hungry and desires to eat at a particular fast-food chain, the driver could interrogate the system data to find any nearby chain restaurants. The driver simply queries the navigational system for occurrences of the fast-food chain's PLA, and, since the navigational system is aware of its current location, the chain's restaurants may be listed by proximity. The driver simply selects one of the restaurants, and the navigational system directs the driver to that location. Additionally, a local restaurant may advertise an ULA or PLA for its location, so a driver, seeing a billboard or advertisement containing an ULA or PLA address, could input that address and be directed to the restaurant location. Because of the unique style of the addresses and features of the subject invention, these addresses are particularly easy to input with a minimum chance of error, decreasing the risk of accidents and increasing the likelihood of going to the desired location.

C. EXAMPLE 6

Third, the subject invention is particularly well suited for customization by individual or team users, facilitating intragroup communication and navigation. For example, if a group of hikers desires to split up and explore a particular area, they each could set their portable navigation devices to reference a custom grid with an appropriate grid size and location for the explorable area that allows sufficient resolution with a minimum number of digits or characters. Now, as the hikers communicate with each other or record interesting locational information, the data may be easily and accurately used and referenced to a meaningful location. This ability to set a user-defined reference point and grid size would also be useful for rescue teams performing search and rescue operations by allowing the search and rescue team to instantly establish a grid size and location for any search.

D. EXAMPLE 7

Fourth, the subject invention has emergency utility. For example, if a hiker above needs emergency assistance, the navigational system can provide a locational ULA that is easy to read and communicate by voice or numeric only key pad, which reduces both the ambiguity, risk and time involved in describing an emergency location. Alternatively, this ULA may be automatically communicated to emergency personnel if the navigational system integrates with a portable phone, two way pager, or other portable communication device.

E. EXAMPLE 8

Figure 6:
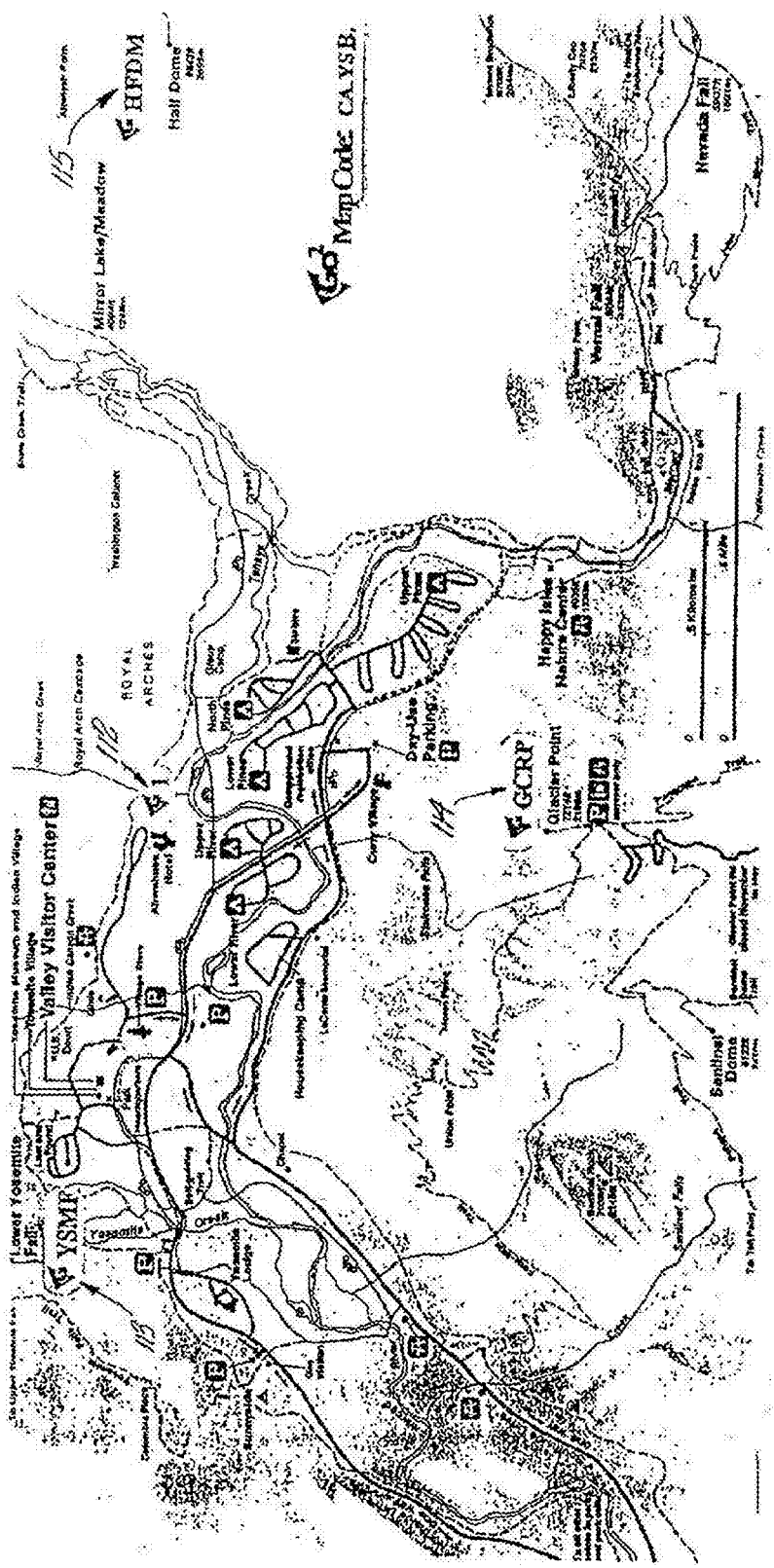
FIGS. 6 and 7 show the use of PLAs and ULAs in a specific geographical context.

An example illustrating the use of PLAs and ULAs in a specific geographical context, Yosemite National Park, will now be described. FIG. 6 illustrates a paper map with an assigned name of CA.YSB (indicated by identifying numeral 111). Within the boundaries represented on this map, the following PLAs have been reserved:

| PLA | Description of Location | Corresponding FIG. 6 identifying numeral |
|---|---|---|
| HFDM | Half Dome | 115 |
| 1 | Ahwahnee Hotel | 112 |
| GCRP | Glacier Point | 114 |
| YSMF | Lower Yosemite Fall | 113 |

Figure 7:

FIG. 7 illustrates a district with an assigned name of CA.YSM (indicated by identifying numeral 120). Within this district, the following PLAs have been reserved:

| PLA | Description of Location | Corresponding FIG. 7 identifying numeral |
|---|---|---|
| HCHY | Hetch Hetchy | 121 |
| 11 | White Wolf | 122 |
| NENT | Big Oak Flat Entrance | 123 |
| GCRP | Glacier Point | 126 |
| WENT | Arch Rock Entrance | 124 |
| BDGP | Badger Pass | 125 |
| 1 | Wawona Information Center | 128 |
| SENT | South Entrance | 127 |

The following points should be noted from this example:

First, the name CA.YSB is for the specific map included in FIG. 6, and not for a district in which all of the area contained on the map is included. This feature allows assignment of specific PLAs for specific maps without regard to the district, thereby providing clarity in situations where the area covered by the map overlaps one or more districts.

Second, the name CA.YSM is the name of the district in which the area included in the map in FIG. 7 is located, thereby allowing areas included within this map to be referenced by either PLAs (e.g. CA.YSM.HCHY) or ULAs (e.g. CA.YSM.32.84.23.43) without the need to re-identify the name of the district or map.

Third, the areas covered by the CA.YSM district and the CA.YSB map overlap, allowing PLA references to either the YSM district or the YSB map. (Note also that the system might also define YSB as a district which could be utilized in determining ULAs with reference to the YSB district, in which case the YSB and YSM districts would also partially overlap). Fourth, the PLAs for particular locations may either be identical except for the district name (e.g. GCRP in FIG. 6 and GCRP in FIG. 7 refer to the same location) or identical PLAs may apply to different locations in different districts or on different maps (e.g. "1" in FIG. 6 and "1" in FIG. 7 refer to different locations on each of the respective maps). This is consistent with the principle that a PLA need only be unique within the district in which it is defined.

All of the features described in this example are designed to allow an initial manual or electronic input (either a district code, cell code, or specific map code) which allows users to use PLAs or ULAs identified on a specific map with a minimum number of keystrokes, thereby minimizing data entry, confusion, and ambiguity.

V. Examples of Software Implementation

Examples 9, 10, and 11 demonstrate certain characteristics of files, pseudo-codes, and program screens of particular embodiments of the invention. (Note that the data contained in the files is provided for illustrative purposes only).

A. EXAMPLE 9

In this example, formats of specific files that are used in one implementation of the subject invention are described. Four files are described: GO2CITY.DAT, STATES.DAT, PROPGO2.DAT, and COUNTRYS.DAT.

The GO2CITY2.DAT file, illustrated in FIGS. 8a-8b, defines the reference points for a plurality of pre-defined districts centered around specific cities. For each reference point, there is provided the name of the district, the name of the reference point, and the global coordinates of the reference point. Thus, the first entry of this file "AK, ANC, Anchorage, 149W54, 61N13," indicates that there is a district in the state of Alaska centered around Anchorage, with the reference point thereof having the following global coordinates: 149W54,61N13.

The STATES.DAT file, illustrated in FIG. 9, simply defines the mnemonics used in GO2CITY2.DAT to define states.

The PROPGO2.DAT file, illustrated in FIGS. 10a-10c, defines the proprietary names which have been reserved for each district. This file correlates each such proprietary name with the global coordinates associated with that name. Thus, the first entry of this file, "US.CA.NWB.MAC2, 117W52.360, 33N39.549" indicates that, in a district centered around Newport Beach, Calif., there is a McDonald's® having the following global lat/lon coordinates address: 117W52.360, 33N39.549.

The COUNTRYS.DAT file, illustrated in FIG. 11, simply defines the country mnemonics used in PROPGO2.DAT.

B. EXAMPLE 10

Figure 12A:
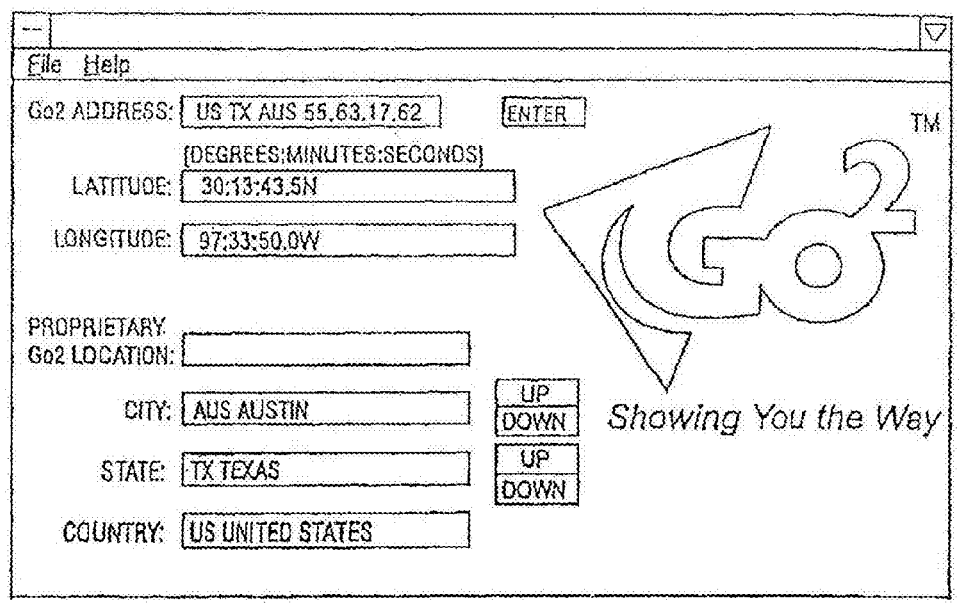
FIGS. 12a-12c are examples of screen outputs used in one implementation of the subject invention.
Figure 12B:
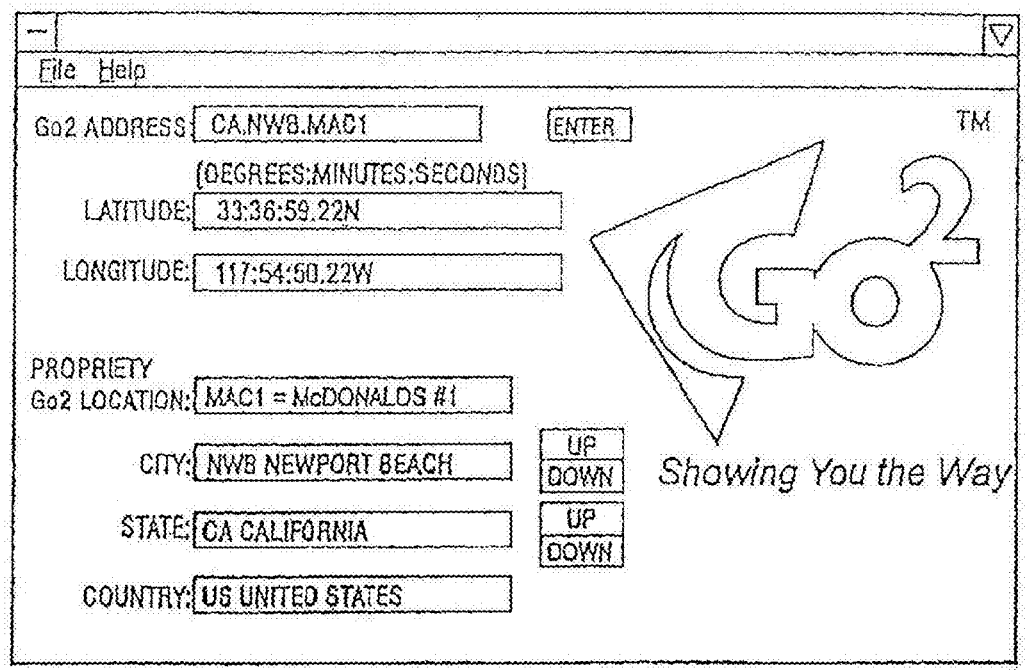
Figure 12C:
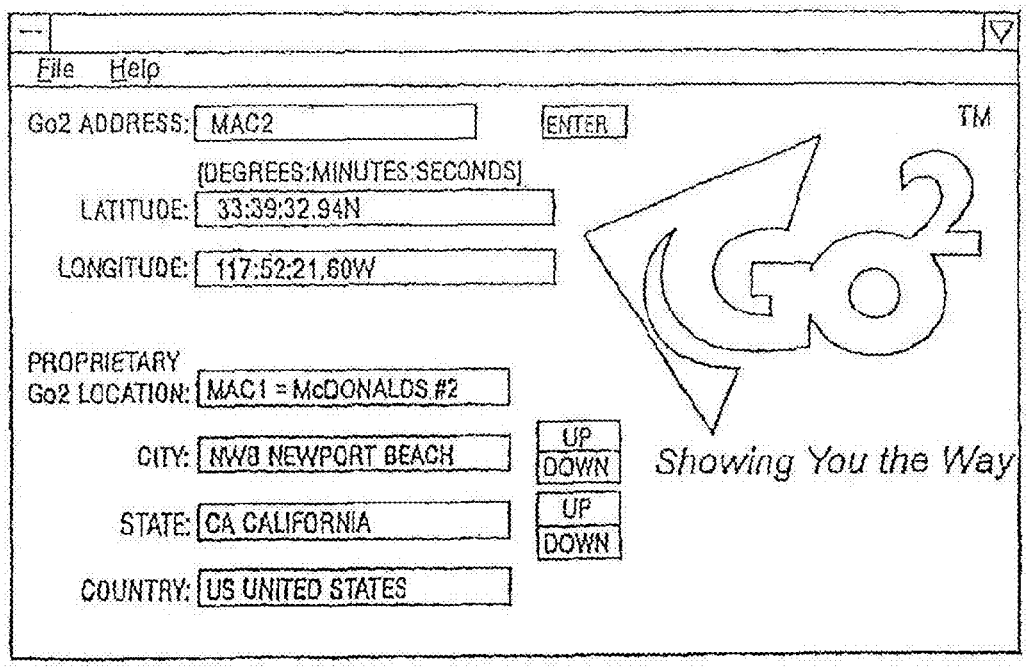

This example illustrates screen formats as displayed on an output device in an implementation of the subject invention. FIG. 12a is a screen illustrating the input of an ULA or grid address into a navigational system, with the system determining and outputting corresponding latitude and longitude coordinates. FIG. 12b illustrates the input of a PLA, with the system determining and outputting corresponding latitude and longitude coordinates. FIG. 12c illustrates the capability of the system to interpret the context, i.e. district address, of previous addresses, and to assume that the same distinct addresses applies to subsequent specific addresses until notified otherwise. In this specific example, the proprietary name MAC2 was input, with the system assuming that the district name associated with the previous example relating to MAC1, i.e., the CA.NWB. district name, applied to this example as well. Thus, in FIG. 12c, only the identifier "MAC2" need be input to the system, it being assumed that the district identifier "CA.NWB" applies to this request as well.

C. EXAMPLE 11

This document is a functional description of a computer program, Go2Grid, which embodies one or more aspects of the subject invention. The program is written in the "C++" programming language and its purpose is to demonstrate the feasibility of conversion between city grid and proprietary codes and geodetic coordinates.

Program flow is described using a series of pseudo-code statements. The functions required to perform these tasks are described. The data variable types and structures are defined. The parameters required for implementation of two possible city grid designators are defined.

Program Flow

Set all defined parameters to their default values
Northern latitudes are positive
Eastern longitudes are negative
The assumed geodetic datum is World Geodetic System 1984 (WGS-84)
The last geodetic position is used to initialize the City Grid designator
The user screen is initialized
Monitor keystrokes or navigation receiver input
For any City Grid designator change
Parse user input
If change in City Code
Compute city position from designator
Fill City Code
Fill Country and State Codes
If change in State Code
Fill Country and State Codes
If change in Country Code
Fill Country Code
If change in entire City Grid Designator
If a Universal Go2 Code
Fill Country, State, City and Grid Codes
If a Proprietary Go2 Code
Fill Proprietary Code
Compute geodetic coordinates for this Go2 Designator
For any change in geodetic coordinates
Parse user input
If user has requested a Universal Code
If current geographic context is changed
Get Go2 Codes from latitude and longitude
Find closest city
Set new City Grid center
Fill Country, State, City codes
Compute City Grid Codes for each level of precision
Reset User Screen display
Continue
Functions
The following functions are used by the Go2Grid sample program, an embodiment of the city grid concept:
getdeg( ) extracts decimal degrees from character strings
grange( ) computes geodetic range between two positions
dmsdeg( ) extracts degrees, minutes, seconds from decimal degrees
degdms( ) forms decimal degrees from degrees, minutes, seconds
getcenter( ) computes geodetic coordinates of City Grid center from city centroid
getgrid( ) computes City Grid codes for level of precision
getkeys( ) parses user keyboard input parsego2( ) parses Go2 City Grid designator
addlatlon( ) concatenates next level of precision onto geodetic coordinates
getnextcity( ) finds next city in current state/province list
getprevcity( ) find previous city in current state/province list
getcost( ) fills Go2 City Grid designator with country and state/province codes
putscreen( ) fills display with current city Grid designator and geodetic coordinates
getnextstate( ) finds next state/province in current country list
getprevstate( ) find previous state/province in current country list
Types and Structures
The Go2Grid embodiment sample program defines the following variable structures in addition to the usual character, integer, float, and double types:

```
typedef struct ccstruct {
    char city__code[4];
    char city[60];
    char state__code[3];
    char state[60];
    char country__code[3];
    char country[60];
    char longitude[32];
    char latitude[32];
    double lat;
    double ion;
    double centerlat;
    double centerlon; };
typedef struct latlonstruct {
    int latdeg;
    int latmin;
    int latsec;
    int londeg;
    int lonmin;
    int lonsec; };
```

Program Definitions
The following definitions are used within the Go2 Grid sample program:

```
/* grid types */
/* a gridtype = = 1 is numeric with 10 minutes, 1.0, 0.1, and 0.001 grids */
/* a gridtype = = 2 is alphanumeric with 10, 0.5, 0.05 and 0.0025 grids */
#define GRIDTYPE 1
#define TITLE "Go2 and Geographic Coordinate Converter"
#define VERSION "(4/3/96)"
/* lines */
#define TITLELINE 1
#define GO2CONTEXTLINE 5
#define GEOCONTEXTLINE 10
#define HELPLINE 15
#define MESSAGELINE 18
#define COUNTRYLINE 20
#define STATELINE 21
#define CITYLINE 22
#define GO2LINE 23
#define LATLINE 24
#define LONLINE 25
#define INCOL 23
#define OUTCOL 5
#if GRID TYPE= =1 /* GRID GRAIN */
#define GRIDKIND "Numeric City Grid"
#define GRIDDEF "Grid Precision: Level 1=1.0'; Level 2=1.0'; Level 3=0.1'; Level 4=0.01'"
#define GRIDCHARS "Designators Levels 1, 2, 3 and 4: [01232456789]"
#define LEVEL 1__EGRAIN 10.0
#define LEVEL 1__NGRAIN 10.0
#define LEVEL 1__ECHARS "0123456789"
#define LEVEL 1__NCHARS "0123456789"
#define LEVEL 1__EGRIDS 10
```

-continued

```
#define LEVEL 1__NGRIDS 10
#define LEVEL 2__EGRAIN 1.0
#define LEVEL 2__NGRAIN 1.0
#define LEVEL 2__ECHARS "0123456789"
#define LEVEL 2__NCHARS "0123456789"
#define LEVEL 2__EGRIDS 10
#define LEVEL 2__NGRIDS 10
#define LEVEL 3__EGRAIN 1.0
#define LEVEL 3__NGRAIN 0.10
#define LEVEL 3__ECHARS "0123456789"
#define LEVEL 3__NCHARS "0123456789"
#define LEVEL 3__EGRIDS 10
#define LEVEL 3__NGRIDS 10
#define LEVEL 4__EGRAIN 0.010
#define LEVEL 4__NGRAIN 0.010
#define LEVEL 4__ECHARS "0123456789"
#define LEVEL 4__NCHARS "0123456789"
#define LEVEL 4__EGRIDS 10
#define LEVEL 4__NGRIDS 10
#else if GRIDTYPE= =2
#define GRIDKIND "Alphanumeric City Grid"
#define GRIDDEF "Grid Precision: Level 1=10'; Level 2=0.5';
Level 3=0.05'; Level 4=0.0025'"
#define GRIDCHARS "Designators Levels 1&3:[01232456789]; Levels
2&4:[ABCDEFGHJKLMNPRSTUVW]" /* GRID GRAIN */
#define LEVEL 1__EGRAIN 10.0
#define LEVEL 1__NGRAIN 10.0
#define LEVEL 1__ECHARS "0123456789"
#define LEVEL 1__NCHARS "0123456789"
#define LEVEL 1__EGRIDS 10
#define LEVEL 1__NGRIDS 10
#define LEVEL 2__EGRAIN 0.5
#define LEVEL 2__NGRAIN 0.5
#define LEVEL 2__ECHARS "ABCDEFGHJKLMNPRSTUVW"
#define LEVEL 2__NCHARS "ABCDEFGHJKLMNPRSTUVW"
#define LEVEL 2__EGRIDS 20
#define LEVEL 2__NGRIDS 20
#define LEVEL 3__EGRAIN 0.05
#define LEVEL 3__NGRAIN 0.05
#define LEVEL 3__ECHARS "0123456789"
#define LEVEL 3__NCHARS "0123456789"
#define LEVEL 3__EGRIDS 10
#define LEVEL 3__NGRIDS 10
#define LEVEL 4__EGRAIN 0.0025
#define LEVEL 4__NGRAIN 0.0025
#define LEVEL 4__ECHARS "ABCDEFGHJKLMNPRSTUVW"
#define LEVEL 4__NCHARS "ABCDEFGHJKLMNPRSTUVW"
#define LEVEL 4__EGRIDS 20
#define LEVEL 4__NGRIDS 20
#endif
```

VI. Internet-Based Automatic Location Referencing System

FIGS. 13-22 are used to describe a preferred embodiment of an automatic location referencing system using the WGRS described above. It should be noted that although this aspect of the present invention could be implemented with other types of geographical referencing systems, it is preferably implemented with the WGRS to take advantage of the features described herein.

Figure 13:
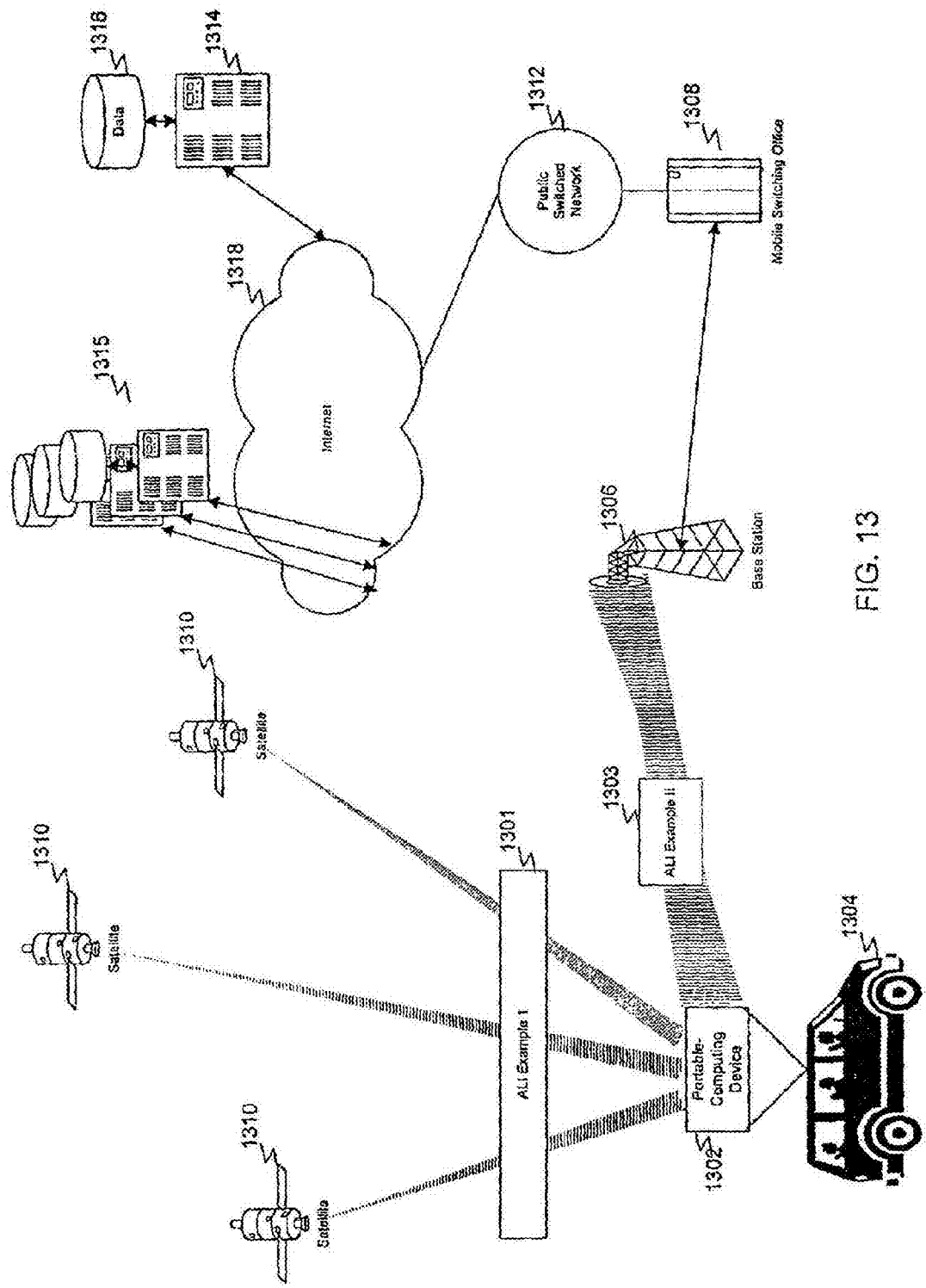
FIG. 13 depicts an operational environment of the automatic location aspect of the present according to a preferred embodiment.

FIG. 13 depicts an operational environment of the automatic location aspect of the present invention according to a preferred embodiment. A portable-computing device 1302 is installed in a mobile unit such as an automobile 104. Alternatively, the portable-computing device 1302 may be carried on the person of individual users. In yet another embodiment, the present invention can be implemented using a non-portable computing device such as a general-purpose desktop computer or the like.

However, for the purposes of this example, the device 1302 is referred to as the portable-computing device. In one embodiment, the portable-computing device 1302 receives data from Global Positioning System (GPS) satellites 1310 for location identifying purposes. This is one example of a means for automatic location identification, as shown by block 1301 labeled "ALI Example 1." A second example of a means for automatic location identification is shown as block 1303 labeled "ALI Example II." ALI Example II 1303 is intended to represent a means for automatically identifying the location of a device, such as device 1302, via a cellular transmission. Example II 1303 typically uses triangulation techniques in conjunction with at least two cellular base stations, or distance measuring techniques from three cellular base stations, such as the base station 1306.

Additional means for ALI can also be used in alternate embodiments of the present invention. For example, the automatic identification signals commonly used in land-line telephonic devices ("ANI" and the like), can be used in conjunction with a database lookup table to identify a callers fixed location.

In any case, any well-known means for automatically identifying a caller's geographical location can be used in various embodiments of the present invention. In fact, future methods, not yet known, but used for identifying the location of a mobile unit, such as the mobile unit 1302, are within the scope of the present invention. Accordingly, the use of the examples of a cellular network and a GPS system should not be construed to limit the scope and breadth of the present invention.

The portable-computing device 1302 has the capability for wireless communications. In this example, one use of the wireless communication feature is to connect the portable-computing device 1302 via a wireless network gateway to a computer network such as the Internet 1318. The wireless communication feature of the present invention is also used for providing standard telephony functions. In addition, as stated above, the wireless communication feature of the present invention can also be used to implement ALI functionality in accordance with the principals described herein.

In one example, cellular technology is used to implement the wireless communication feature of the present invention. In FIG. 13, the base station 1306 and the mobile switching office 1308 represents a portion of a typical cellular network. The base station 1306 sends and receives radio signals to and from the portable-computing device 1302. The mobile switching office 1308 is coupled to the base station 1306 via standard telecommunication transmission lines. Likewise, the mobile switching office 1308 is coupled to the public switched telephone network 1312 via standard telecommunication transmission lines. The public switched network 1312 is coupled to the Internet 1318 via a point-of-presence, which is typically implemented using high bandwidth T3 telecommunication channels or the like.

A primary server 1314 is coupled to the Internet 1318. The primary server 1314 is used to interface with the portable-computing device 1302 as described below. The primary server 1314 is coupled with a database or persistent storage device 1316. A plurality of enhanced servers 1315 are connected to the Internet 1318. The enhanced servers 1315 provide location specific data to the portable-computing device 1302. The primary server 1314 selects a particular enhanced server 1315 to be connected to the portable-computing device 1302 in accordance with a database query as described below.

Note that the present invention is described in terms of a primary server 1314 and one or more enhanced servers 1315. However, this does not mean that separate physical servers must be used to implement these functions. Indeed, a single server or multiple servers can be used to implement the functions of the primary server 1314 and the enhanced servers 1315 as described herein. Thus, the use of these terms should not be construed to limit the scope and breadth of the present invention to the physical configurations described in these exemplary embodiments.

The cellular network is just one example of a technology that can be used to implement the wireless communication feature of the present invention. In other embodiments, different types of wireless technology can be used, such as low orbit or geosynchronous orbit satellite communications. In fact, any type of wireless technology can be used to provide the wireless communication feature of the present invention.

Further, the Internet 1318 is used in a preferred embodiment of the present invention due to its wide use and availability. However, any type of computer network can be used in alternate embodiments of the present invention. As such, the use of the examples of a cellular network and the Internet 1318 should not be construed to limit the scope and breadth of the present invention.

Figure 14:
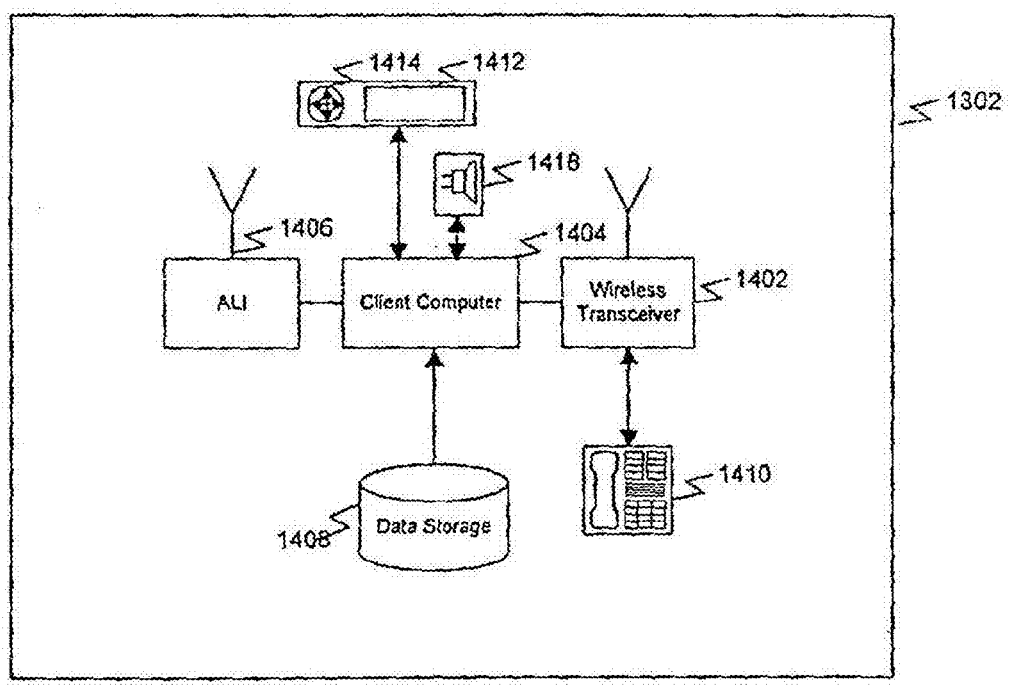
FIG. 14 is a block diagram depicting details of the portable-computing device in accordance with the subject invention.

Details of the portable-computing device 1302 are depicted in FIG. 14. Typically, the portable-computing device 1302 comprises a client computer 1404, a persistent storage device or database 1408, a display screen 1412, a keypad input device 1414, a speech interface 1418, an ALI device 1406, a wireless transceiver 1402 and a telephony device 1410.

Note that these components, such as the ALI device 1406 and/or the wireless transceiver 1402 may be imbedded within the portable-computing device 1302. Alternatively, such components may be implemented as discrete external devices coupled to the portable-computing device 1302 through external ports, such as RS-232, SCSI, USB ports or the like.

In addition, many of the components described above are optional and depend on each specific implementation of the present invention. For example, the speech interface 1418 and the ALI device 1406 are optional components. Embodiments of the present invention that operate without an ALI 1406 accept manual input of location information via the keypad 1414 or other input device.

Any type of general or special purpose computer system can be used to implement the portable-computing device 1302. Examples of such devices include standard laptop computers, automobile computers and personal digital assistant devices (PDAs). Typically the portable-computing device 1302 includes a CPU, local working memory, or RAM, non-volatile program memory, or ROM, and some form of non-volatile external memory for data storage 1408 such as any type of NVRAM, or magnetic or optical disk storage systems. An example of a general-purpose computer system that can be used to implement the present invention is described below with reference to FIG. 22.

The display screen 1412 is used to display output from the portable-computing device 1302. The keypad device 1414 is coupled to the portable-computing device 1302 and is used for inputting data. For example, location data can be manually input from the keypad device 1414.

In this example, a speech interface 1418 is also coupled to the portable-computing device 1302. The speech interface 1418 uses voice recognition techniques to accept spoken commands from users for controlling the portable-computing device 1302. The speech interface 1418 is used in a preferred embodiment to allow users to control the computer 1404 via spoken voice commands for promoting safe driving conditions while operating the portable-computing device 1302 from an automobile or the like.

The persistent storage device 1408 is used to store application programs such as a web browser and one or more specialized application programs used to implement the present invention as described in detail below. Such application program(s) is/are referred to herein as the "Go2 Application program," which is described in detail below. In addition, location and other information are stored as data packets on the local persistent storage device 1408, as described in detail below. Depending on the storage capacity of the persistent storage device 1408, one or more database lookup tables can be stored therein and used for translating, for example, between a lat/lon coordinate system and the WGRS. However, all systems that are enabled in accordance with the present invention will generally have the capability to translate between a lat/lon coordinate system and the WGRS using the universal addressing scheme as described above. Additional storage requirements are needed to translate to and from the WGRS using proprietary addresses.

The wireless transceiver 1402 is used to send and receive data between the portable-computing device 1302 and other devices such as the servers 1314 and 1315 coupled to the Internet 1318.

The ALI device 1406 is used to track the position, and possibly the speed and bearing of the portable-computing device 1302. As stated above, any device can be used that performs ALI functionality. Examples of well-known ALI devices are GPS systems, low orbit satellite systems, geosynchronous orbit satellite systems, telephone number identification systems, cellular network triangulation methods, etc. In this example, telephone number identification systems (ANI) can be used in conjunction with a database lookup table to determine predefined fixed positions of users based on an assigned telephone number.

Figure 15:
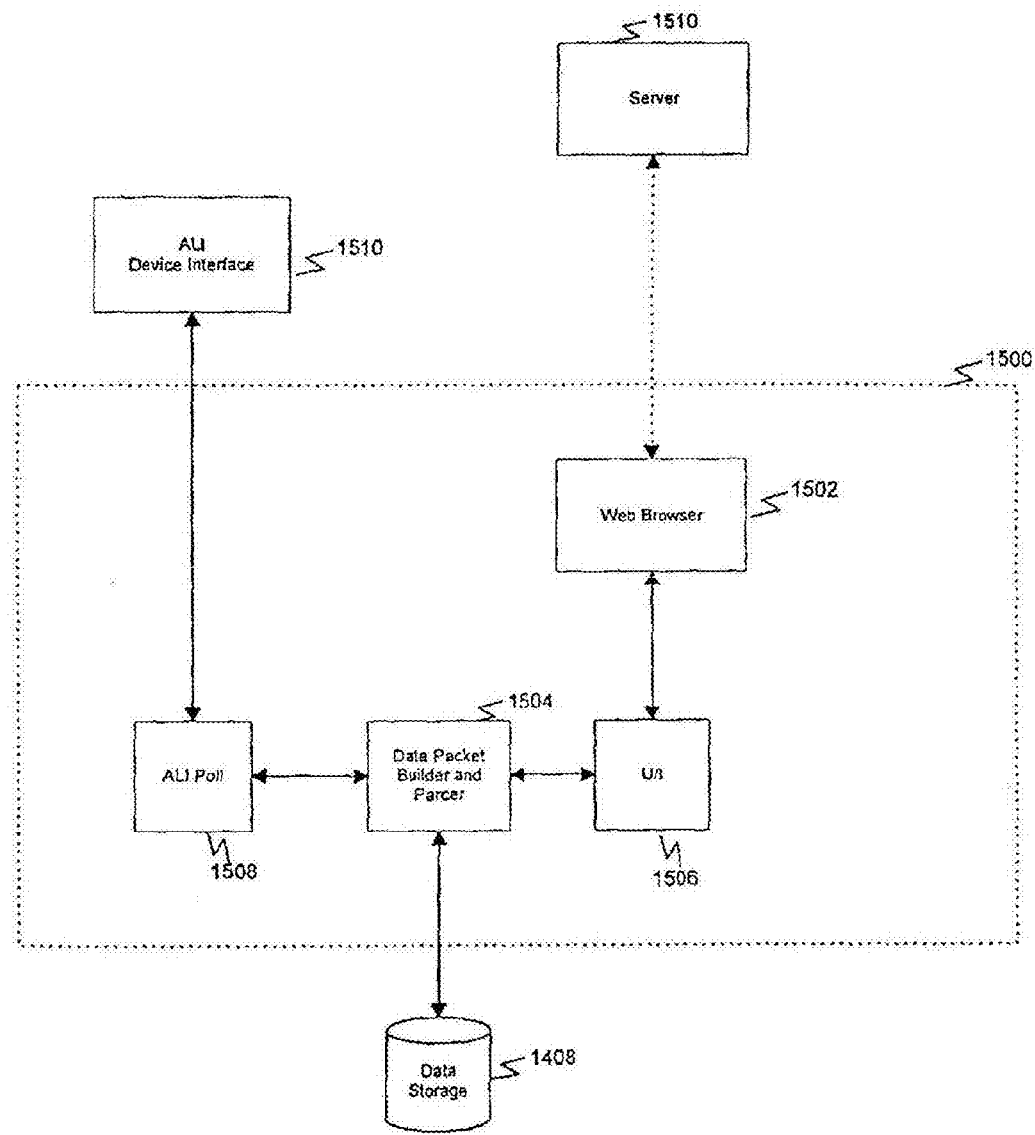
FIG. 15 is a block diagram depicting functional components of an application program or program(s) running on the portable-computing device in accordance with an embodiment of the present invention.

FIG. 15 is a block diagram depicting functional components of an application program or program(s) running on the portable-computing device 1302 in accordance with an embodiment of the present invention. As stated, the application program(s) is/are referred to herein as the "Go2 application program" 1500.

The Go2 Application program 1500 is provided with a web browser component 1502. The web browser component 1502 is used to perform web browser functions for the portable-computing device 1302. In fact, in one embodiment, a standard web browser is used to implement the web browser component 1502 of the present invention. Alternatively, customized web browser code can be imbedded into the Go2 Application program 1500. In either case, the web browser module 1502 provides standard web browser functions. Such functions would be apparent to persons skilled in the relevant art(s). As shown, the web browser component 1502 is coupled to a web server 1510.

Accordingly, the web browser module 1502 interprets data streams sent from the server 1510 and displays text and/or graphics therefrom. The text and/or graphics are displayed on the display screen 1412. The web browser component 1502 also accepts input from users via the keypad 1414 or other input devices. Preferably, the data streams transmitted by the server 1510 are in a standard format, such as HTML, a modified version of HTML or the like. In this fashion, generic web-browsing tools can be used to interface with the web server 1510 and the U/I module 1506 (see below) of the present invention. The User Interface (U/I) module 1506 is coupled with the web browser module 1502. The U/I module 1506 is used to prompt the user for information including user preferences and category selections to be used for subsequent information requests, (i.e. on-line database queries) as described below. The U/I module 1506 preferably performs at least some functions locally. That is, at least some functions provided by the U/I module 1506 are performed without a live connection to the server 1510. These functions are referred to herein as "local functions" and are described in detail below.

For example, one local function provides a menu that is displayed which allows users to select from a list of pre-defined categories. In this example, users select a category of interest for formulating a database query that is to be used in a subsequent on-line session with the primary server 1314. Details of this aspect of the present invention are described below.

A data packet builder and parser module 1504 (hereinafter "data packet module") is coupled to the U/I module 1506. The data packet module 1504 is used to construct data packets, which are stored on the local storage device 1408. These data packets are subsequently read by the server 1510 and used to formulate on-line database queries. The data packet module also parses data packets received from the server 1510. Details and examples of data packet contents are described below.

An ALI polling module 1508 is used to poll the ALI device module 1510. The ALI device 1406 provides location, bearing and speed information to the Go2 Application program 1500. This information is then used to build data packets that are stored in the local data storage device 1408. Details of a process that can be used to implement the ALI polling module 1508 is described below.

Figure 16:
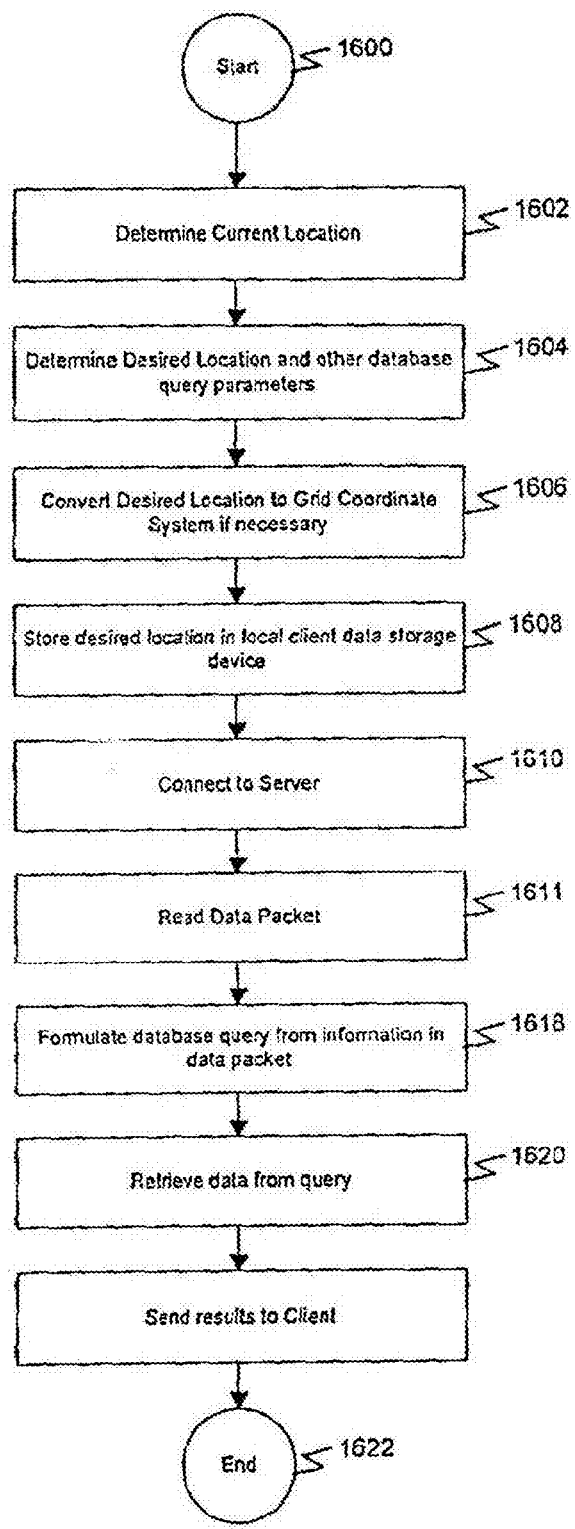
FIG. 16 is a flowchart that generally describes an overall process in accordance with an embodiment of the present invention.

FIG. 16 is a flowchart that generally describes an overall process in accordance with an embodiment of the present invention. The process begins with step 1602. In step 1602, the process determines the current location. The current location can be automatically determined from an ALI device 1406, or can be manually input from the user. After the current location is determined, control passes to step 1604.

Next, in step 1604, the process determines the desired location and specific database query. The U/I module 1506 may be used to present the user with one or more selectable menu choices. Alternatively, in one embodiment, the U/I module recognizes numerous requests based on commonly used terms such as "burgers," "shopping," "banks, or the like. In this fashion, the user can formulate a complex database query by simply picking and choosing among the menu items presented or the user may perform a simple database query by merely inputting one or more common terms.

For example, the user may wish to formulate a database query for finding all fast-food restaurants within a five-mile radius. The desired location may be different from the current location, if for example, the user specifies some time in the future. For example, the user may wish to find fast-food restaurants within five-mile radius from a location one hour in the future. In this example, the process can use the current location, current speed and bearing to predict the desired location. In another example, a routing program can be used to determine the desired location based on a pre-defined route input by the user.

Next, in step 1606, the desired location is converted to the WGRS, if necessary. For example, GPS devices typically use the geodetic latitude and longitude system for describing location data. In this case, it may be necessary to convert to the WGRS in order to take advantage of the unique features of the referencing system as described herein.

In another example, a user may manually input location information. Again, such manual input is preferably entered in the WGRS format because of its ease of use lower susceptibility to errors. If Go2 data is entered directly, either manually or by the ALI device 1406, then step 1606 is bypassed.

Next, in step 1608, the current location information and the database query information is stored in the local storage device 1408. Typically, this information is stored in a pre-defined data format referred to herein as a "data packet." The format of a typical data packet is described below. Next, in step 1610, the portable-computing device 1302 connects to the primary server 1314.

In step 1611, the primary server 1314 reads the data packet stored in step 1608. From this information, a database query is formed as indicated by step 1618. Next, in step 1620, the process retrieves the results from the database query and sends them to the client, as indicated by step 1620. The process ends with step 1622.

Figure 17:
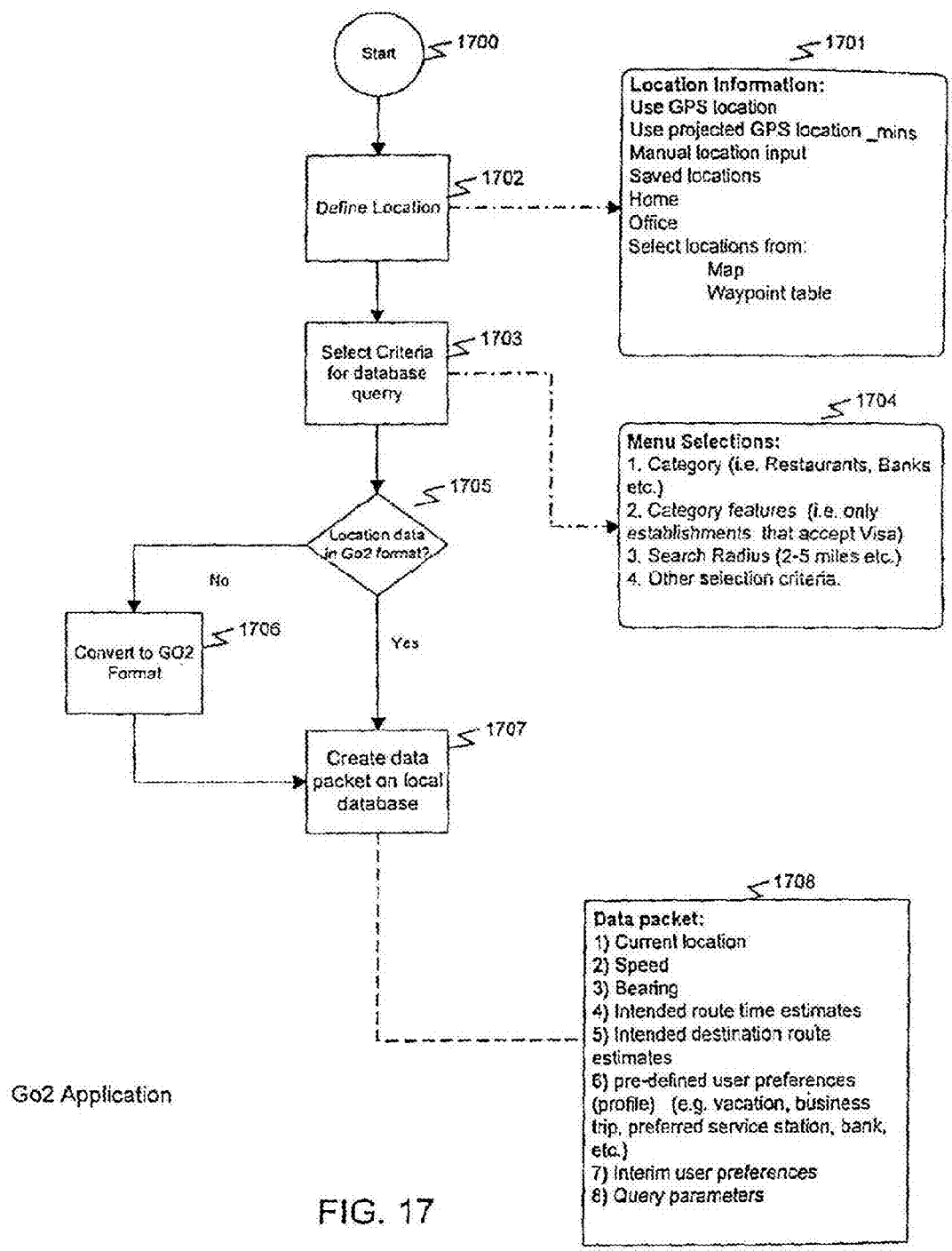
FIG. 17 is a flowchart depicting a process that can be used to implement a portion of the Go2 Application program according to an embodiment of the present invention.

FIG. 17 is a flowchart depicting a process that can be used to implement a portion of the Go2 Application software 1502. The process begins with step 1702. In step 1702, the U/I module 1506 offers the user one or more options for specifying how location information is to be determined. Typically, if an ALI device is attached, it is used to automatically provide location information to the Go2 Application software 1500. Alternatively, one or more additional methods for specifying location information are typically offered. In this example, as indicated by the block 1701, the user has the option to specify that the process retrieve location information from the attached GPS receiver. In one example, the user can select between the current GPS location and a projected location based on a specified elapsed time.

In addition, predefined locations, such as home or office can be specified. Typically, the location coordinates are pre-programmed as a user preference. In a preferred embodiment, the WGRS is used to specify such pre-programmed user preferences. Alternatively, in this example, the user can access a map in which to specify a location. The map database can either be provided locally by the client 1404, or can be provided remotely through a connection with a server 1510.

In another example, a routing program (either on-line or locally) can be used to project future locations and to specify one or more waypoints along a pre-defined route. In addition, the user has the option to manually specify location information. Advantageously, manual input is in the form of the Go2 coordinate system.

It should be noted that block 1701 lists a few examples of the types of parameters that can be specified by users for determining location information in accordance with a preferred embodiment of the present invention. Alternate embodiments may comprise selections that are very different from the examples provided herein. The actual contents of menu items displayed by the U/I module 1506 depend on each specific implementation of the present invention. As such, the examples used herein should not be construed to limit the scope and breadth of the present invention.

In any case, once location information is specified in step 1702, control passes to step 1703. In step 1703 the U/I module 1506 prompts the user for criteria used to formulate a subsequent on-line database query. In this example, the user selects a category of interest, one or more category features, a search radius and other selection criteria. One method that can be used to implement this step is to display a selectable menu to the user as shown in block 1704. The U/I module 1506 is used to perform this function.

For example, the menu 1704 comprises category selections such as: restaurants; banks; ATM machines; hotels; copy centers; libraries; museums; gas stations; weather reports; car dealers; auto repair shops; maps; directory assistance; police stations; hospitals and the like. In this fashion, for example, the user can find nearby restaurants by first selecting the corresponding category of interest, as shown in block 1704.

In addition, the menu shown in block 1704 allows users to specify one or more features associated with the selected category. Feature selections narrow or drill-down the subsequent database search. For example, the user may only be interested in restaurants that accept a particular type of credit card, have a particular dress code, or provide goods within a particular price range. Accordingly, the user narrows the subsequent database search by simply selecting one or more appropriate features associated with the selected category. Multiple levels of category features can be presented based on the needs and requirements of each specific implementation of the present invention.

Another parameter that is preferably specified by the user is a search radius. For example, the user can specify that the search only include points of interest within a particular radius from the current or desired location.

It should be noted that these are just some examples of the types of parameters that can be specified by users in accordance with a preferred embodiment of the present invention. Alternate embodiments may comprise menu items that are very different from the examples provided herein. The actual contents of menu items displayed by the U/I module 1506 depend on each specific implementation of the present invention. As such, the examples used herein should not be construed to limit the scope and breadth of the present invention.

Preferably, users can also define one or more user preferences. These user preferences are used as default parameters if they are not over-ridden by current selections. In this fashion, user input is minimized.

Once the database query parameters are specified, control passes to step 1705. In step 1705, the process determines whether the location information is the WGRS format. If it is not, it is converted to the WGRS in step 1706. In one embodiment, this conversion takes place locally. In another embodiment, the primary server 1314 performs the conversion upon connection with the client 1404. Next, in step 1707 a data packet 1708 is created. This data packet 1708 is then stored on the local storage device 1406.

In one example, the data packet comprises the following information as depicted by block 1708. The current location, including the speed and bearing, if available. As stated, depending on the specific implementation of the present invention, this may or may not be in the WGRS format. If it is not, the primary server can convert it into the Go2 coordinate grid system.

As indicated by item 4, an estimate for an intended route, based on an elapsed time may be included in the data packet. For example, a user may wish to stop for the night in one hour from the present time. In this example, an estimate of a future location may be included in the data packet. The client 1404 or the server 1314, depending on each specific implementation of the present invention, can perform the future location prediction. If the server 1314 performs the location prediction, a time period is specified in the data packet 1708.

In addition, routing information may also be specified as indicated by item 5. A routing program or the like can provide this information. If routing information is not given, a projected location is determined based on the present position, speed and bearing. Of course, if routing information is not provided, the server 1314 assumes the user will remain on the current road for the specified elapsed time. Further, the server can use additional information, such as traffic and/or weather conditions to provide more accurate predictions. This additional information can originate from anywhere on the Internet 1318 or from an Intelligent Transportation System.

As indicated by item 6, predefined user preferences are also included in the data packet 1708. This can include, for example, information such as whether the user is on a business trip or on vacation. User preferences are used to further narrow the database query. For example, if the user is looking for hotel accommodations, the program can find appropriate selections based on whether the user is on business or vacation. Preferably, the user preferences are entered one time and are not changed for every database query to minimize input requirements.

Item 7 represents preferences that override predefined user preferences for the duration of the next database query. Thus, for example, a pre-defined user preference may be to find places or interest that are within 5 miles. This user preference generally applies to every database query. However, because the user is currently driving in a rural area, the user may prefer to focus a search in a wider radius, say 20 miles. The next time the user launches a database query, if the radius is not specified, it reverts back to the 5-mile user preference value. Item 8 represents other database query parameters that may be present.

It should be noted that the above items that comprise the data packet 1708 are just a few examples of the type of data that may comprise a data packet in accordance with a preferred embodiment of the present invention. Alternate embodiments may comprise very different data items than the above examples. As such, the examples used herein should not be construed to limit the scope and breadth of the present invention.

Figure 18:
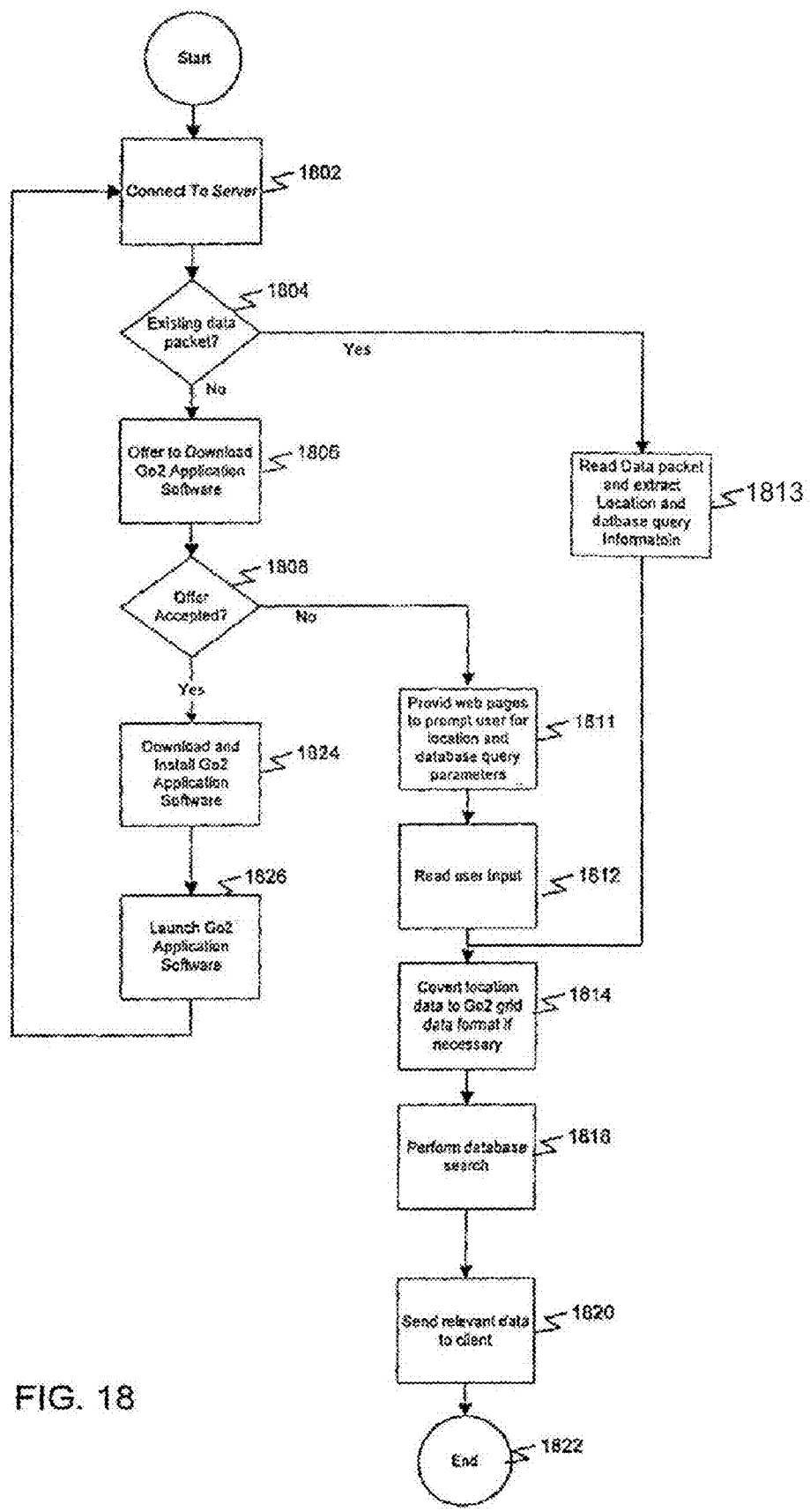
FIG. 18 is a flowchart depicting a process that can be used to implement a process performed by the primary server upon connection with the client according to an embodiment of the present invention.

FIG. 18 is a flowchart depicting a process that can be used to implement a process performed by the primary server 1314 upon connection with the client 1404. Step 1802 represents a step where the client 1404 connects with the server 1314. Next, in step 1804, the server 1314 determines if a data packet 1708 is available on the client data storage device 1408. If a data packet is available, the location information is extracted therefrom, as indicated by step 1810. Control next passes to step 1814, which is described below.

If it is determined in step 1804, that a data packet is not available, control passes to step 1806. In step 1806 the user is offered an opportunity to download the Go2 Application software 1500. Next, as indicated by step 1808, control passes to step 1824 if the user accepts the offer to download the Go2 software 1500. In step 1824, the Go2 Application software is downloaded to the client 1404.

Next, in step 1826, the Go2 Application software 1500 is executed on the client 1404. During the execution of the Go2 Application software 1500, the user inputs user preferences, location specifications and other database query parameters, as described above. After such information is entered, the Go2 Application software 1500 creates a data packet 1708 and stores it on the data storage device 1408. After this occurs, control passes back to step 1802 as described above. Now the user is enabled so that he or she can take advantage of the automated features of the present invention.

As indicated by step 1808, if it is determined that the offer to download is rejected, control passes to step 1811. In step 1811, the user is provided with one or more web pages that accept location information, user preferences and the like in a manner similar to that described above with reference to the Go2 Application U/I module 1506. In this fashion, the primary server 1314 can provide services to users that are not enabled with the Go2 Application software 1500. Next, in step 1812, the primary server 1314 reads the location information entered in step 1811. Control next passes to step 1814.

In step 1814, the location information, (either manually entered in step 1811, or automatically extracted from the data packet in step 1810), is converted to the WGRS, if necessary.

Next, in step 1814, the server 1314 performs a database query. The object of the database query is to find an appropriate server 1315 that provides the type of service requested by the user. This aspect of the present invention is described in detail below, with reference to FIG. 19. The process ends as indicated by step 1822.

Figure 19:
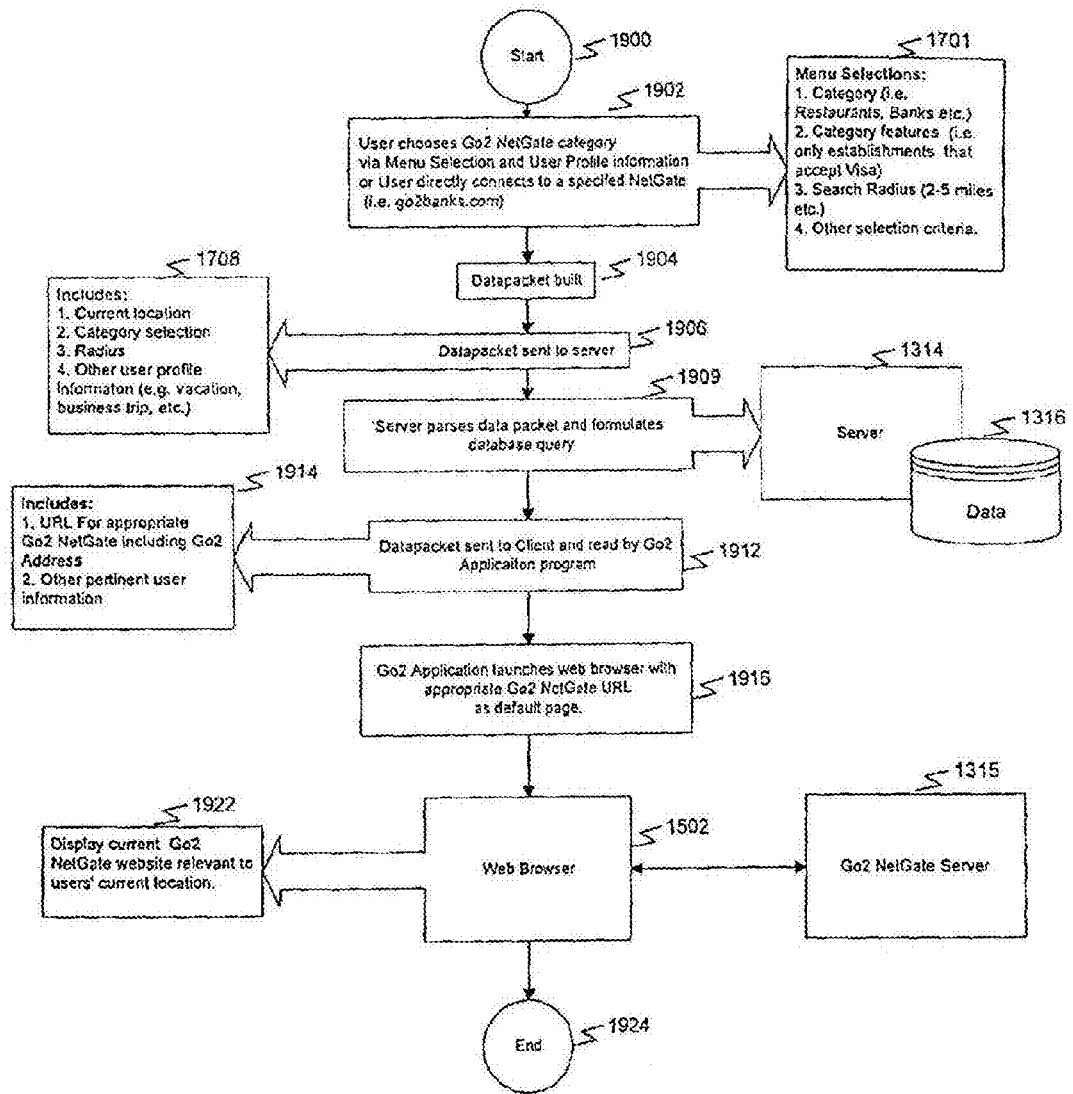
FIG. 19 is a flowchart and block diagram useful for describing the interaction and processing between the client, the primary server and an enhanced server according to an embodiment of the present invention.

FIG. 19 is a flowchart and block diagram useful for describing the interaction and processing between the client 1404, the primary server 1314 and an enhanced server 1315. The process begins with step 1902. In step 1902, the user selects a category of interest and other data from the menu 1701 as described above.

Next, In step 1904, the data packet module 1504 builds the data packet 1708. The data packet 1708 is then stored on the local storage device 1408. Next, as indicated by step 1906, the data packet 1708 is transmitted to the server 1314. At this point, the primary server 1314 parses the data packet 1708 and formulates a database query on the database 1316.

In accordance with one embodiment of the present invention, the persistent storage device 1316 contains a list of the enhanced servers 1315 that provide location specific information in accordance with the present invention. In particular, the primary server 1314 searches its database 1316 and retrieves a specific Uniform Resource Locator ("URL") that satisfies the database search criteria entered by the user, as described above.

It should be noted that the enhanced 1315 servers are preprogrammed to provide data that is customized in accordance with a specified location. Thus, the enhanced servers are preprogrammed to accept and respond to a location identifier, preferably in the WGRS.

Next, in step 1912, the client 1404 receives a second data packet 1914. The second data packet 1914 comprises the URL result from the database query, plus any other additional information that may be required by the enhanced server 1315, as specified in the database 1316.

Next, in step 1916, the Go2 Application launches the web browser component 1502 and automatically connects to the URL received in the data packet. Specifically, the browser is programmed to accept the URL as the default page so that it is automatically loaded upon connection to the Internet 1318.

It is noted that the present invention is described in terms of a primary server 1314 and a plurality of enhanced servers 1315. In this first embodiment, the primary server performs a database search that results in an address for an enhanced server that can satisfy the customer's database query. However, the present invention is not restricted to this configuration. An alternative embodiment comprises a plurality of enhanced servers but no primary server.

For example, in one embodiment, the Go2 Application software 1500 provides the services provided by the primary server 1314 in the above example. In another embodiment, the user determines which one of the enhanced servers to connect to. In this example embodiment, each of the enhanced servers 1315 is preprogrammed to parse the data packet 1708 and extract location information therefrom, as described above.

Figure 20:
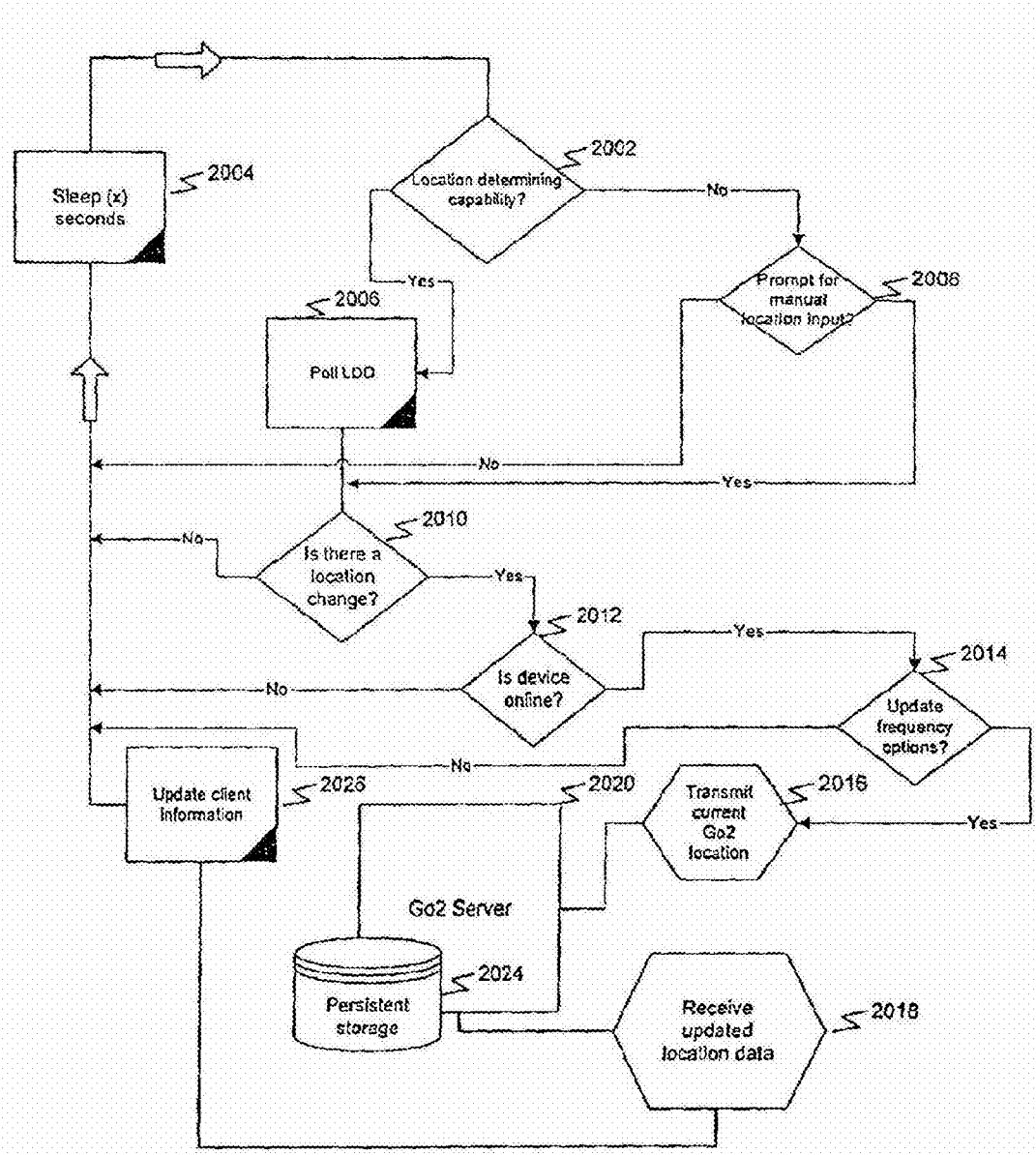
FIG. 20 is a flow chart depicting a method that can be used to implement the automatic location data collection feature according to a preferred embodiment of the present invention.

FIG. 20 is a flow chart that is useful for describing a method that can be used in the Go2 Application program to implement a feature of the present invention for automatic location data collection. The flowchart in FIG. 20 represents an endless loop and therefore has no defined beginning or end point.

As indicated by step 2002, the process determines whether an ALI device 1406 is attached. If an ALI device 1406 is attached, control passes to step 2006. In step 2006, the ALI device 1406 is polled to retrieve location data therefrom. Next, in step 2010, the process determines whether the retrieved location data indicates a change from the previous poll. If step 2010 indicates that the location has not changed (i.e., the user is not moving), control passes to step 2004, where the process sleeps for a predetermined time period until it repeats itself in step 2002.

If step 2010 indicates that the location has changed, control passes to step 2012. In step 2012, the process determines if the client 1404 is on-line. If so, control passes to step 2014. If the client is not on-line, control passes back to step 2004.

In step 2014, the process determines if a server 1314 is currently requesting that location data be updated. The server in this example, can be any server, such as the primary server 1314 or any enhanced servers 1315. If the server is requesting updated location information, the current position, preferably in the WGRS format, is transmitted to the server in step 2016. If the server is not requesting an update, control passes back to step 2004.

As indicated by the blocks 2020 and 2024, the server uses the Go2 location information for performing a database query. The results are then sent back to the client and as indicated by block 2026.

An advantage of the present invention is that users can benefit from the virtually unlimited storage capacity and real-time updates of the Internet 1318. Because the Internet 1318 is used in a distributed fashion to provide users with customized location related information, the information provided to users can be as detailed as desired. For example, in addition to using maps to determine driving directions, more detailed information, such as site plans, building floor plans, photographs of the destination, private road configurations and the like can be presented to users.

Figure 21:
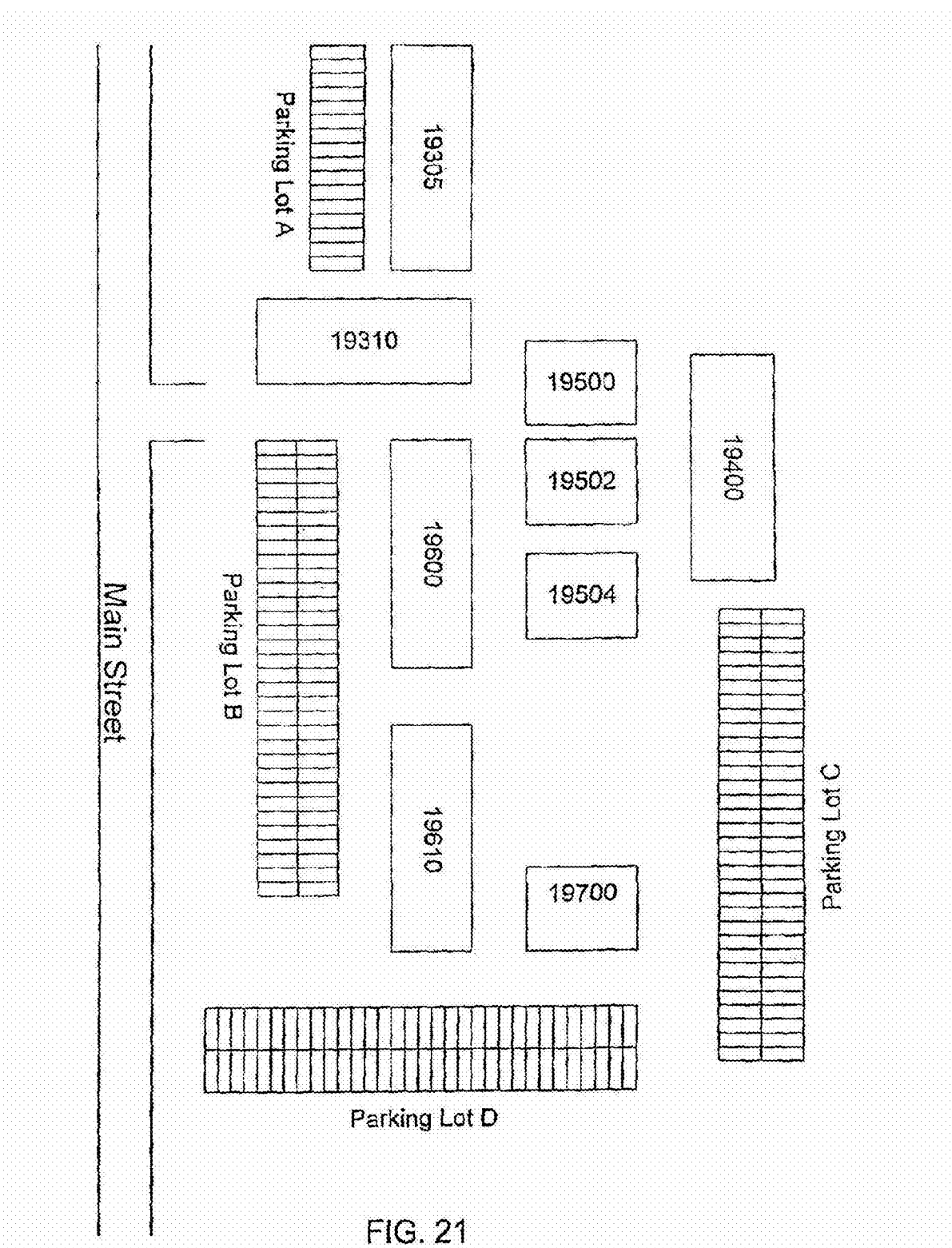
FIG. 21 depicts an example of a site plan that can be used to implement an embodiment of the present invention.

In addition, because the direction in which the user is traveling can be determined, that information can be used to select a proper orientation for the extended information, such as a site plan, for example. FIG. 21 depicts an example of a site plan that shows building configurations, parking lots, etc. In this example, the site plan in FIG. 21 is stored as digitized photograph. The orientation of the digitized photograph displayed to the user depends on the user's direction of travel so that the proper orientation is displayed.

VII. Unified Geographic Database

An embodiment of a UGD will now be described, followed by exemplary methods of creating, maintaining, and using the same. The UGD is an automated, managed, and secure database registry of location and location-based information provided by real-world businesses and other entities, analogous to the registry of domain names for Internet addresses and Web sites. As a location registry, the UGD is a common repository where businesses and other entities can post their location and location-based information to make it available to potential users. In turn, users of the Internet and Web and other types of other electronic devices may query this registry to obtain accurate, complete and up-to-date location and location-based information about the registered businesses and other entities.

The UGD will generally be described below in conjunction with a business entity and location-based information for that business. However, the UGD may include location-based information for entities other than a business such as, but not by way of limitation, non-profit organizations, public facilities, specific events, etc., and also individuals. In addition, the UGD is designed to provide location-based information relevant to any users, including consumers, businesses, governmental, researchers, historians, etc.

The UGD will generally be described as operating on a single computer for simplicity, although in practice it typically will be distributed across multiple computers.

Figure 22:
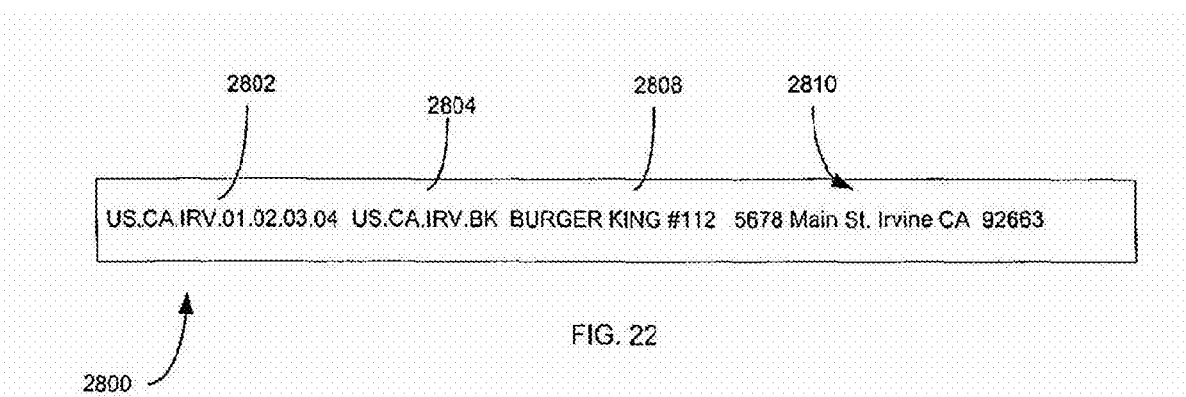
FIG. 22 is an exemplary embodiment of a database record of the Universal Geographic Database.

The UGD is a computerized database comprising numerous database records, or entries, residing on a single or multiple database servers such as servers 1315 described above with respect to FIG. 13. With reference to FIG. 22, an exemplary database record 2800 for a fictitious location is shown. The record 2800 preferably includes a ULA address 2802 and one or more PLA addresses 2804 (preferably having the same prefix as the ULA, e.g., US.CA.IRV) to discretely identify the record 2800 for accessing the same. In addition to the ULA/PLAs, the record 2800 may generally include basic, static content such as a business' or other entity's name 2808 and address 2810. Additional static content may include, but not by limitation, contact information (e.g., telephone number, facsimile number, e-mail address, Internet website address, wireless website address), what side of the street the business is located on, e.g., North/South/East/West, the side of the street that access is not available from, a specific site map, an utility easement schematic, preferred routing to the location for deliveries vs. customers, routing from a specific highway intersection, and latitude and longitude coordinates of the business location. The record 2800 may include more rich, semi-static content such as, but not by way of limitation, store hours, where to park, credit cards accepted, and inventory. The record 2800 may also include dynamic information such as, but not by way of limitation, movie times, specials, coupons, and discounts at a store. Real-time information such as, not by way of limitation, inventories and auction prices, may also be located in the record 2800. Finally, the database record 2800 may include one or more generic categories of business or other activity, e.g., pizza, cars, movies, as a non-exclusive secondary naming convention. These generic categories may be used to refer users to specific business or other entity locations based on a keyword search for such categories.

It should be noted, any of the data described above may not be in the UGD, but instead replaced by a link in the UGD to that data. The link may be to other databases, information, or files where the data is located. In other words, each record in the UGD may contain references to data pertaining to the entity associated with the PLA and located outside of the UGD.

As mentioned, each record of the UGD is preferably keyed by a geocoded ULA, and one or more PLAs. The ULA/PLAs, especially the PLAs, are more user-friendly than those used in other geographical referencing systems, which are based on arcane mathematical coordinate schemes, e.g., latitude/longitude or Universal Transverse Mercator coordinates. As described above, a ULA incorporates a place-naming hierarchy, and a PLA may additionally incorporate reserved names, phrases, or abbreviations as identifiers that allow users to quickly and easily refer to a desired business or other entity for purposes of location-based searching, direction finding, map-production and commerce. For example, Johnny Rockets™ Restaurant in Costa Mesa, Calif., has a PLA address of US.CA.COM.JOHNNYROCKETS and an abbreviated, mobile address of JROCK (in certain instances, the country, state and city codes may be provided automatically). Because PLAs provide a well-defined, limited and structured notation, they facilitate both typed entry (e.g. easier to type "IRV.I-HOP" than "International House of Pancakes, Irvine") and voice recognition systems (e.g., easier to say and interpret IRV.IHOP (IRV-DOT-IHOP) than 15412 MacArthur Boulevard, Irvine, Calif.). Famous brand name products, e.g., WHOPPER, BIG MAC, or personal phrases, e.g., MARYS HOUSE, DOUGS BARMITZVAH may also be incorporated in PLA addresses.

PLA addresses are as important to real-world businesses as domain names are to e-businesses, because PLA addresses identify real-world locations and destinations for commerce just as domain names identify network locations and destinations for e-business. The ULA/PLA, especially the PLA, provides both a discrete identifier for a business' record in the UGD, and a user-friendly naming convention and interface for all types of electronic devices—from web phones to car navigation systems. Many of these devices have limited keypads, storage, displays, and bandwidth. Thus, the addition of ULA/PLA Addresses to records of the UGD enhances the value of the UGD by 1) providing the discrete identifier and naming convention allowing specific locations to be easily and precisely identified, 2) making it easier for users to find businesses and access their information, 3) providing a more accurate, real-time database of real-world locations and businesses, and 4) providing the infra-structure for coordinating the electronic execution of reservations, orders, purchases, and payments between real-world businesses and their customers through Internet enabled portable electronic devices. This, in turn, makes it more likely that users of portable electronic devices will utilize the UGD for conducting location-based mobile commerce. A larger user base increases the utility of the UGD to real-world businesses.

A. Creating the UGD

With reference to FIGS. 23-26B, exemplary methods for creating the UGD records will now be described. A UGD record is created by registering with a registrar one or more proprietary addresses with location-related information such as that described above for a listing of a business or other entity. The location-related information is associated and stored with a PLA address, which is utilized as a discrete identifier for the record in the UGD.

Two exemplary methods will be described below for creating a UGD record. The first method relates to creating a UGD record by obtaining a proprietary name and location-related information for businesses through an intermediary such as a Yellow Page Provider. The second method relates to creating a UGD record by obtaining the proprietary name and location-related information for businesses by a more direct method such as through a web page over the Internet. Although two exemplary methods are described for creating a UGD record, it will be readily apparent to those skilled in the art that other methods exist.

The first exemplary method for creating a UGD record is to obtain the location-related information for a business or other entity through an intermediary such as Yellow Page providers ("YP Providers"). Other intermediaries with more of an Internet presence that may be used include web portals such as AOL™, Yahoo™. Currently, regional YP Providers sell advertising in physical and Internet Yellow Pages to businesses in their regional area of coverage. As a result, regional YP Providers have location-related databases for businesses in their region, but not other regions. Location-related information from the various regional YP Providers that together cover a desired geographical area, e.g., United States, may be transmitted to one or more central database servers such as servers 1315 described with respect to FIG. 13 for central storage of the multiple records 2800 (FIG. 22) in the UGD. The one or more proprietary names for a business may be obtained or registered by the YP Provider at the time the Yellow Pages advertising is initially sold or renewed to the business. Depending on the type of data selected (static to dynamic), the UGD listing cost may vary. Further, as described above, the YP Provider may sell one or more generic names, e.g., pizza, cars, movies, as non-exclusive secondary naming conventions that may be associated with a business' record so that the record gets direct hits for appropriate keyword searches. If PLA registration occurs at the time the advertising is sold/renewed, preferably some method of centralized PLA conflict checking such as that described below is performed by the central registrar so that conflicting PLAs do not become stored in the UGD. Before location-related information and one or more PLAs are stored as a UGD record, the street address of the business is geocoded and translated into an ULA address.

Figure 23:
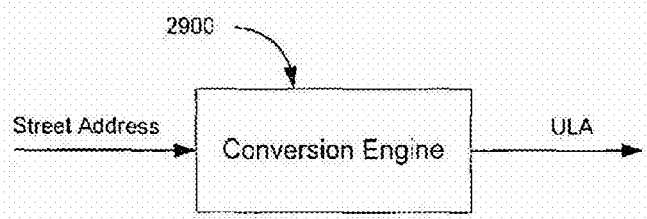
FIG. 23 is an exemplary geocoding conversion engine that may be used to convert a supplied street address to an ULA for storage in the Universal Geographic Database.

Central to the registry concept and process is generation and verification of a ULA from traditional address information, e.g. street address, street intersection, public place name, etc. Conversion of such traditional, variable address information, based on names, which can be ambiguous, into a fixed ULA, which is unambiguous, is known as geocoding. With reference to FIG. 23, the geocoding process will now be described in more detail. Geocoding is performed by a conversion engine 2900. The conversion engine 2900 converts the street address from each business listing to an ULA address that may be used as a coordinate identifier for each UGD record.

Figure 24:
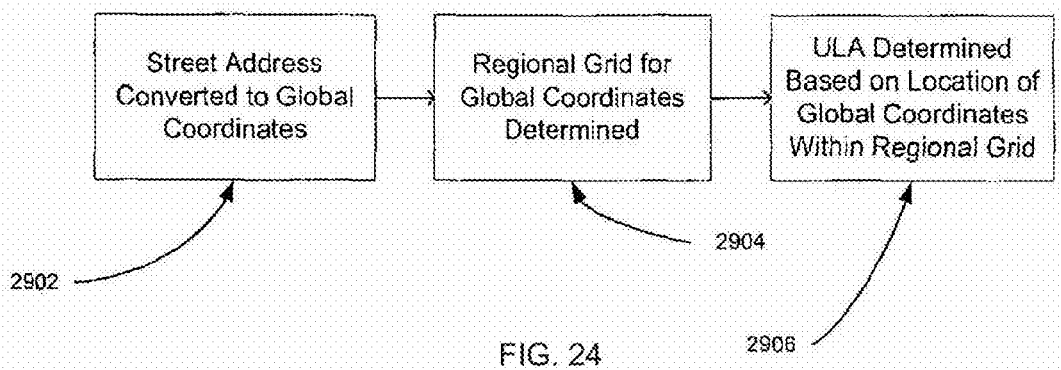
FIG. 24 is a flowchart that generally describes an embodiment of a geocoding process.

With reference to FIG. 24, at step 2902, the street address for the business listing is converted into latitude/longitude global coordinates such as those in the World Geodetic System 1984 (WGS-84) by any well-known software application for converting street addresses to latitude/longitude coordinates. Software applications for converting street addresses to latitude/longitude coordinates are well-known in the art and, therefore, will not be described in any further detail. It should be noted, however, that the geocoding resulting from such applications are based on interpolations and extrapolations and that various applications do not necessarily yield consistent results. It should also be noted that typically such applications charge a fee for each conversion of a street address, so multiple users seeking to convert the same street addresses to latitude/longitude coordinates (whether being used as a starting point or an intended destination) will cause repetitive conversions and, thus, unnecessary conversion fees.

Once the latitude/longitude coordinates of the street address are determined, at step 2904, the regional/local city reference grid corresponding to the street address latitude/longitude coordinates is determined. In one method of determination, the street address latitude/longitude coordinates may be compared to a master list of latitudes/longitudes of centroids or reference points for multiple reference grids, and the reference grid with the centroid or reference point closest to the latitude/longitude of the street address is then chosen as the reference grid. For example, the latitude/longitude coordinates for Go2 Systems, Inc. may be the following: latitude=33.6781, longitude=−117.8601. The reference grid with the closest regional centroid to Go2 may be that of Costa Mesa, Calif., i.e., US.CA.COM (Costa Mesa), and the nearest local centroid may be that of Irvine, Calif., i.e., US.CA.IRV (Irvine).

Determination of the reference grid may be based or at least partially based on the grid corresponding to the city name of the location. For example, a location in Santa Ana may be given an identifier based on Santa Ana even though it might be located closer to the centroid for Costa Mesa.

At step 2906, the ULA is determined based on the location of the street address latitude/longitude coordinates within the regional grid. In an embodiment of the invention, the regional grid may be thought of as a 100×100 km Cartesian plane, where the grid is subdivided into 10×10 cells, each of which also may be thought of as a 10×10 km sub-plane. Using the centroid latitude/longitude as the reference origin, the relative location of the street address latitude/longitude in the regional grid is given by converted pairs of eastings and northings, where the first digit is the easting and the second the northing. Eastings may be thought of as being along the x-axis and northings may be thought of as being along the y-axis. Once the appropriate 10×10 km cell is located, that cell may in turn be thought of as 10×10 km Cartesian plane further subdivided into 10×10 sub-cells, each of 1×1 km size. Next, the eastings/northings for the relative location of the street address latitude/longitude in that sub-cell can be computed. This process continues up to the desired level of accuracy for the ULA has been encoded, e.g., within 10 meters, 1 meter, etc. For example, the ULA address for Go2 Systems, Inc. (latitude=33.6781, longitude=−117.8601) may be determined to be US.CA.IRV.45.93.01.61.37. The "45" indicates that the initial 10×10 km cell occurs at easting 4 and northing 5 in the 100.times.100 km grid. The "93" indicates that the next 1×1 km sub-cell within that cell is located at easting 9 and northing 3. The "01" indicates that the next 100×100 meter cell is located at easting 0 and northing 1. The "61" indicates that the next 10×10 meter cell is located at easting 6 and northing 1. Finally, the "37" indicates that the 1×1 meter cell is located at easting 3 and northing 7. Once the ULA is generated by this process, or geocoded, it is verified and calibrated with respect to a map.

Geocoding, verification, and, calibration are only performed once for a location; it is not repeated for subsequent uses of the location. With other systems, every time a user attempts to search in an area or obtain computer generated driving directions, street addresses are geocoded through various geocoding engines (none of which work perfectly or provide consistent geocoding), which is inefficient. After geocoding, verification, and calibration, the ULA is stored with the other business listing information as a record in the UGD, similar to the record 2800 illustrated in FIG. 22.

The second exemplary method for creating a UGD record entails obtaining the location-related information for a business or other entity directly from the business or other entity over a communications link such as the Internet.

Figure 25:
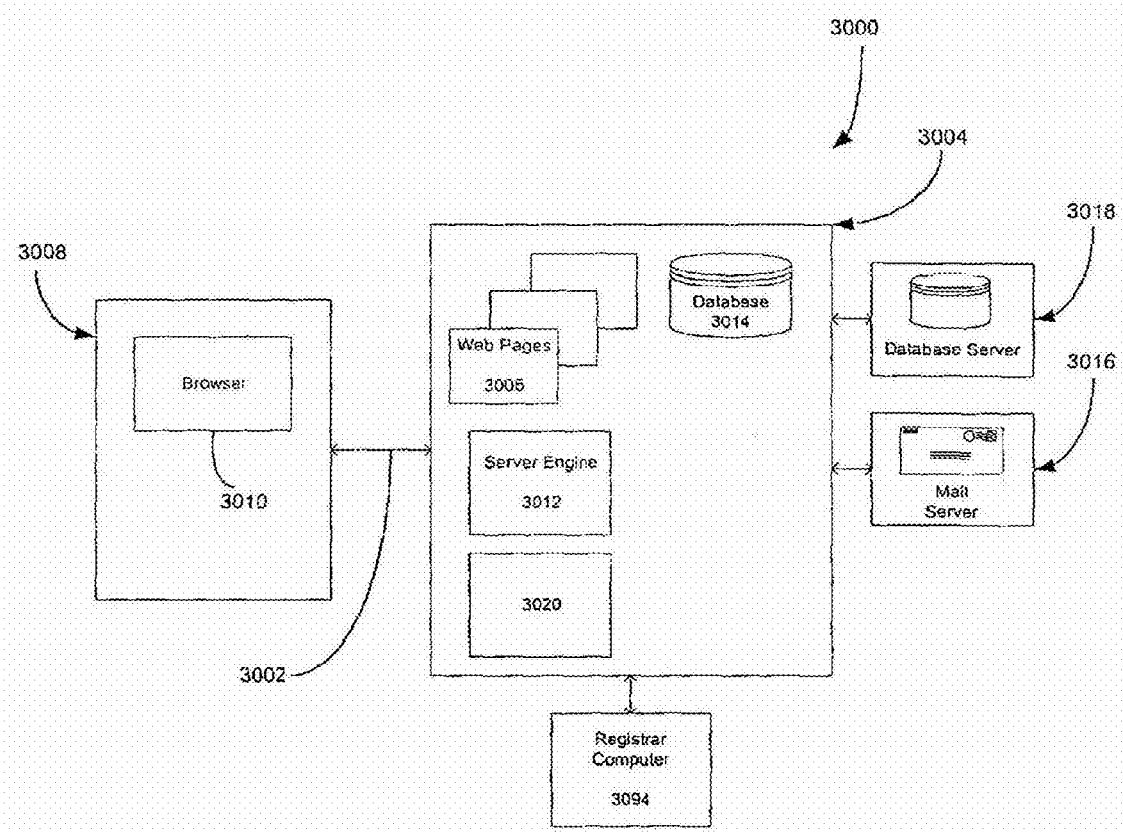
FIG. 25 is a block diagram of a Universal Geographic Database creation system constructed in accordance with an embodiment of the invention.

With reference to FIG. 25, the UGD creation method may by supported by a client/server arrangement 3000 over a communications link 3002 such as the Internet using the World Wide Web. The World Wide Web ("WWW") allows a server computer system 3004, i.e., Web server or Web site, to send graphical Web pages 3006 of information to one or more remote client computer systems 3008. The remote client computer system 3008 can then display the Web pages 3006. Each resource, e.g., computer 3004 or Web page 3006, of the WWW is uniquely identifiable by a Uniform Resource Locator ("URL"). To view a specific Web page 3006, the client computer system 3008 specifies the URL for that Web page 3006 in a request, e.g., a HyperText Transfer Protocol ("HTTP"), HDML, WAP, etc. The request is forwarded to the Web server 3004 that supports the Web page 3006. When the Web server 3004 receives the request, it sends that Web page 3006 to the client computer system 3008. When the client computer system 3008 receives the Web page 3006, it typically displays the Web page 3006 using a browser 3010. A browser is a special-purpose application program that effects the requesting of Web pages and the displaying of Web pages.

The server system 3004 includes a server engine 3012 and one or more databases 3014. The server engine 3012 receives HTTP requests to access Web pages 3006 identified by URLs and provides the Web pages 3006 to the one or more client systems 3008 requesting the same. Any well-known database software may be used to create and manage the one or more databases 3014. As used herein, server system includes one or more servers having any combination of hardware or software to implement the UGD record creation method discussed below. For example, but not by way of limitation, the system 3004 may include a primary server with one or more enhanced servers, e.g., mail server 3016, database server 3018, etc., to accomplish this purpose.

The client system 3008 may comprise any combination of hardware or software that can interact with the server system 3004. Example client systems include, but are not limited to, standard desktop computers, standard lap-top computers, internet-enabled mobile phones, television-based systems, vehicle computers, personal digital assistant devices (PDAs), internet-enabled computers, and other consumer products capable of interacting with a server system 3004. Such client systems 3008 preferably include a CPU, local working memory or RAM, non-volatile program memory or ROM, and may include some form of non-volatile external memory for data storage such any type of NVRAM, or magnetic or optical disk storage.

It will be readily apparent to one skilled in the art that the UGD record creation method discussed below may be implemented in various environments in combination with or other than the Internet. For example, as discussed in more detail below, the UGD creation system and method may be used in conjunction with an electronic mail environment in which information is transferred in an electronic mail message. The communication link 3002 may include one or more of the following in addition to, or instead of, the Internet: a local area network, a wide area network, point-to-point dial up connection, a wireless network, a cellular network, a wired network, dedicated data lines, Personal Communications Systems ("PCS"), microwave, and a satellite network.

Figure 26A:
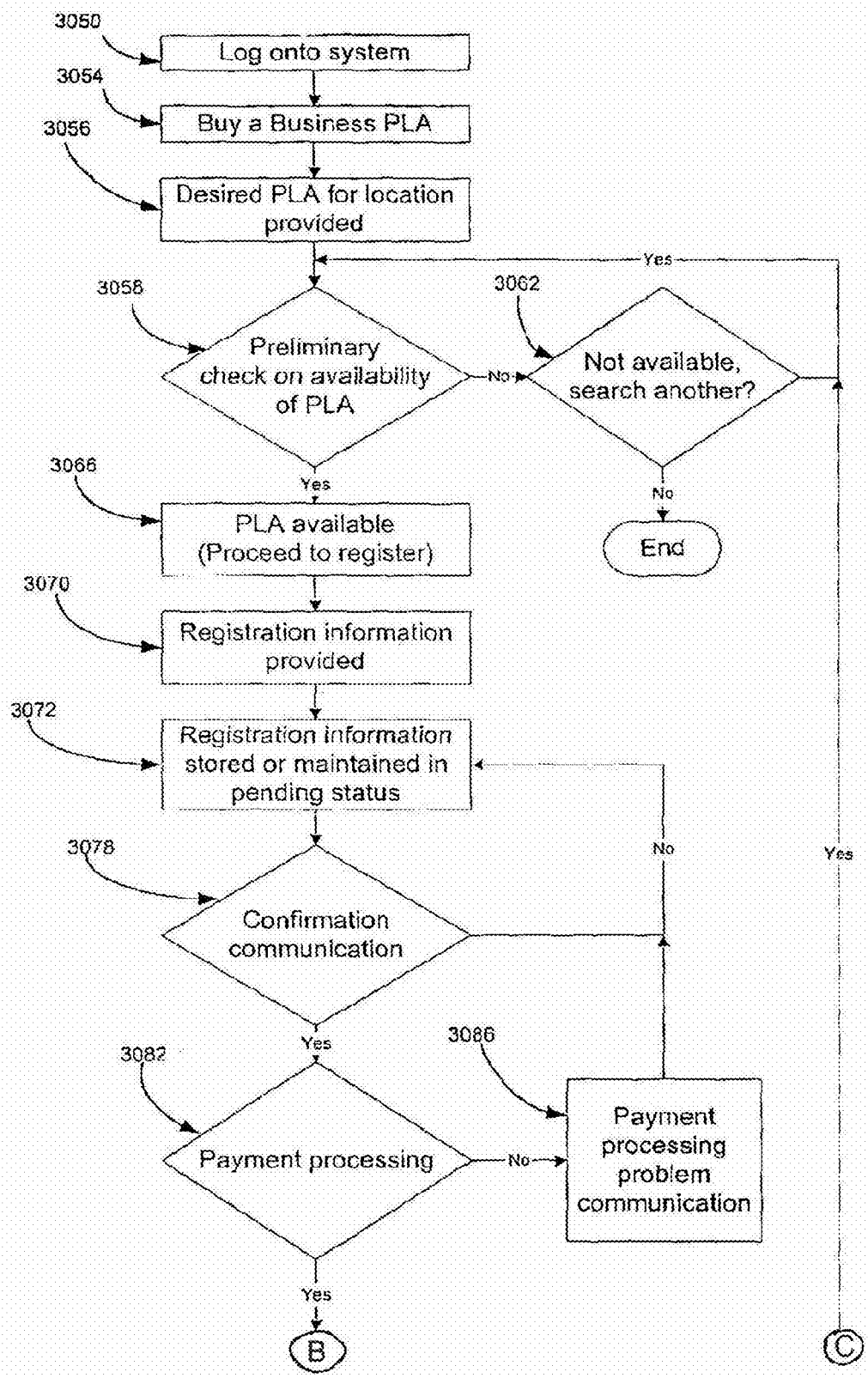
FIGS. 26A and 26B are a flowchart of an exemplary process for registering a business proprietary name in the Unified Geographic Database.
Figure 26B:
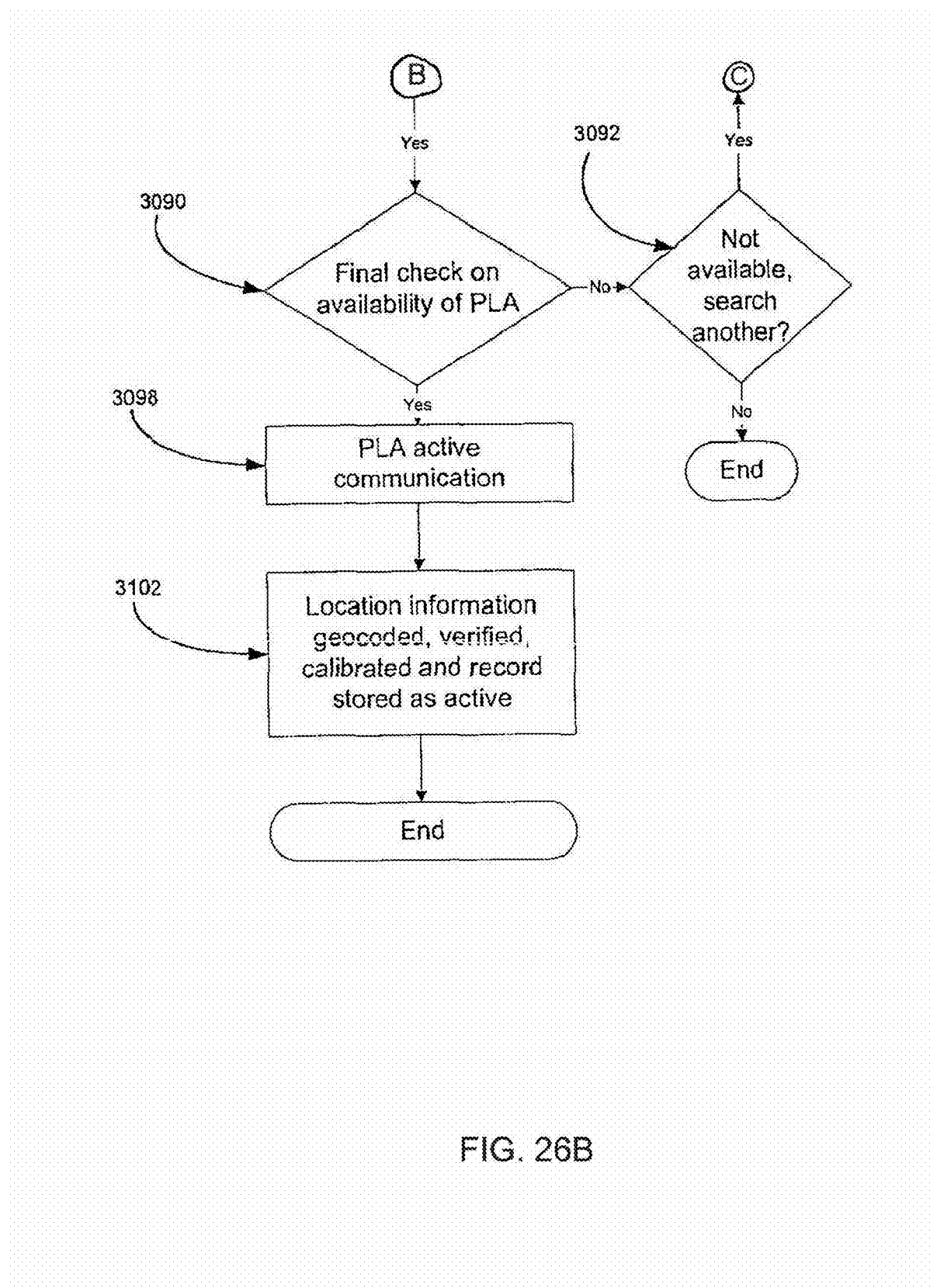

With reference to FIGS. 26A and 26B, an exemplary creation method for a UGD record by which a user directly registers a PLA and location-related information for a physical structure or geographic location with a registrar will now be described.

At step 3050, a user logs onto the server system 3004 of the registrar(s), establishing a communication link. It should be noted that user may be an individual, a corporation, a partnership, a company, a government, or any other entity. The registrar is preferably a central registrar such as Go2 Systems. However, one or more delegated registrars (e.g., AOL™, Yahoo™) may be used. In the preferred embodiment, the server system 3004 has a page on the World Wide Web, allowing the user to provide information through the interface of the Web browser 3010. However, as described above, the UGD record creation method discussed below may be used with other types of networks. When the user logs onto the server system 3004, a home web page may appear with a variety of information, including a link to another web page on the server system 3004 to buy and register a business PLA, also known as a Go2Address™.

At step 3054, when the user selects the link to buy a business PLA, a new web page is accessed from the server system 3004, which may request the user to input a PLA desired to be registered for a city/state.

At step 3056, after the above information is provided, the desired PLA and the positional information (city/state) are submitted to the server system 3004. The PLA and the positional information are associated and stored on the server system 3004. In an alternative embodiment, multiple PLAs may be entered for a location. For example, a user may want to register one or more PLAs related to the name of a business, e.g., BURGER KING, BK, and one or more PLAs related to brand names for the business, e.g., WHOPPER.

At step 3058, the server system 3004 may perform a preliminary search or query for the PLA (for the city and/or state identified) in the one or more databases 3014 of the server system 3004 to determine if the PLA is available, i.e., whether a conflict exists in the particular city for the requested PLA. This may include formulating a database query based on the proprietary name(s) and at least one geographical location identified and issuing the database query. The server system 3004 may include one or more automatic intelligent filters to determine if a conflict exists in the particular city for the requested PLA. The one or more filters may be used, for example, to prevent the registration of certain names, e.g., generic names, profanity, derogatory names, names that are registered trademarks, etc. The one or more filters may be triggered during the formulation and issuance of the database query. Alternatively, or in addition to the one or more automatic filters, as described in more detail below, manual subjective input may be provided by the UGD central registrar to determine if a conflict exists for a desired PLA. A PLA may be automatically or manually reserved on an international, country, state, city, or other basis.

To register multiple locations and/or reserve a PLA on the state, national, or international level, the user may be instructed to contact the central registrar, or the process may be automated in a manner similar to that described above.

Preferably, a submitted PLA that is identical or similar to a reserved PLA will be refused registration in the UGD. For example, McDonald's® may reserve MCD and MAC for McDonald's® PLAs that are similar to these reserved PLAs, e.g., MACK, MACD, MACDONALD, etc., will be refused registration to prevent squatting practices. PLAs that are derivations of other PLAs, e.g., mcd.kids, mac.geo, macdonald.tv will also be refused registration. This, in essence, gives a company such as McDonald's® more protection than they would get under the current domain name registration systems unless they register every potential alternative. If one or more delegate registrars exist (e.g., AOL™, Yahoo™), the conflict or PLA availability checking is preferably done at the central registrar. If a representative of a nationwide enterprise such as JIFFY LUBE™ wants to register the PLA "JIFFY LUBE" or an abbreviation of JIFFY LUBE™, i.e., "JLUBE" for all possible ULA locations in the United States, a conflict search for the desired PLA in the one or more databases 3014 for all of the PLAs in the United States may be conducted. These locations in the form of a store list, including store street addresses (and possibly other related information such as store hours, telephone number, etc.) for all the restaurants are preferably electronically transmitted to the server system 3004 and stored in the one or more databases 3014 and assigned a pending status until it is determined that a conflict with other PLAs does not exist and payment has occurred.

Options may exist for the user to register one or more PLAs as premium listings with richer, more dynamic data than the static data such as name, street address, and contact information. As with premium listings in the physical Yellow Pages, a customer/client may distinguish its business from that of others by highlighting its appearance in some way, and thereby offering users the ability to easily access information about the premium advertiser. Associated with this PLA, additional information or links to additional information such as store hours, number of years experience, types of products or services, etc. may be stored in the UGD record. Depending on the type of data selected (static to dynamic), the listing cost may vary. Further, as described above, the business or other entity may purchase or obtain with registration one or more generic categories, e.g., pizza, cars, movies, as non-exclusive secondary naming conventions that may be associated with a business' record so that the record is readily identifiable in appropriate keyword searches.

In an alternative embodiment of the invention, a PLA availability search for multiple locations on the state, national, or international level may be automatically accomplished via a web page 3006 similar to that described above. For example, the web page 3006 and server system 3004 may allow for a search or query at levels higher than the city level. To effect this, in part, the web page may also allow for location information higher than the state/province level to be input, e.g., country, international. The server system 3004 may be configured so that it searches in accordance with the most detailed level of location information input by the user (if city information is provided, the server system 3004 will search at the city level, if city information is not provided, but state information is provided, the server system 3004 will search at the state level, etc.). For example, if the user wants to check whether a PLA is available for multiple locations on a national level such as in the JIFFY LUBE™ example above, the user could input US or United States in a country field on the web page without entering any information in the city or state fields. This would cause the server system 3004 to formulate and issue a database query for the desired PLA in the one or more databases 3014 against all of the PLAs in the United States to determine if and where the name is available in the United States. If a conflict was not found, one or more web pages may be provided by the server system 3004 instructing the user how to download the location information (and possibly other related information such as store hours, telephone number, etc.) for all the locations for the PLA to the server system 3004 to be stored in the one or more databases 3014.

At step 3062, if a conflict does exist, a web page from the server system 3004 may indicate a conflict.

The user may stop the registration process at this point or add the requested information for a different PLA and search the one or more databases of the server system 3004 to determine if a different PLA is available (step 3058).

At step 3066, if a conflict does not exist, a web page from the server system 3004 may indicate so.

At step 3070, the user may proceed to register, accessing a new web page from the server system 3004, which may request from the user to provide the location-related information such as that described above and other registration-related information, e.g., credit card information. The user may provide the requested information by direct web page entry. In an alternative embodiment of the invention, some or all of the above information may be provided automatically. For example, the location information requested above may be supplied by an automatic location device such as ALI device 1406 described above. Also, mass registrations of multiple locations for one or more PLAs may be done through an automated process of downloading a file or the like.

At step 3072, the user transmits the user and payment information to the server system 3004. The PLA, and location-related data, and payment information may be stored along with a pending status indication in respective data fields in a pending or holding database 3074 on a database server of the server system 3004.

At step 3078, an email or other message server of the server system 3004 preferably sends an email or other message to the user at the email address provided to confirm registration. The user may be requested to reply to the email to confirm that registration was desired. If the user does not reply to the confirmatory email, the user information, payment information, PLA, and geographic locations may be maintained in the pending or holding database of the database server of the server system 3004 in a pending status condition, and payment processing may be put on hold until confirmation is received. If the user replies to the confirmatory email, control may be passed on to the next step.

At step 3082, credit card payment processing may occur by the server system 3004 in any well-known manner. If a problem occurs in payment processing, at step 3086, the user may be notified accordingly via an email or message sent by an email or message server of the server system 3004 and the user information, payment information, PLA, and geographic location information may be maintained in the one or more databases 3074 on the server system 3004 in a pending status condition until authorization or other payment conditions occur. If payment processing occurs without any problems, or if any problems are corrected, control may be passed on to the next step.

In a preferred embodiment of the invention, to further ensure that a desired PLA is available, a step 3090 may be performed. At step 3090, an automatic email or other message may be sent from a email or other message server 3016 (FIG. 25) of the server system 3004 to one or more UGD registrar computer systems 3094, indicating that approval is sought for the particular PLA. The one or more registrar computer systems 3094 preferably include custom interface software that allows a respective operator of the one or more computer systems to accept or reject registration of the particular PLA. A final conflict check for the desired PLA is performed to ensure that a conflict does not exist between the desired PLA and one or more existing or potential PLAs. It may be determined, for example, that the desired PLA may conflict with a potential PLA such as a registered trademark of a company and, thus, providing a basis for refusing registration of the desired PLA. If an operator rejects the registration of the desired PLA via the interface software, at step 3092, an email or other message indicating that a conflict exists or the like may be sent to the user via the email server 3016 of the server system 3004, and the user may be prompted to select another PLA at step 3058. If a conflict does not exist, the individual accepts the registration of the desired PLA via the interface software. This may cause, at step 3098, an automatic email or message to be generated by the server system 3004 and sent to the user indicating that registration has been accepted and that the registered PLA is now active, and control may be passed on to the next step.

In an alternative embodiment of the invention, instead of a preliminary availability check 3058 and a final availability check 3090, only a single PLA availability check may be performed.

At step 3102, the above-mentioned location information may be geocoded to an ULA address, verified and calibrated as described above with respect to FIGS. 23 and 24. The ULA, PLA(s), and location information for the business may then be stored. After geocoding, the record data may be updated to an active status, making PLA and location-related data for the business selectively accessible to users of locational systems via the Internet. The above-mentioned data could be converted to an active status by, for example, changing the status field for the above-mentioned data from a pending status to an active status or by transferring the above-mentioned data to another database, e.g., an active status database, in the same or a different server.

A method for registering a free personal Go2 Address™ or PLA with location-related information for an individual, non-profit organization, etc. may occur in a similar manner. The UGD record creation method described immediately above provides a direct, easy and convenient way for geocoding and registering a PLA for each of the geographical locations of a business or other entity, thereby creating records for them in the UGD. The resulting UGD is sortable and selectively downloadable by users of locational systems such as the client computer system 3008 via the Internet. It will be readily apparent to those skilled in the art that one or more of the steps of the PLA registration method described above with respect to FIGS. 26A and 26B may be eliminated or replaced with one or more related steps without departing from the spirit and scope of the invention.

Although the UGD has been described as being centralized, in alternative embodiments of the UGD, the UGD may be de-centralized and located on different servers, e.g., part on Go2™ servers and part on, for example, AOL™ and/or Yahoo™ servers. Different types of data of the UGD may be located in different locations, e.g., static UGD data may be located on AOL™ and/or Yahoo™ servers and dynamic UGD data may be located on Go2™ servers. Alternatively, all or a portion of the UGD may be located closer to the user, on one or more carrier gateways, e.g., on AOL™ and/or Yahoo™ servers, or one or more wireless carrier platform gateways, or downloadable into a device.

B. Maintaining the UGD

The UGD is maintained up-to-date by the UGD registrar in near real-time in order to ensure its accuracy and completeness. This updating directly benefits registered businesses because it allows the most current location-based information, including in particular new (and changed) store locations, as well as topical information such as store hours and in-store promotions, to be accessible to customers via the UGD. By contrast when a store changes its location or its phone number, its physical Yellow Pages listing may be out-of-date for up to a year, until the book is reprinted in toto. With the UGDs up-to-date information and directional capabilities, registered businesses know that users of the UGD will be able to find their locations and other information about them easily and quickly from a single source. For instance, if a franchise-business operator such as McDonald's®, opens 30 new stores per month, it can utilize the UGD to distribute that information to all users of web-enabled devices immediately—a result which is impossible for McDonald's® to achieve today. As described above, physical Yellow Pages books are typically updated annually. The near real-time nature of the UGD also benefits users because they will always know they can access one source to find the most up-to-date information on any business' location, new locations, stores hours, etc. The UGD can be utilized to distribute rich information (e.g., real-time specials, discounts, coupons, current travel instructions based on current traffic conditions, a parade, a special event, or road construction, etc.) to all or select (e.g., geographically relevant) users of web-enabled devices immediately. This may be done at the store, district or regional, or national office level.

Use of PLAs, rather than the ULA, to identify UGD records is advantageous because even in the event of a changed location, information in the UGD may be updated without interruption. The ULA, by contrast, changes when a business', or other entity's, physical address changes. This feature allows the necessary frequent updating of UGD records—especially those for a large company such as McDonald's®—to be made transparently to users of the UGD. An advantage of both PLAs and ULAs is that both can be used consistently across all types of platforms (e.g., wireless web-enabled devices, car navigation systems, desktops, etc.).

In an embodiment of the invention, a business or other entity may change the location-related information in their UGD record near real-time via a Web interface similar to that described above for registering a PLA (creating a UGD record).

C. Using the UGD

Figure 27:
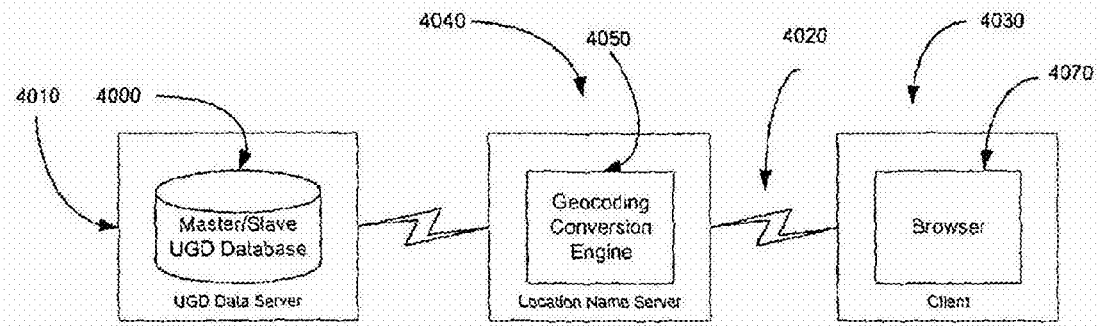
FIG. 27 is a block diagram of an embodiment of a Tier 2 level server arrangement including a UGD server, a Location Name Service server, and a client.

With reference to FIG. 27, a UGD 4000 resides on one or more computer data servers 4010, and information therein is sortable and selectively downloadable over a network communication link 4020, such as the Internet, by users of a wide variety of client access devices 4030 (e.g., online Internet, wireless, voice 411 directory assistance, voice activated portals). For this purpose, the ULA/PLA address serves as the discrete identifier to access location-related information in the UGD 4000.

The UGD 4000 may be centralized or distributed. (A centralized configuration is described above, and below, for simplicity.) In general, database distribution provides system performance benefits of reliability and scalability, at the expense of system complexity. Even when the UGD 4000 is distributed, a centralized version of the (same) UGD 4000 may be retained. The central UGD 4000 is also referred to as the Master UGD; distributed copies/portions of the UGD 4000 are referred to as Slave UGDs. In a distributed configuration, the Master and Slave UGDs must be synchronized in varying degrees and manners according to the database management software used to implement them.

In both centralized and distributed configurations, UGD Master/Slave databases 4000 are maintained by transactions against individual records: additions, updates, and deletions. In general, these transactions are initiated by the business requirements, and entail ancillary checks to ensure database integrity when they occur, so that the UGD 4000 remains accurate, complete, and up-to-date at all times.

The intention of the UGD 4000 is to facilitate navigation and commerce by providing real-world location information on demand across network communication links, in both wired and wireless environments. With easy access to such information, both simplifications and enhancements of current location-based practices, as well as entirely new practices, are possible. The key in all cases is identifying and retrieving relevant information from the UGD 4000, based on the user's actual and/or planned location(s).

Associated with the UGD 4000 is one or more Location Name Servers (LNSs) that allow geocoding of colloquial place names and addresses into ULA/PLAs, and retrieval of UGD information according to these ULA/PLAs. One or more LNSs 4040 include a geocoding conversion engine 4050 similar to conversion engine 2900 described above with respect to FIG. 23 that serve the geocoding function. Just as Domain Name Servers support the Internet and Web in resolving a domain name (e.g. go2online.com) into an IP address (e.g. 165.32.43.44), LNS facilitates use of computer networks for location-based activity, by resolving colloquial addresses to real-world locations and symmetrically by resolving ULA/PLAs back to real-world street addresses (reverse geocoding). Since the ULA/PLAs are explicitly formatted they can be rapidly parsed; since they are hierarchical in nature, they permit efficient partitioning and indexing of the UGD 4000 as well.

Figure 28:
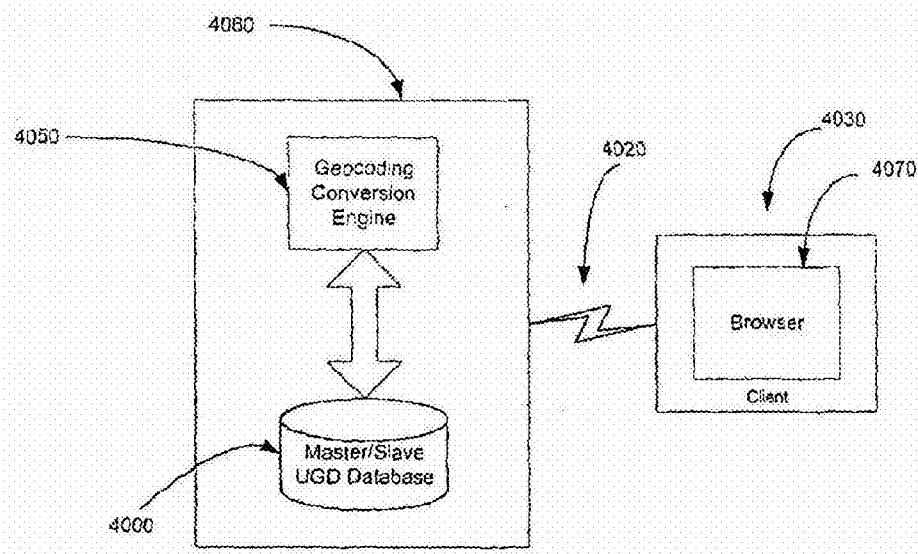
FIG. 28 is a block diagram of an embodiment of a Tier 1 level server arrangement including a UGD, a geocoding conversion engine, and a client.

FIG. 27 illustrates how the UGD 4000 (on a database server 4010) and the geocoding engine 4050 (on a LNS 4040) may be combined in a Tier 2 level server configuration for communication with one or more client devices 4030. FIG. 28 illustrates how the UGD 4000 and the geocoding engine 4050 may be combined (on a combined server) in a Tier 1 level server configuration for communication with one or more client devices 4030.

Conventionally, real-world locations are identified and referenced by physical address: place names, street addresses, cross-streets, and the like. Such places can be searched sequentially in the UGD 4000, with limited reliability. A much more efficient approach is to geocode them on the LNS 4040 via WGRS into ULA/PLAs that can be used to access the UGD 4000 directly. Thus, the UGD 4000 may be queried in several different ways to access location-based information. Some examples of these include:

i. Physical Address Query

The UGD 4000 may be queried using conventional physical address information. This is the least efficient method as ambiguities in address spelling; punctuation and phonetics allow for infinite variations in interpretation and ultimately introduce delayed responses.

ii. PLA Query

The UGD 4000 may be queried using registered PLAs. Since valid PLAs are known a priori, and referenced to single or multiple locations via ULAs (below), this is an efficient and reliable method for accessing the UGD 4000 for lists of location-based information, where elements of the list share a common registration, i.e. proprietary place name.

iii. ULA Query

The UGD 4000 may be queried using registered ULAs. Depending on the specified granularity, the ULA may be used as an extremely efficient method for accessing the UGD 4000 for a single instance of location-based information or at varying levels of granularity.

iv. Traditional Latitude/Longitude Query

The UGD 4000 may be queried using standard WGS-84 latitude/longitude values. Since a latitude/longitude values pair is inter-convertible with a ULA, at a specified precision, this amounts to ULA query (above) in an alternate form. This option is provided for compatibility with many existing software packages that deal with global positioning systems (GPS), geographic information systems (GIS) and the like.

The specific mechanism of UGD access, supporting all four of these modes, and possibly others, will now be described. A web browser 4070 on the client 4030 may include software for understanding a World Geographic Referencing Protocol to facilitate accessing the UGD 4000. This would allow a browser to forward ULA/PLA related queries and requests to an appropriate LNS or UGD registrar. For example, the world wide web ("web") is a service universally recognized by web browsers. The content of web pages is typically provided to a web browser in the Hyper Text Markup Language ("HTML"). Delivery of the HTML content uses the Hyper Text Transport Protocol.

Similarly, web browsers recognize additional services other than the world wide web. For example, file transfer services are recognized in addition to remote access services. These different services are indicated in the structure of requests submitted in a web browser. For example, three such requests may look like the following:

http://www.domain.name
ftp://ftp.domain.name
telnet://telnet.domain.name

In all of the above examples, the service is identified by the label preceding the "://" separator. This allows the web browser to resolve the IP address of the recipient (via DNS) and send the request to the appropriate corresponding service on the recipient. So the web service request would be sent to the IP address corresponding to the domain name www.domain.name. The file transfer service request would be sent to the IP address corresponding to the domain name ftp.domain.name. And the remote access service request would be sent to the IP address corresponding to the domain name telnet.domain.name.

The service at the receiving end is identified by resolving the service identifier to a well-known port number for that particular service. For example, web services are universally assigned to port 80. Such assignments are well known to those skilled in the art, and can typically be found configured in a services file on the computer hosting the requested information.

Advantageously, this scheme may be employed to construct queries for the UGD. For example, a structure for a UGD query within a web browser may be:

wgrp://us.ca.irv.go2

In such a case, the wgrp label may identify the ULA/PLA address lookup request. A web browser properly configured may respond to such a query by providing the ULA/PLA address to the appropriate LNS or UGD server.

For example, typing in a PLA address request such as wgrp://us.ca.irv.go2 on a web browser will display information about Go2's physical location from the UGD 4000, analogous to typing in a web address to reach the web property. Once such a spatial reference is made, then higher-order portions of the ULA/PLAs are "remembered" as a starting point for subsequent references, until over-ridden. Thus, wgrp://go2 and wgrp://IHOP, could be used as shortened notations for Go2 and International House of Pancakes in Irvine, Calif., respectively. In general, it may be desirable to preset the ULA/PLA of a well-known location as a starting point for references and searches. This starting point may be prompted from the user, or selected from a list of frequently-used starting points, known from prior usage; or it may be determined transparently by automatic location identification ("ALI") technology in some devices. Even with ALI, remote ULA/PLAs may be specified to establish a starting point for references and searches.

In an embodiment of the protocol, typing in keywords such as wgrp://hotels may cause the browser to function as if this word was typed in a search engine. This will return a set of local hotels. If a user has not designated a starting point yet, and the device is not ALI capable, the user may first be prompted with a pop up window or website where the user may log onto the website, enter a street address, or Go2 address as a starting point.

In another embodiment of the protocol, typing in retailer specific brand names such as bigmac, or whopper, may return a list of locations from the UGD that have those words associated with them. For example, entering wgrp://bigmac may return a list of local McDonald's® stores, entering wgrp://whopper may return all Burger King® locations.

Queries received by a web browser may be communicated to the UGD or an LNS in a standardized format. A method for sending a query in such a standard format will now be described. The standard format may be based on the eXtensible Markup Language (XML), which may be controlled by W3C (the World Wide Web Consortium).

An exemplary Go2 query transaction may include accessing a LNS or the UGD from a client by formatting the appropriate query and placing it within an agreed upon transport mechanism. The LNS or the UGD will attempt to perform internal database searches for the request and return those records to the requestor. In the case where a LNS attempts to handle the query, if the LNS is unable to respond, it may submit the query to the UGD for fulfillment.

Figure 29:
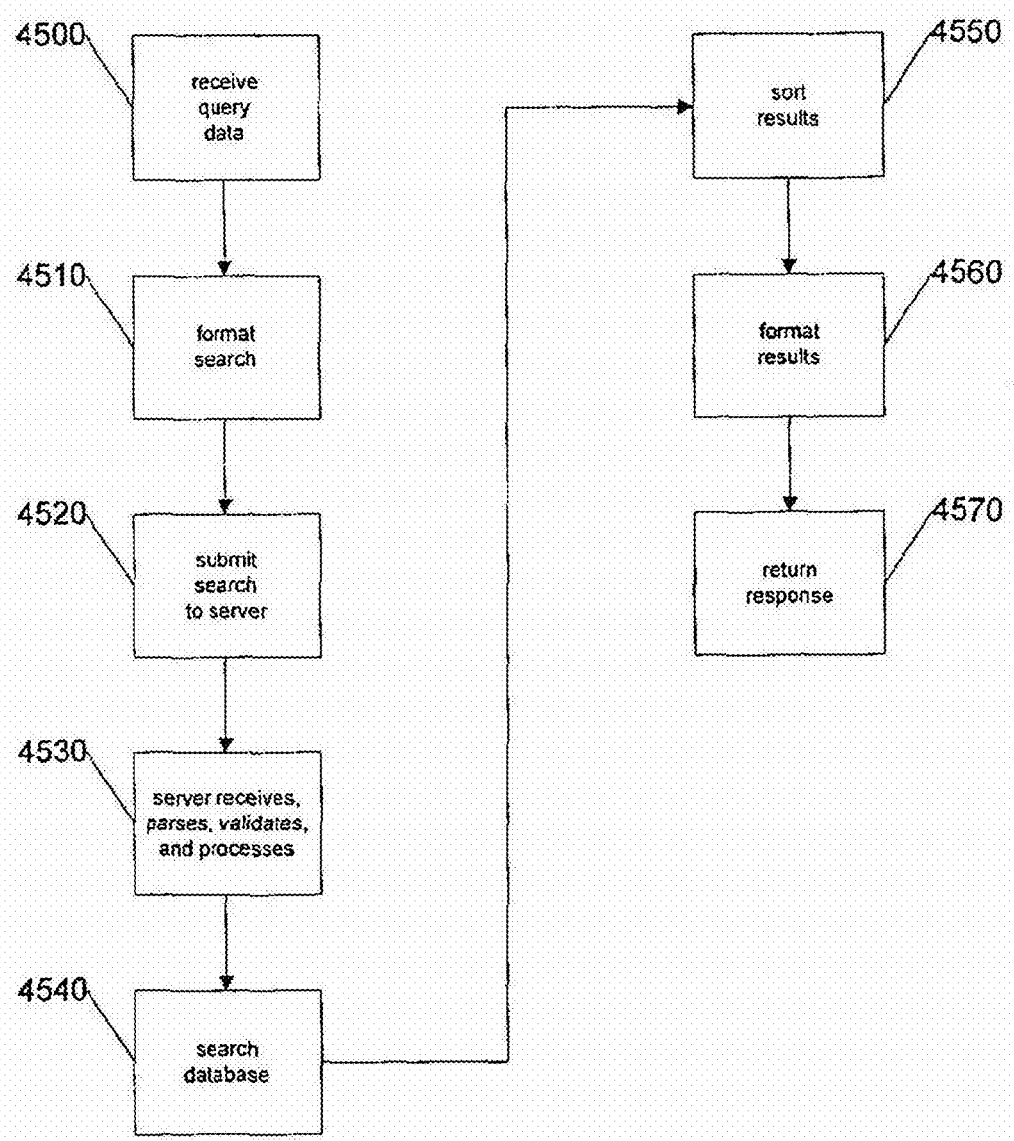
FIG. 29 is flow chart for an exemplary Go2 query transaction for retrieving information from records in the UGD.

With reference to FIG. 29, in an exemplary Go2 query transaction for retrieving information from records in the UGD, the query data is first received from the requestor, as illustrated in step 4500. The query data is preferably entered by the requester through a web page interface. In an alternative embodiment, the query data may be received using a message service such as electronic mail. The query may be comprised of a plurality of data elements, including a client ID, transaction ID, listings request data, search radius (in miles or kilometers), search type, search value, and a starting location. The query may also include one or more of the enumerated query types discussed above (i.e., physical address, PLA, ULA, latitude & longitude).

Once the query data has been received, the data is formatted into an appropriate request, as shown in step 4510. In one embodiment, the request may be formatted using XML. Alternatively, requests may be formatted using HTML or any other high level programming language or interpreted language such as Perl.

Upon formatting the request into a proper query, the query is submitted to a server for processing, as seen in step 4520. The query may be submitted directly to the UGD or alternatively to a LNS. Advantageously, the use of a LNS can decrease the workload on the UGD and improve communication speeds for queries and registrations alike. A query may be submitted to the server using the standard http transport protocol. For example, the query data may be posted to a URL specified by Go2 Systems and known to the browser. Alternatively, the query may be submitted to the server using a wgrp protocol. In one embodiment, the wgrp protocol may be optimized for delivering Go2 queries and responses.

The server receives and parses the query, as illustrated in step 4530. Additionally, the server may validate the query based on a client identifier or other data element employed to verify the authenticity or priority of the query. Similarly, the server may process the query based on a type identifier or other identifier that may advantageously narrow the scope of the query to a particular subset of the UGD database.

Once the query has been received and parsed and otherwise validated and processed, the server can execute the query in the database, as shown in step 4540. In one embodiment, if the search is conducted by a LNS and the search does not return any results, the LNS may forward the query to the master UGD for an authoritative response to the query. For example, the LNS may receive no results from a query when the LNS locally maintains a partial subset of the complete UGD database. The corresponding results from the search can then be sorted by the server, as seen in step 4550. Advantageously, the results of the search can be sorted according to their geographical proximity to the requester.

Once the results of the query have been received and sorted, the results may be formatted before being returned to the requester, as shown in step 4560. In one embodiment, the results of the query may be formatted in XML for presentation using an XML enabled browser. Alternatively, the results may be formatted using HTML or some other equally displayable format. After formatting the results, the results can be sent to the requester, as illustrated in step 4570. As indicated above, the format for the transmission of the response may include http, wgrp, or any other communication protocol capable of data transport over a communications network.

Figure 30:
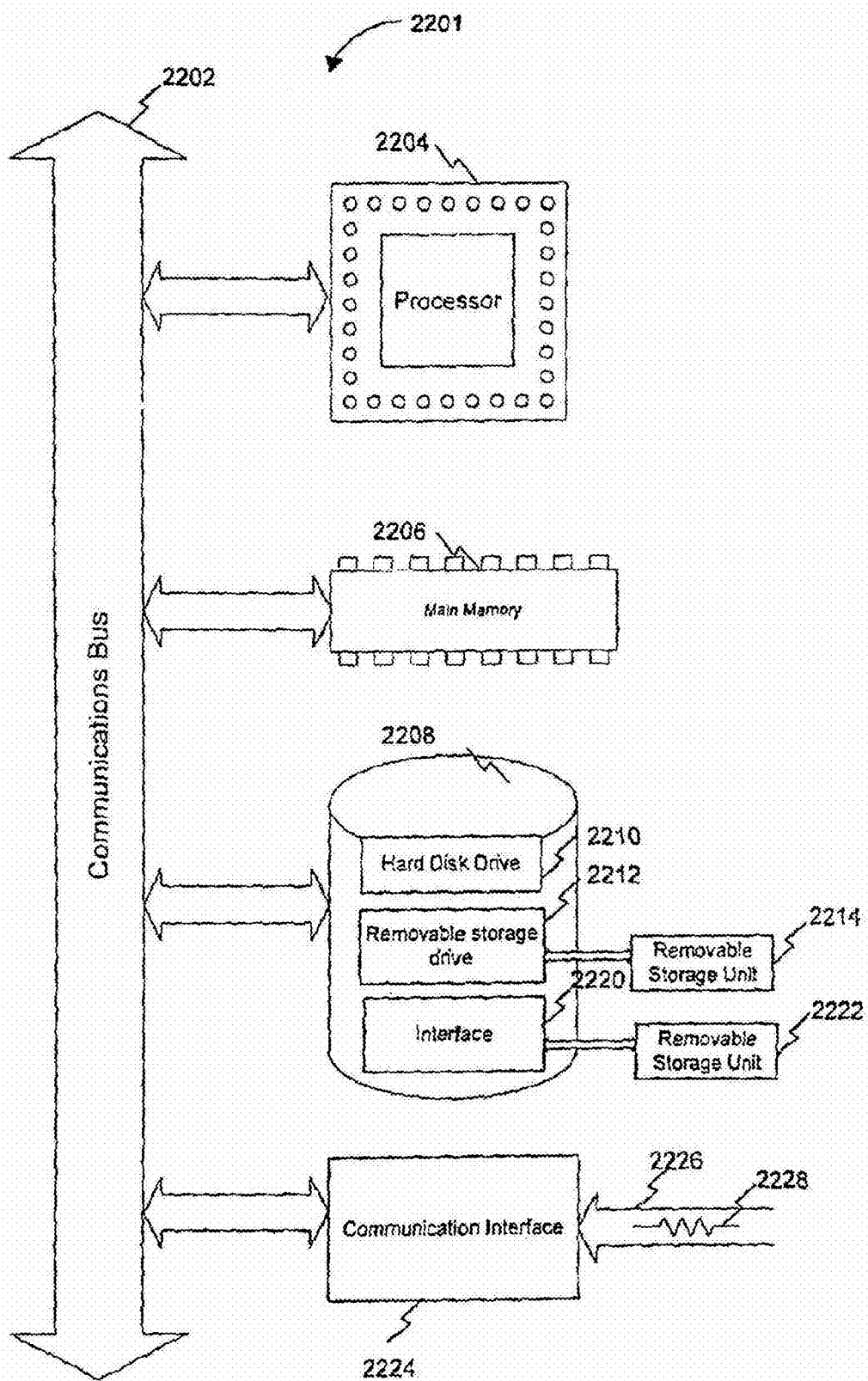
FIG. 30 is a block diagram of a computer useful for implementing components of the present invention.

The UGD and other aspects described above in sections I-VI may be implemented using hardware, software or a combination thereof and may be implemented in one or more computer systems or other processing systems. In fact, in one embodiment, the invention is directed toward one or more computer system capable of carrying out the functionality described herein. An example computer system 2201 is shown in FIG. 30. The computer system 2201 includes one or more processors, such as processor 2204. The processor 2204 is connected to a communication bus 2202. Various software embodiments are described in terms of this example computer system. After reading this description, it will become apparent to a person skilled in the relevant art how to implement the invention using other computer systems and/or computer architectures.

Computer system 2202 also includes a main memory 2206, preferably random access memory (RAM), and can also include a secondary memory 2208. The secondary memory 2208 can include, for example, a hard disk drive 2210 and/or a removable storage drive 1012, representing a floppy disk drive, a magnetic tape drive, an optical disk drive, etc. The removable storage drive 2212 reads from and/or writes to a removable storage unit 2214 in a well-known manner. Removable storage unit 2214, represents a floppy disk, magnetic tape, optical disk, etc. which is read by and written to by removable storage drive 2212. As will be appreciated, the removable storage unit 2214 includes a computer usable storage medium having stored therein computer software and/or data.

In alternative embodiments, secondary memory 2208 may include other similar means for allowing computer programs or other instructions to be loaded into computer system 2201. Such means can include, for example, a removable storage unit 2222 and an interface 2220. Examples of such can include a program cartridge and cartridge interface (such as that found in video game devices), a removable memory chip (such as an EPROM, or PROM) and associated socket, and other removable storage units 2222 and interfaces 2220 which allow software and data to be transferred from the removable storage unit 2222 to computer system 2201.

Computer system 2201 can also include a communications interface 2224. Communications interface 2224 allows software and data to be transferred between computer system 2201 and external devices. Examples of communications interface 2224 can include a modem, a network interface (such as an Ethernet card), a communications port, a PCM-CIA slot and card, etc. Software and data transferred via communications interface 2224 are in the form of signals which can be electronic, electromagnetic, optical or other signals capable of being received by communications interface 2224. These signals 2226 are provided to communications interface via a channel 2228. This channel 2228 carries signals 2226 and can be implemented using wire or cable, fiber optics, a phone line, a cellular phone link, an RF link and other communications channels.

In this document, the terms "computer program medium" and "computer usable medium" are used to generally refer to media such as removable storage device 2212, a hard disk installed in hard disk drive 2210, and signals 2226. These computer program products are means for providing software to computer system 2201.

Computer programs (also called computer control logic) are stored in main memory and/or secondary memory 2208. Computer programs can also be received via communications interface 2224. Such computer programs, when executed, enable the computer system 2201 to perform the features of the present invention as discussed herein. In particular, the computer programs, when executed, enable the processor 2204 to perform the features of the present invention. Accordingly, such computer programs represent controllers of the computer system 2201.

In an embodiment where the invention is implemented using software, the software may be stored in a computer program product and loaded into computer system 2201 using removable storage drive 2212, hard drive 2210 or communications interface 2224. The control logic (software), when executed by the processor 2204, causes the processor 2204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While embodiments and applications of this invention have been shown and described, it would be apparent to those in the field that many more modifications are possible without departing from the inventive concepts herein. The invention, therefore, is not to be restricted except in the scope of the appended claims.

We claim:

1. A method of creating a Unified Geographic Database (UGD) by registering a proprietary name for a geographical location of an entity, the method comprising:
   receiving geographical location information for an entity;
   receiving a proprietary name for the entity;
   geocoding the geographical location information into a hierarchical address;
   storing the proprietary name, hierarchical address, and geographical location information as a record in the Unified Geographic Database; and
   converting the proprietary name into a domain-name like, proprietary locational address based on the geographical location information, and the proprietary name, and storing the proprietary locational address as the proprietary name in the record,
   wherein converting the proprietary name into a domain-name like, proprietary locational address includes determining a regional or local grid having a centroid closest to the geographical location of the business or entity, the regional grid represented by an A.B.C naming format, where A represents a country, B represents a state or province, and C represents a city, and prefixing this A.B.C format to the proprietary name to create the domain-name like proprietary locational address.

2. A method of creating a unified geographic database (UGD) by registering a proprietary name for a geographical location of an entity, the method comprising:
   receiving geographical location information for an entity;
   receiving a proprietary name for the entity;
   storing the proprietary name and geographical location information for the entity as a record in the Unified Geographic Database; and
   converting the proprietary name into a domain-name like, proprietary locational address based on the geographical location information and the proprietary name, and storing the proprietary locational address as the proprietary name in the record,
   wherein converting the proprietary name into a domain-name like, proprietary locational address includes determining a regional or local grid having a centroid closest to the geographical location of the business or entity, the regional grid represented by an A.B.C naming format, where A represents a country, B represents a state or province, and C represents a city, and prefixing this A.B.C format to the proprietary name to create the domain-name like proprietary locational address.

3. A method of creating a Unified Geographic Database (UGD) by registering a universal location address (ULA) for a geographical location of an entity, the method comprising:
   receiving geographical location information for an entity;
   geocoding the geographical location information into a ULA;
   storing the ULA and geographical location information as a record in the Unified Geographic Database;
   receiving a proprietary name for the entity and storing the proprietary name with the ULA and geographical location information in the record; and
   converting the proprietary name into a domain-name like, proprietary locational address based on the geographical location information and the proprietary name, and storing the proprietary locational address as the proprietary name in the record,
   wherein converting the proprietary name into a domain-name like, proprietary locational address includes determining a regional or local grid having a centroid closest to the geographical location of the business or entity, the regional grid represented by an A.B.C naming format, where A represents a country, B represents a state or province, and C represents a city, and prefixing this A.B.C format to the proprietary name to create the domain-name like proprietary locational address.

4. The method of claim 1, wherein the proprietary name and the hierarchical address serve as alternate keys for accessing the record in the UGD.

5. The method of claim 1, wherein the proprietary name is registered for a geographical location with a central registrar through an intermediary.

6. The method of claim 1, wherein the proprietary name is registered for a geographical location directly with a single, central registrar over a communications network.

7. The method of claim 1, wherein the proprietary name is registered for a geographical location with a central registrar and one or more additional registrars.

8. The method of claim 1, wherein static location-related data for the entity is stored in the record.

9. The method of claim 1, wherein dynamic location-related data for the entity is stored in the record.

10. The method of claim 1, wherein real-time location-related data for the entity is stored in the record.

11. The method of claim 1, wherein a link to location-related data for the entity located outside the record is stored in the record.

12. The method of claim 1, wherein location-related data including one or more generic categories that relate to the nature of the entity is stored in the record.

13. The method of claim 1, wherein the proprietary name is an entity name or an abbreviated version of an entity name.

14. The method of claim 1, wherein the proprietary name is a brand name or an abbreviated version of a brand name that serves as an identifier of the entity as one of the entity's branded products or services.

15. The method of claim 1, wherein the step of obtaining a proprietary name includes obtaining multiple proprietary names for the geographical location of the entity.

16. The method of claim 1, further including conflict checking the proprietary name against other proprietary names to ensure a conflicting name is not registered.

17. The method of claim 1, wherein geographical location information includes a street address or latitude/longitude coordinates, the hierarchical address is a World Geographic Referencing System (WGRS) universal locational address, and geocoding includes converting the street address or latitude/longitude coordinates to the universal locational address based on the WGRS.

18. The method of claim 1, further including frequently updating the location-related data for an entity based on its proprietary name without changing the proprietary name, so that the data is current, accurate, and complete.

19. The method of claim 2, wherein the proprietary name serves as a discrete identifier for accessing the record in the UGD.

20. The method of claim 2, wherein the geographical location information includes a street address or latitude/longitude coordinates, and the method further includes geocoding the street address or latitude/longitude coordinates into a World Geographic Referencing System hierarchical universal locational address and storing the universal locational address with the proprietary name in the entity record.

21. The method of claim 3, wherein geographical location information includes a street address or latitude/longitude coordinates, and geocoding includes converting the street address or latitude/longitude coordinates to the ULA.

22. The method of claim 3, wherein geocoding includes converting the street address to latitude/longitude coordinates, and further converting the latitude/longitude coordinates into the universal locational address.

23. The method of claim 7, wherein static location-related data for a registered proprietary name is stored with the one or more additional registrars and dynamic location-related data for a registered proprietary name is stored with the central registrar.

24. The method of claim 17, wherein geocoding includes converting the street address to latitude/longitude coordinates, and further converting the latitude/longitude coordinates into the universal locational address.

25. The method of claim 17, further including verifying and calibrating the universal locational address.

26. The method of claim 25, wherein the geocoding, verifying and calibrating is performed only once for a geographical location.

27. The method of claim 20, wherein geocoding includes converting the street address to latitude/longitude coordinates, and further converting the latitude/longitude coordinates into the universal locational address.

* * * * *